United States Patent
Gilbert et al.

(12)
(10) Patent No.: US 6,370,537 B1
(45) Date of Patent: Apr. 9, 2002

(54) SYSTEM AND METHOD FOR THE MANIPULATION AND DISPLAY OF STRUCTURED DATA

(75) Inventors: John Gilbert, Belmont; Erhan Akin, Foster City; Cihan Akin, Redwood City; Hakan Akin, San Mateo; Ali Kutay, Palo Alto; Eliahu Albek, San Francisco, all of CA (US)

(73) Assignee: Altoweb, Inc., Palo Alto, CA (US)

( * ) Notice: Subject to any disclaimer, the term of this patent is extended or adjusted under 35 U.S.C. 154(b) by 0 days.

(21) Appl. No.: 09/475,655

(22) Filed: Dec. 30, 1999

Related U.S. Application Data
(60) Provisional application No. 60/115,951, filed on Jan. 14, 1999.

(51) Int. Cl.[7] ............................................. G06F 17/30
(52) U.S. Cl. ........................................................ 707/101
(58) Field of Search ........................................ 707/101

(56) References Cited

U.S. PATENT DOCUMENTS

| | | | |
|---|---|---|---|
| 5,715,453 A | | 2/1998 | Stewart |
| 5,953,716 A | | 9/1999 | Madnick et al. |
| 5,970,472 A | | 10/1999 | Allsop et al. |
| 5,983,267 A | * | 11/1999 | Shklar et al. ............... 709/217 |
| 6,032,130 A | | 2/2000 | Alloul et al. |
| 6,102,969 A | * | 8/2000 | Christianson et al. .......... 717/8 |
| 6,128,619 A | * | 10/2000 | Fogarasi et al. ............ 707/102 |
| 6,144,375 A | * | 11/2000 | Jain et al. .................... 345/302 |
| 6,144,962 A | * | 11/2000 | Weinberg et al. ............. 707/10 |
| 6,154,213 A | * | 11/2000 | Rennison et al. ............ 345/356 |
| 6,189,019 B1 | * | 2/2001 | Blumer et al. ............... 707/513 |
| 6,199,082 B1 | * | 3/2001 | Ferrel et al. ................. 707/522 |
| 6,272,472 B1 | | 8/2001 | Danneels et al. |

OTHER PUBLICATIONS

IBM Technical Disclosure Bulletin, Jan. 1998, vol. 41, No. 01, "Efficient 3D Method for Displaying Browser Uniform Resource Locator Bookmarks", p. 523–526.

PCT Search Report, PCT/US00/01065, Jan. 14, 2000.

PCT Search Report, PCT/US00/08077, Mar. 27, 2000.

Mike Rogers, "Enabling E–Markets Intelligence with the Black Pearl Knowledge Broker", Black Pearl Software, May 17, 2000, 46 pages.

Lynne Harvey, Geoffrey E. Bock, "Black Pearl Knowledge Broker, The Key to Profitability in E–Business", Jun. 1999, 14 pages.

David J. Hartzband, "The Evolution of Market Intelligence", Upstream Consulting, 9 pages.

Knowledge Broker "Making Clicks and Mortar Click™: Extending relationship businesses' expertise into e–markets". 1999–2000 Black Pearl, Inc., 2 pages.

"Visual e–Business: Innovative Solutions in Real–Time", 2000 AltoWeb Inc., 2 pages.

Visual E–Business Innovative Solutions, In Real–Time by Altoweb Inc., 2000, Products, 2 pages.

"Building Visual e–Business Applications: An Introduction to AltoWeb's Visual e–Business Infrastructure", 2000, 31 pages.

"Visual e–Business: AltoWeb's Revolutionary Approach to Web Applications", 2000,13 pages.

PCT Search Report, PCT/US01/18250, Oct. 18, 2001.

* cited by examiner

*Primary Examiner*—Wayne Amsbury
(74) *Attorney, Agent, or Firm*—Blakely, Sokoloff, Taylor & Zafman LLP

(57) ABSTRACT

A method and system for manipulating a data structure are described. In one embodiment, a data structure is accessed, the data structure comprising a number of nodes. A project is accessed, the project comprises one sub-structure, the sub-structure comprising a sub-set the nodes and a relationship defined between the nodes of the sub-set. In addition, a number of query results is created using the sub-structure and a data structure, and a layout and the number of query results are sent to a client.

183 Claims, 56 Drawing Sheets

SYSTEM AND METHOD FOR THE MANIPULATION AND DISPLAY OF STRUCTURED DATA

This application claims the benefit of U.S. Provisional Application No. 60/115,951, filed Jan. 14,1999.

FIELD OF THE INVENTION

The present invention relates generally to the field of data representation and more specifically to the construction and display of information items.

BACKGROUND OF THE INVENTION

The so-called "information age" is characterized in that information users are being presented with ever-increasing volumes of information. The presentation format of such information should ideally allow an information user quickly to assess the relevance of a large number of information items, and then efficiently to access information items that are deemed to the relevance and interest. The broader acceptance of the Internet, specifically the World Wide Web, as an information source has dramatically increased the volume of information that is available to an information user. Information retrieval from this vast source is often facilitated through a search engine, which may present a large number of information items to a user. Further, once a user has access to a particular web site, navigation of the various web pages and other information resources that constitute the web site may be confusing and disorientating. Specifically, the structure of a web site is typically hierarchical, and a user may become disoriented or "lost" within the web site.

Navigation of hierarchical information may also be required in a number of other instances on an everyday basis by a computer user. For example, navigation of file directories for data files and programs stored on a local or remote storage medium is a daily activity for most computer users. Hierarchical information is also typically used to represent the structures of organizations or genealogies.

A number of techniques and methodologies have been designed for the presentation and manipulation of data from discrete sites. For example, operating systems include file directory manipulation and navigation facilities and a system has been developed for management of a web site. Also, database management and query tools have offered the user the ability to define relationships between fields of the data items and to run queries on the specific database. However, these techniques and methodologies have not allowed the user to make connections between a number of data sources, query the direct sources at one time, or move easily from one level of data to the next.

Users often need to incorporate information from a number of sources. In one method, users must independently gather the information and incorporate the information by hand. However, information may be easily missed and the process is time consuming and expensive. In addition, this method has not allowed the user the ability to tie-in various discrete components of different types of data and process the collected data together.

SUMMARY OF THE INVENTION

A method and system for manipulating a data structure are described. In one embodiment, a data structure is accessed, the data structure comprising a number of nodes. A project is accessed, the project comprises one sub-structure, the sub-structure comprising a sub-set the nodes and a relationship defined between the nodes of the subset. In addition, a number of query results is created using the sub-structure and a data structure, and a layout and the number of query results are sent to a client.

BRIEF DESCRIPTION OF THE DRAWINGS

The present invention is illustrated by way of example, and not by way of limitation in the figures of the accompanying drawings in which like reference numerals refer to similar elements.

DETAILED DESCRIPTION

Figure 1:
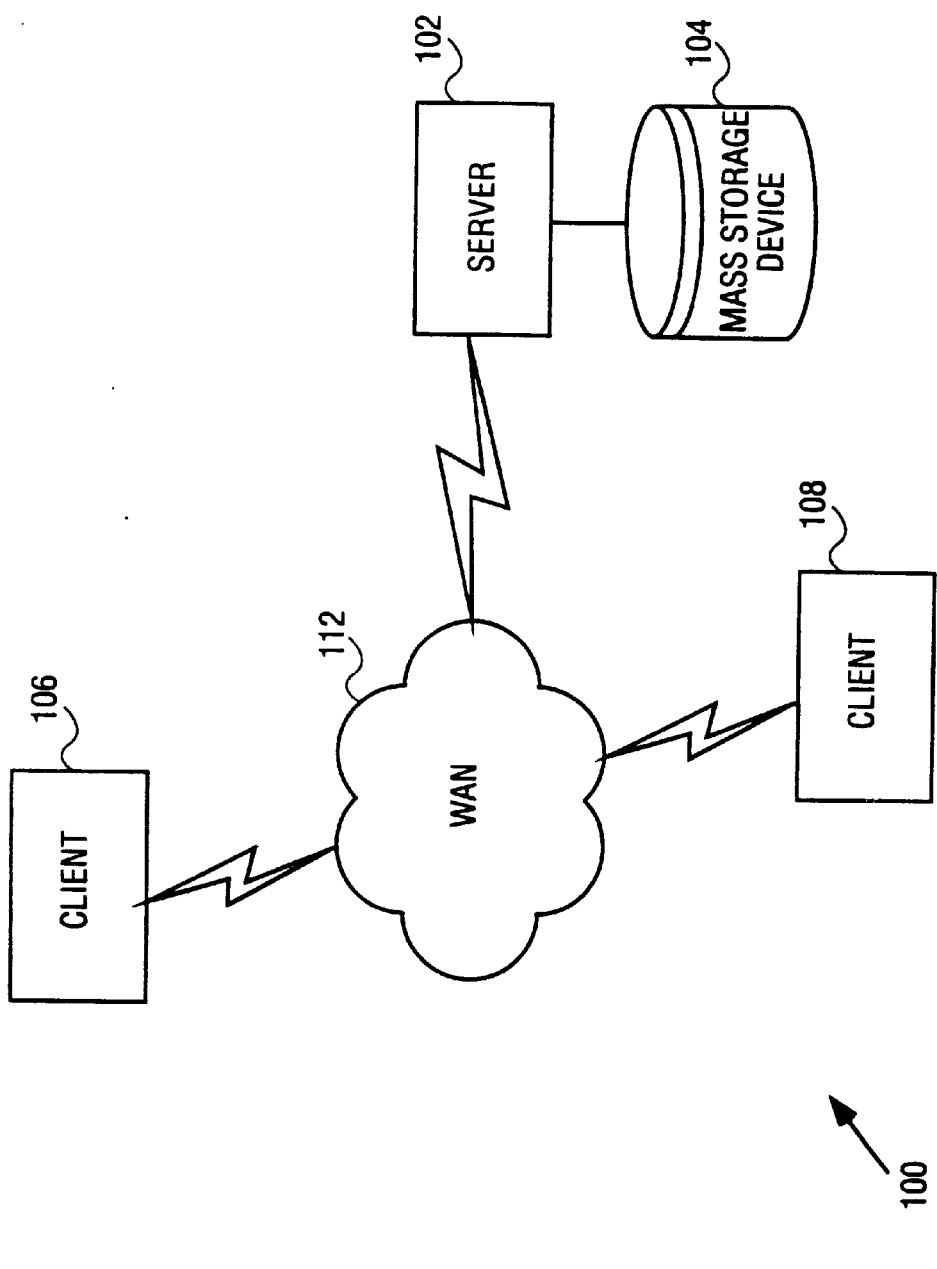
FIG. 1 is a block diagram of one embodiment for a network structure-context-content system.

A method and system for manipulating a data structure are described. In one embodiment, a data structure is accessed, the data structure comprising a number of nodes. A project is accessed, the project comprises one sub-structure, the sub-structure comprising a sub-set the nodes and a relationship defined between the nodes of the subset. In addition, a number of query results is created using the sub-structure and a data structure, and a layout and the number of query results are sent to a client.

In one embodiment, objects are created that refer to a variety of different data types from a number of data sources. Any of a variety of types of data may be used to create the objects such as, for example, database information, web pages, or the like. Relationships between the different data types may then be created. When a server processes the relationships in the form of a query, the query results related to the server use the established relationship to transfer the query to the next information state.

Although the description that follows assumes that the results of the query are displayed on a screen within a two-dimensional representation of a three-dimensional space, the embodiments are not so limited. The query results may be used in any suitable fashion depending upon a user's needs and wants. For example, the server may be used to transfer data from a relational database into extended markup language (XML) format and may be used through a application programming interface (API) without connecting the output of the server to a graphical representation.

In addition to creating connections by matching fields from meta objects, connections may also be created that contain a configurable query or queries. A configurable query is programmed within studio 205. If a configurable query exists for a meta object, when the meta object query is executed, the configurable query will be executed for that connection. If no configurable query exists for that connection, server 102 executes code for the query results based upon the original connection.

Meta objects and relationships are independently created and are distinct from their graphical representations. A developer may develop meta object maps and build multiple client applications for the meta object maps. Multiple graphical user interfaces may be created from the same meta object or objects. The meta object query results may be in a variety of formats such as, for example, HTML, XML, or other suitable format.

In one embodiment, a developer may create meta objects, define relationships and save the meta objects and relationships. Another developer may identify data sources and save those identification. Some time later, another developer may load the identified data sources and saved meta objects and make the connections between the data sources and the meta objects.

In the following detailed description of embodiments of the invention, reference is made to the accompanying drawings in which like references indicate similar elements, and in which is shown by way of illustration specific embodiments in which the invention may be practiced. Numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise or as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to a system or apparatus for performing the operations herein. This system may be specially constructed for the required purposes, or it may include a general purpose computer selectively activated or reconfigured by a computer program stored in the computer. Such a computer program may be stored in a computer readable storage medium, such as, for example, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention may be implemented in hard-wired circuitry, by programming a general-purpose processor, or by any combination of hardware and software. One of skill in the art will immediately appreciate that the invention may be practiced with computer system configurations other than those described below, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. The required structure for a variety of these systems will appear from the description below.

The methods of the invention are described in terms of computer software. If written in a programming language conforming to a recognized standard, sequences of instructions designed to implement the methods may be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . .), as taking an action or causing a result. Such expressions are merely a shorthand way of saying that execution of the software by a computer causes the processor of the computer to perform an action or produce a result.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

FIG. 1 is a block diagram of one embodiment for a network structure-content-context system 100. Referring to FIG. 1, system 100 consists of clients 106, 108 connected via wide area network (WAN) 112 to server 102. Server 102 is connected to mass storage device 104. Mass storage device 104 may be any suitable storage medium such as, for example, read only memory (ROM), random access memory (RAM), EPROM's, EEPROM's, magnetic optical discs, or any type of medium suitable for storing electronic data. In an alternate embodiment, wide area network (WAN) 112 may be a local area network (LAN).

Figure 2A:
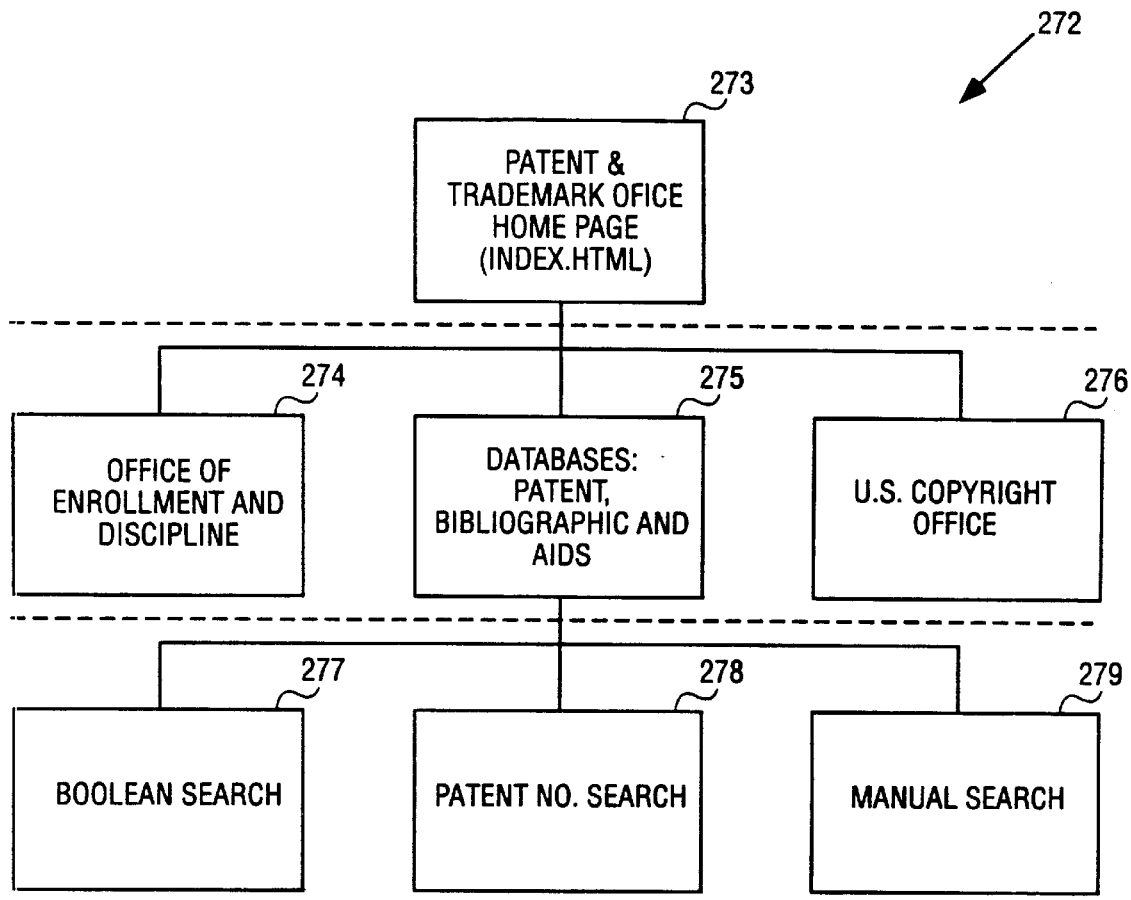
FIG. 2a is a tree diagram illustrating an exemplary hierarchical data structure.

FIG. 2a is a tree diagram illustrating an exemplary hierarchical data structure 272 including data items that constitute a portion of a website (i.e., the website for the United States Patent and Trademark Office). The hierarchical data structure 272 includes a root node 273 that constitutes the index page for the website. The root node 273 is shown to have at least three child nodes, namely nodes 274, 275, and 276. Node 275 (i.e., the database page) is shown to be a parent node relative to a further group of child nodes 277, 278, and 279. The root node 273 may be regarded as being on a first hierarchical level, the nodes 274, 275, and 276 may be regarded as being on a second hierarchical level, and the nodes 277, 278, and 279 may be regarded as being on a third hierarchical level. The hierarchical data structure 272 shown in FIG. 2a shall be utilized in the description below for the purposes of illustrating the generation of a representation of a hierarchical data structure 272 within a three dimensional environment, potentially displayed on a two dimensional display screen.

In one embodiment, within the objects and relationships created by a user, the second level of data structure 272 (274, 275, 276) may be used to represent the structure of the data and may be represented on a display screen as a band of related objects. A band may represent all items that are a result of one query and each band will be formed as a result of a single query (applying relationships to defined objects). The third level of data structure 272 (277, 278, 279) may be used to represent the content of the band. Each band that may be created by a query are related to one another by the defined relationships and the structure of the data. For example, if objects have been created for the departments within a company and the relationship is set up to query the data to determine what departments exist, each department would form a band. In one embodiment, the structure, content, context environment may be used to display two or more levels of information on one display screen that is easily understood and manipulated by the user.

Figure 2B:
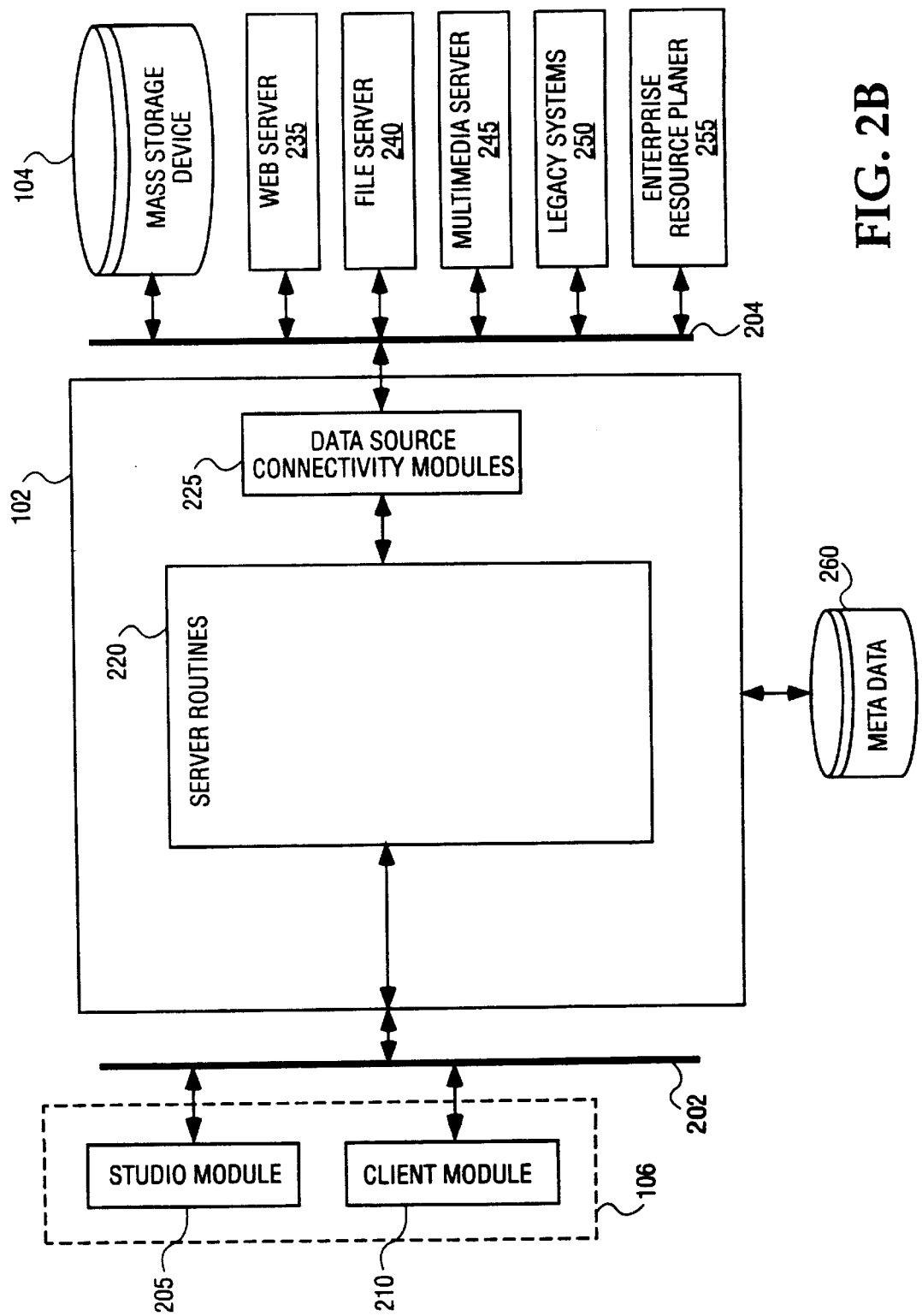
FIG. 2b is a block diagram of one embodiment for a server of FIG. 1.

FIG. 2b is a block diagram of one embodiment for server 102. Referring to FIG. 2b, server 102 is connected to client 106 via bus 202. In an alternate embodiment, server 102 may be connected via WAN 112 to client 106. Client 106 includes studio module 205 and client module 210. Server 102 includes server routines 220 and data source connectivity modules 225. In addition, server 102 is connected to meta data 260, mass storage device 104, web server 235, file server 240, multimedia server 245, legacy systems 250, and enterprise resource planner 255. In alternate embodiments, server 102 may be connected to any of the variety of additional servers and data sources. In an alternate embodiment, meta data 260 may be contained within mass storage device 104. In one embodiment, server 102 is connected via bus 204 to mass storage device 104 and the other servers. In alternate embodiments, server 102 may be connected via a LAN or WAN 112 to mass storage device 104 and the additional servers. In one embodiment, mass storage device 104 contains databases and other data sources.

Software routines contained within studio module 205 interact with server routines 220 to create data structures that are maintained within meta data 260. Server routines 220 retrieve data from any of the variety of data sources such as mass storage device 104, file server 240, multimedia server 245, legacy systems 250, or enterprise resource planner 255. In an alternate embodiment, data may be retrieve from any of a number of additional servers. Data source connectivity modules 225 interact with the connected servers to provide data to server routines 220. Software routines within studio module 205 interact with the server routines 220, to create a number of meta objects from the accessed data. Server routines 220 retrieve and parse the data to create a topographical or spatial representation of the data. Various types of data are extracted and parsed by unique connectivity modules 225. The data is processed to create a standard form of data that may be used by server routines 220. For example, portions of a web page may be extracted between a set of HTML tags or by extracting hyperlinks within the page. Server routines 220 invoke connectivity module 225 which, in turn, return data from the various sources. Connectivity modules 225 know to return the type of data from a given source.

In one embodiment, the topographical representation is in the form of a tree structure. Server routines 220 receive data such as, for example, HTML pages, from a data source such as, for example, web server 235. Server routines 220 parse the HTML page into a topographical representation in the form of a hierarchical data structure 272 of the data such as, for example, a tree structure. The hierarchical data structure 272, such as, for example, the HTML page, represents a topography or spatial representation of the links for a portion of the HTML page. Studio module 205 manipulates the parsed data to create relationships (or tags) between various nodes within the hierarchical data structure 272 to create meta objects. The meta objects represent a new hierarchical representation of the tagged data. In one embodiment, the data is parsed on an individual basis (that is, each page of data is parsed separately). In an alternate embodiment, multiple sources of data are parsed together to form a single parsed, hierarchical data structure 272. The meta object is stored in meta data 260.

Client module 210 interacts with server routines 220 during run time to access the meta objects contained within meta data 260. Upon initiation by client module 210, server routines 220 retrieve meta objects from meta data 260 and display the meta object on client 106. In one embodiment, the meta object is displayed in three views, namely, structure, context, and content.

A meta object may have a logic component or a collection of logic components associated with it. A logic component is executable program code that is executed on the meta object after a query is executed. The logic component may perform calculations on and manipulate the query results. For example, if a meta object has a "price change" field (a number), the logic component may check for the sign of that number. The logic component may then add a new field for the results of the query, for example "color", that will have the value "red" if the price change field number is negative and the value "green" otherwise.

Within studio module 205, a developer may enter the logic component code in a suitable programming language. This entered code becomes the logic component that may be executed at runtime after the meta object query has been executed.

Figure 2C:
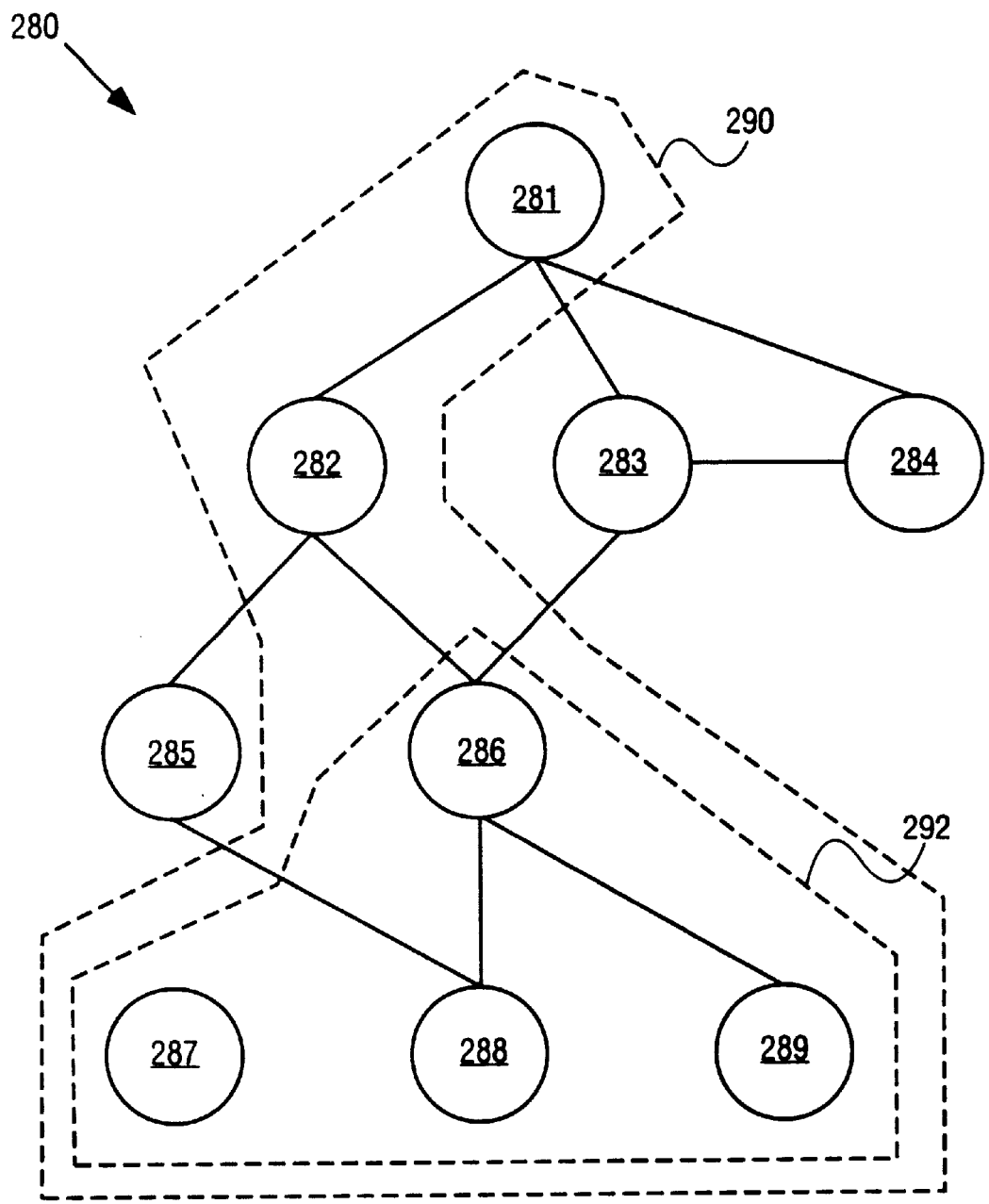
FIG. 2c is an exemplary diagram of a meta object structure.

FIG. 2c is a diagram one embodiment for of a meta object structure 280. Referring to FIG. 2c, meta object structure 280 includes a number of nodes 281 through 289. Each node 281–289 represents a meta object. The connections between nodes (solid lines) represent the relationships that are created between nodes of the meta objects. Nodes 281–289 may be nested meta objects. In one embodiment, meta object structure 280 may be viewed by its structure 290, context 292, or content (data linked to nodes 281–289). Meta object structure 280 may be a tree structure, directional graph, bi-directional graph, or a graph with uni-directional and bi-directional relationships.

The structure section of the view provides a high level representation of meta object structure 280 created by studio module 205. The structure displays the name of meta object structure 280 and the names of the meta objects (represented by nodes 281–289) created from the hierarchical data structure 272. For example, meta object structure 280 representation of a data base may be displayed as a list that displays the name of the data structure (root node 281) and a list that contains the names of the meta objects within the data structure that were previously tagged and linked to one another (for example, nodes 282, 286, 287, 288, and 289). As a user navigates through meta object structure 280 (either within the structure or context views), the nodes displayed will vary. For example, if the user accesses node 283, the structure view will display nodes 283, 286, 287, 288, and 289.

The context section of the view displays the meta objects as a relationship between the items. For example, for meta object structure 280 that represents a web site, at the top level, the context section displays the name of the data structure at the center and all the meta objects created from the data structure displayed in a three dimensional (3D) representation. In one embodiment, the 3D representation is a sphere. In alternate embodiments, the 3D representation may be any shape such as a cube or any other suitable shape. In the FIG. 2c example, if a user accesses a meta object node 286, meta object nodes 287, 288, and 289 are used to create the 3D representation display. As the user maneuvers between nodes 281–289, the 3D representation changes.

The content section of the view displays detailed information concerning the content of a node 281–289 within meta object structure 280. For example, for meta object structure 280 representing a database, the content section may display what type of data the database contains and how a user may retrieve information from the database. For a node 288, such as, for example, an entry in a catalog database, the content section may display details about node 288, such as the name of node 288, its price, availability, sample usage, and other information. In one embodiment, the content section may display a large number of document types, including hypertext markup language (HTML) and word processing documents, as well as tabulated results of database queries. The content view may be generated by accessing either the structure or context meta object and will change depending upon the node accessed.

Meta object structure 280 may be viewed as a graph with a starting node as its root 281 and the subsequent levels beneath root node 281 as the children 282, 283, 284, grandchildren 285, 286, great grand children, 287, 288, 289, etc. Nodes (281–289) in the displayed tree on client module 210 may be collapsed and expanded to facilitate viewing.

Any node within the tree may be selected to represent the "root" for viewing the context of the data. The context is built from the node and displayed by server routines 220 on client 106. The corresponding "children" of the root node may be, for example, HTML page links. Children of the root node may be mapped to the 3D representation on client 106 within a facet of the context display area. Memory maps are constructed for parent/child node families to a certain user-specified depth within meta object structure 280. In one embodiment, raw data is received and parsed into hierarchical data structure 272. Nodes from hierarchical data structure 272 are selected and stored as meta objects. The meta objects are associated with one another by creating relationships between the meta objects and may be represented as meta object structure 280. The selected meta objects are displayed within the structure display and the relationships are used to map the data to the 3D representation.

Each memory map includes "valid" memory locations to store data concerning a specific child node and "null" memory locations that are empty from the meta objects. Each memory location within each memory map is potentially associated with a facet of the 3D representation, but only facets that are associated with valid memory locations will appear on the 3D representation to be associated with (and to be representative of) a child node. Server routines 220 may continually operate in the background or may operate on request to map the meta objects of which only a portion may be represented by the 3D display at any given time. Accordingly, server routines 220 may continually probe both laterally and vertically within the meta objects for the purpose of identifying links (ergo, hypertext links or other pointers) between nodes. In one embodiment, following links in this browser window area may be reflected with updates to the structure and context areas respectively.

Client module 210 displays a current parent/child node family, or at least a portion thereof, in accordance with the 3D representation boundaries from memory map representing the relevant child nodes of the meta objects. Server routines 220 retrieve the memory maps generated offline as needed and send the memory maps, as query results, to client module 210 which displays a portion of a meta object in accordance with automatic or user inputs that direct navigation of the meta objects.

Figure 3:
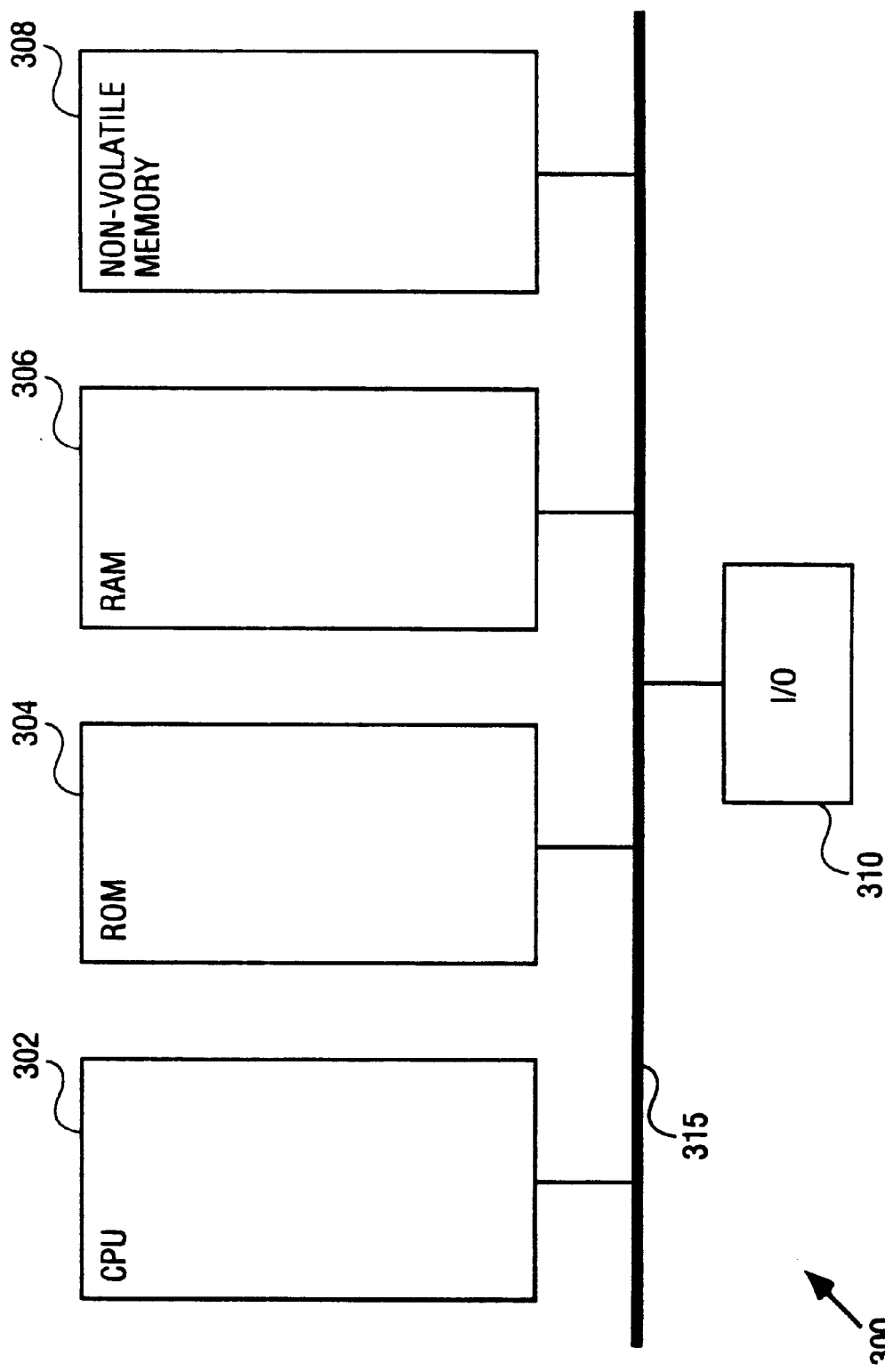
FIG. 3 is a block diagram for one embodiment of a computer architecture for a server of FIG. 2b.

FIG. 3 is a block diagram for one embodiment of a computer architecture for server 102. Referring to FIG. 3, computer architecture 300 includes CPU 302, read only memory (ROM) 304, random access memory (RAM) 306, non-volatile memory 308, and input/output (I/O) 310. The components are connected via bus 315. Non-volatile memory 308 includes a stored set of instructions (i.e., software) embodying any one, or all, of the methodologies described herein. The software may also reside completely or at least partially within ROM 304 or RAM 306. The software may be further transmitted or received via a network interface device.

Figure 4A:
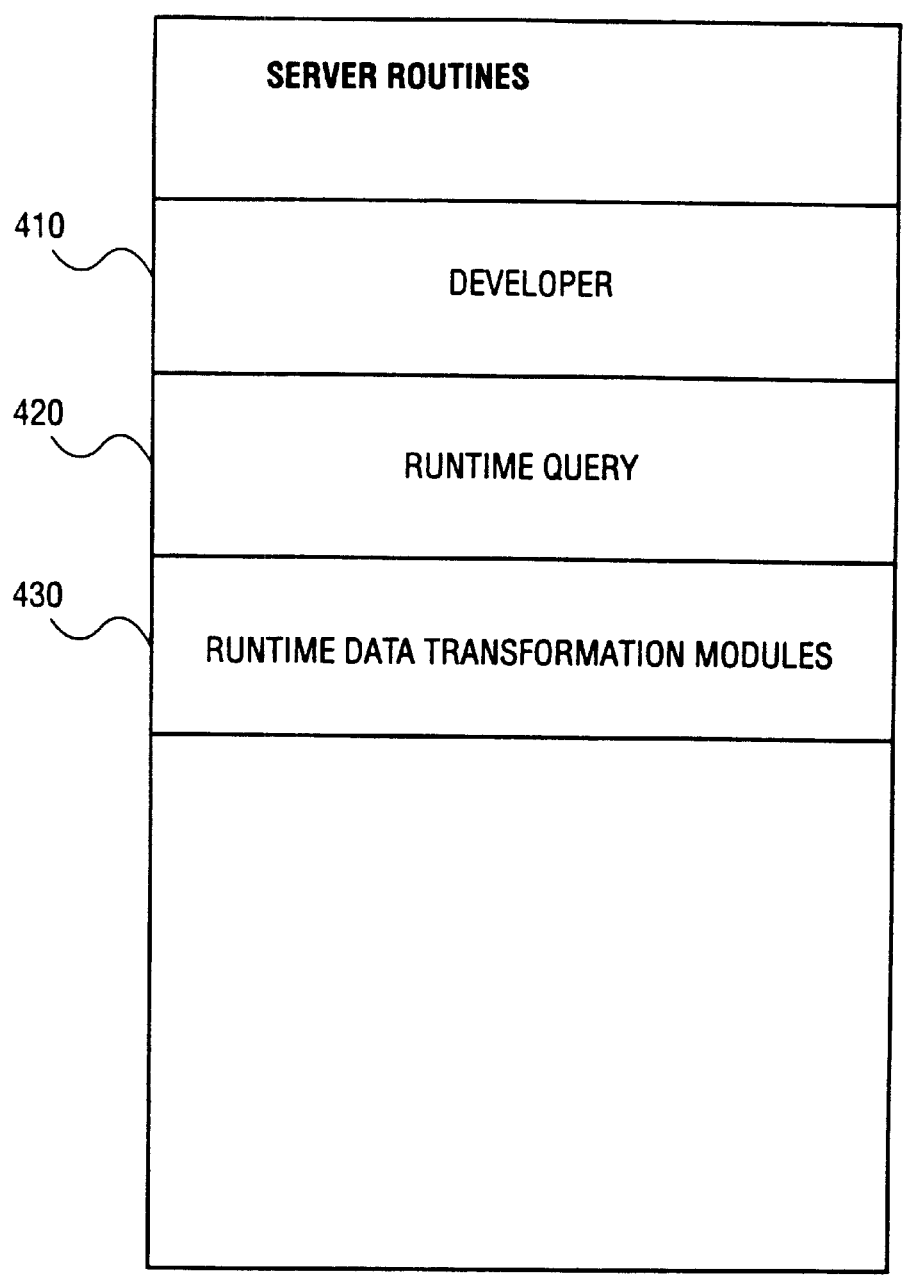
FIG. 4a is a block diagram of one embodiment for server routines of FIG. 2b.

FIG. 4a is a block diagram of one embodiment for server routines 220. Referring to FIG. 4a, server routines 220 may be maintained within RAM 306 or non-volatile memory 308 within server 102. Server routines 220 includes developer 410, runtime query 420, and runtime data transformation modules 430. Developer 410 interacts with studio module 205 to create the parsed hierarchical data structures 272 and to create the meta objects from hierarchical data structure 272. Runtime query 420 contains software routines for retrieving raw data and meta data 260 and displaying the data on client 106. Runtime data transformation modules 430 transform a variety of data components such as, for example, HTML pages or word documents, into a form suitable for display on client 106.

Developer 410 identifies the nodes and structure of hierarchical data structure 272 and generates a memory mapped representation of the hierarchical data structure (meta objects) that is accessed and utilized by runtime query 420. In one embodiment, developer 410 retrieves data from an external source such as, for example, mass storage device 104. Developer 410 creates a tree (hierarchical data structure 272) and sets the root 273 as part of that tree. In addition, developer 410 creates meta objects from the tree.

Runtime query 420 accesses meta data 260 to retrieve information (ergo, a memory mapped data) representative of a particular hierarchical data structure. In one embodiment, runtime query 420 accesses a display for the purpose of generating the relevant 3D display. Runtime query 420 accesses the parsed and tagged meta objects as developed by developer 410 and displays the current parent/child node family, or at least a portion thereof, in accordance with the 3D representation boundaries for a memory map representing the relevant child nodes. Runtime query 420 retrieves the memory maps generated by developer 410 as needed to display a portion of a hierarchical data structure in accordance with automatic or user inputs that direct navigation of the hierarchical data structure.

Runtime data transformation modules 430 retrieve content data from a source, such as, for example, mass storage device 104, during operation of the runtime query 420. Runtime data transformation module 430 transform the data from a source representation into a representation suitable for display on client 106.

Figure 4B:
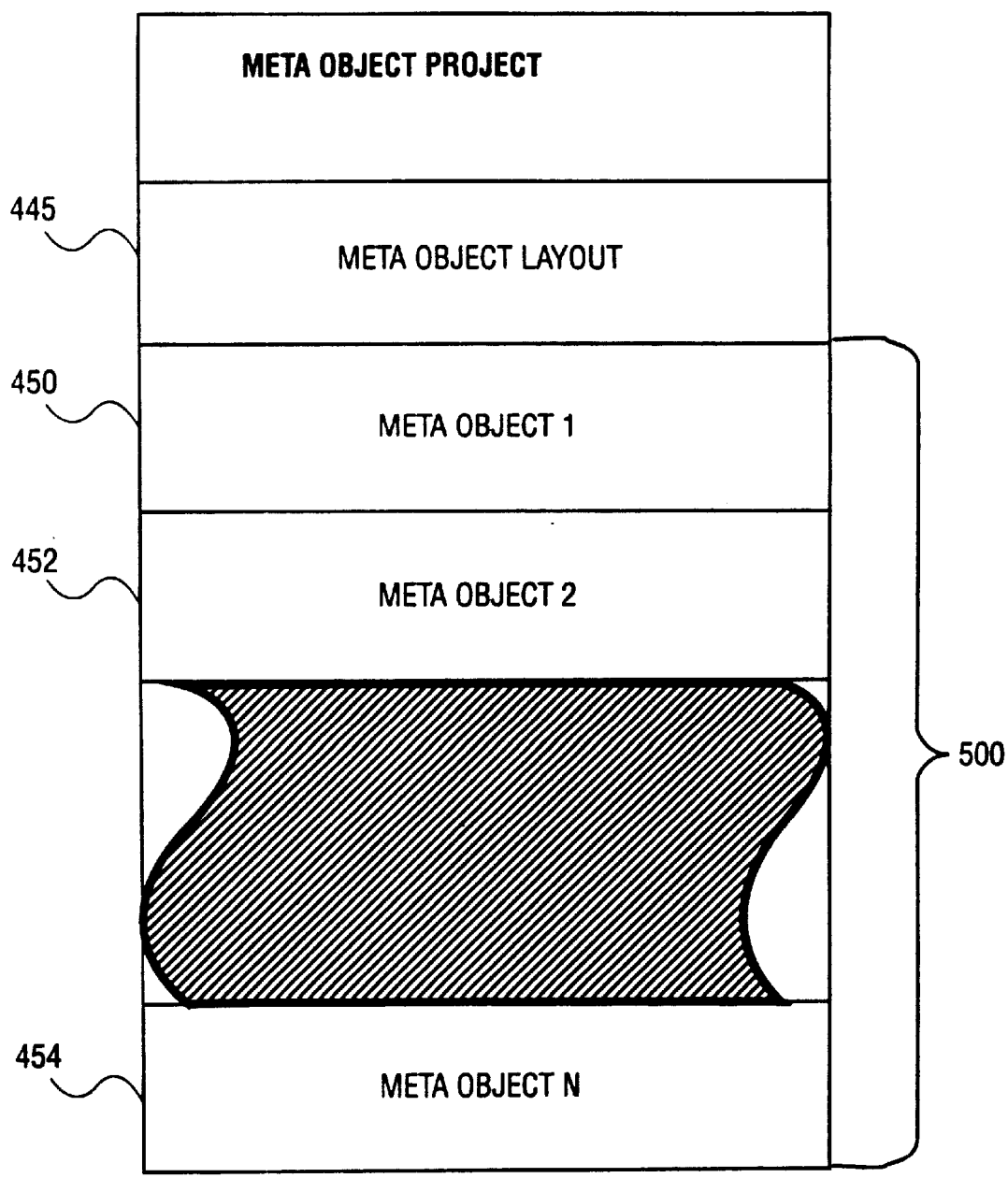
FIG. 4b is a block diagram of one embodiment for a meta object project.
Figure 4B:

FIG. 4b is a block diagram of one embodiment for a meta project 440. Referring to FIG. 4b, meta project 440 includes meta layout 445 and from meta object 1 (450) through meta object n (454) of meta objects 500. Meta layout 445 contains the mapping of meta objects 500 to the structure-context-content display as described below. Meta objects 500 contain the tagged and linked nodes of hierarchical data structure 272. Multiple meta projects 440 are maintained within meta data 260. In an alternate embodiment, meta object project 440 does not include meta layout 445 or any associated graphical representation of the data.

Figure 4C:
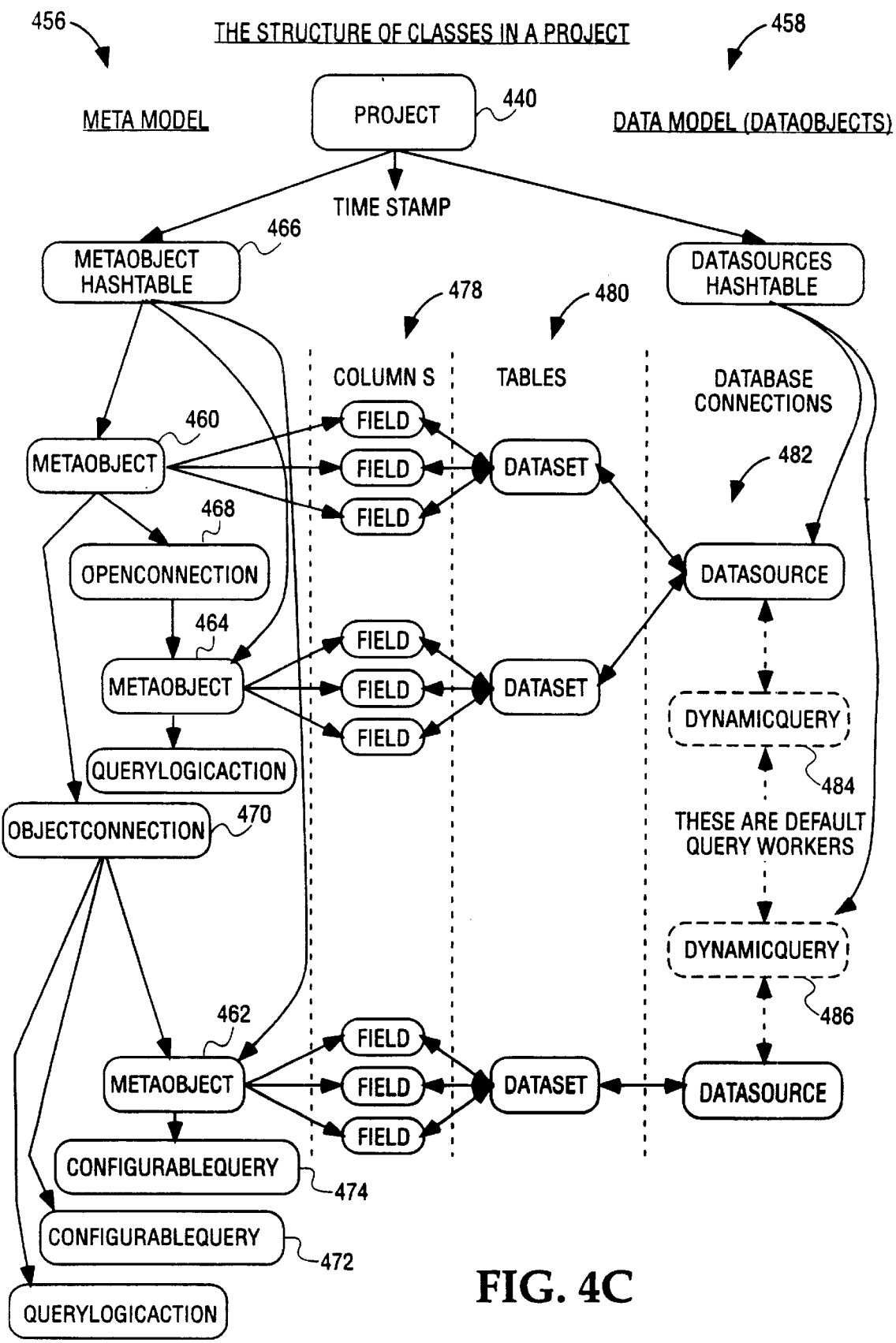
FIG. 4c is a block diagram of another embodiment for a meta project.

FIG. 4c is a block diagram of another embodiment for a meta project 440. Referring to FIG. 4c, meta project 440 includes meta model 456 and data model 458. Meta model 456 includes a number of meta objects (460, 462, 464), each of which is connected to the meta project 440 by meta object hash table 466. Meta objects (460, 462, 464) are connected together by a number of object connection (468, 470). Meta objects 460, 462, 464) may have associated configurable queries (472, 474) that contain cached queries. Meta objects (460, 462, 464) and object connections (468, 470) may not have an associated query (for example, meta object 460 and connection 468). Whenever a query is executed for these meta objects and connections, a server default event (484, 486) may search and execute a default dynamic query from the data source associated with the meta object 460.

In the example of FIG. 4c, meta objects (460, 462, 464) are defined and related to fields 478 within data sets 480 from a particular data source 482. In one embodiment, meta objects (460, 462, 464), connections (468, 470), and queries (472, 474) may be defined independently from the data sources 482. Thus, a first user may define meta objects (460, 462, 464) while a second user may connect the meta objects (460, 462, 464) to the data sources 482 at a different time. In addition, a meta object (460, 462, 464) may be connected to a number of different data sources 482 within different data projects 440.

Figure 4D:
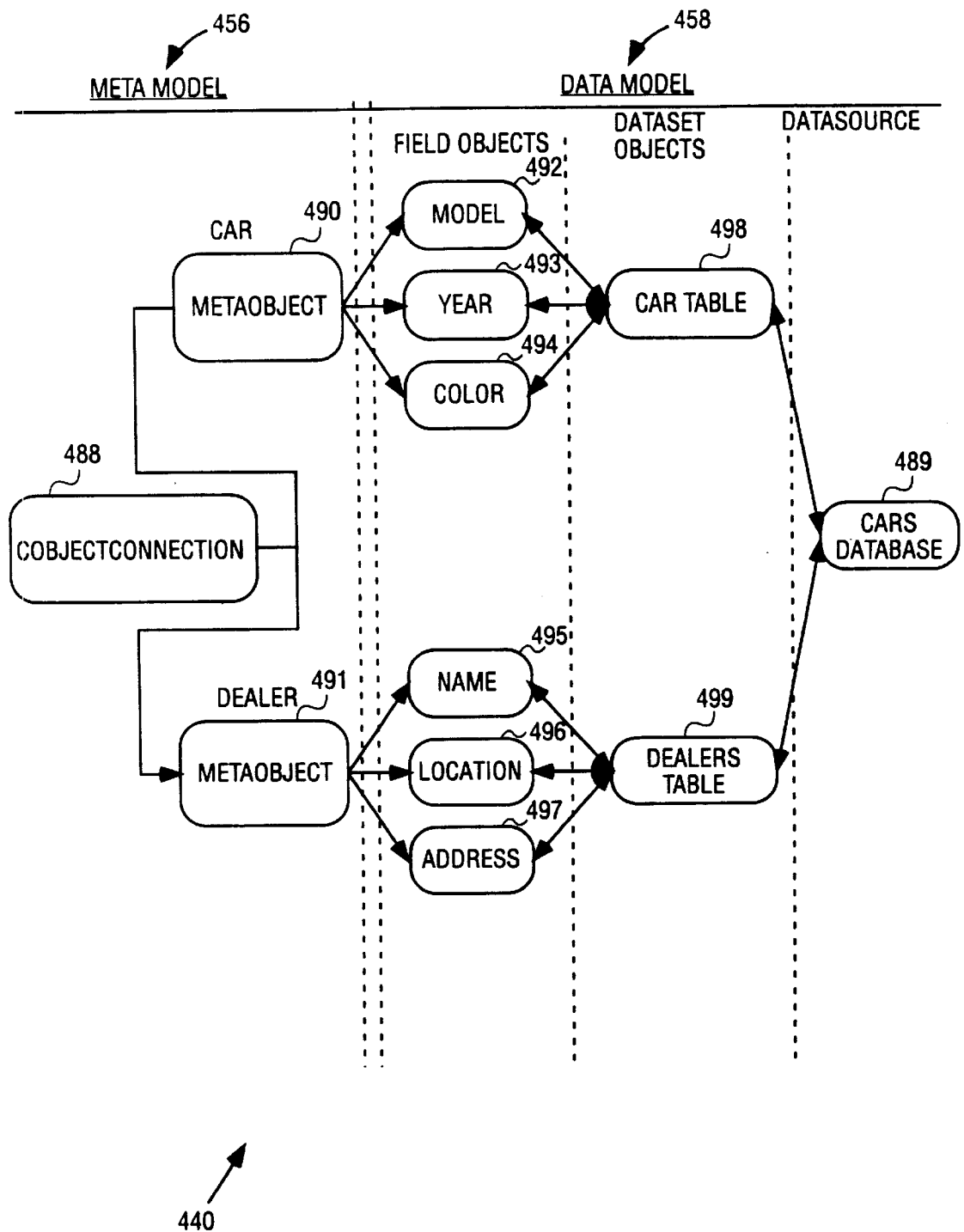
FIG. 4d is a block diagram of another embodiment for a meta project.

FIG. 4d is a block diagram of another embodiment for a meta project 440. The example of FIG. 4d illustrates the relationship between meta model 456 and data model 458. Meta model 456 includes car meta object 490 and dealer meta object 491. The two meta objects (490, 491) are connected by object connection 488 (that is, a relationship is defined between the two meta objects for a given project). Car meta object 490 is connected by field objects (492, 493, 494) for model, year, and color respectively. These field objects are defined within car table 498. In addition, dealer meta object 491 is defined by field objects (495, 496, 497) for name, location, and address respectively. These field objects are defined within dealer table 499. In the example, both car tale 498 and dealer table 499 are contained within the same cars database 489. In an alternate embodiment, the field objects, table, or both may be defined in different data sources.

Figure 4E:
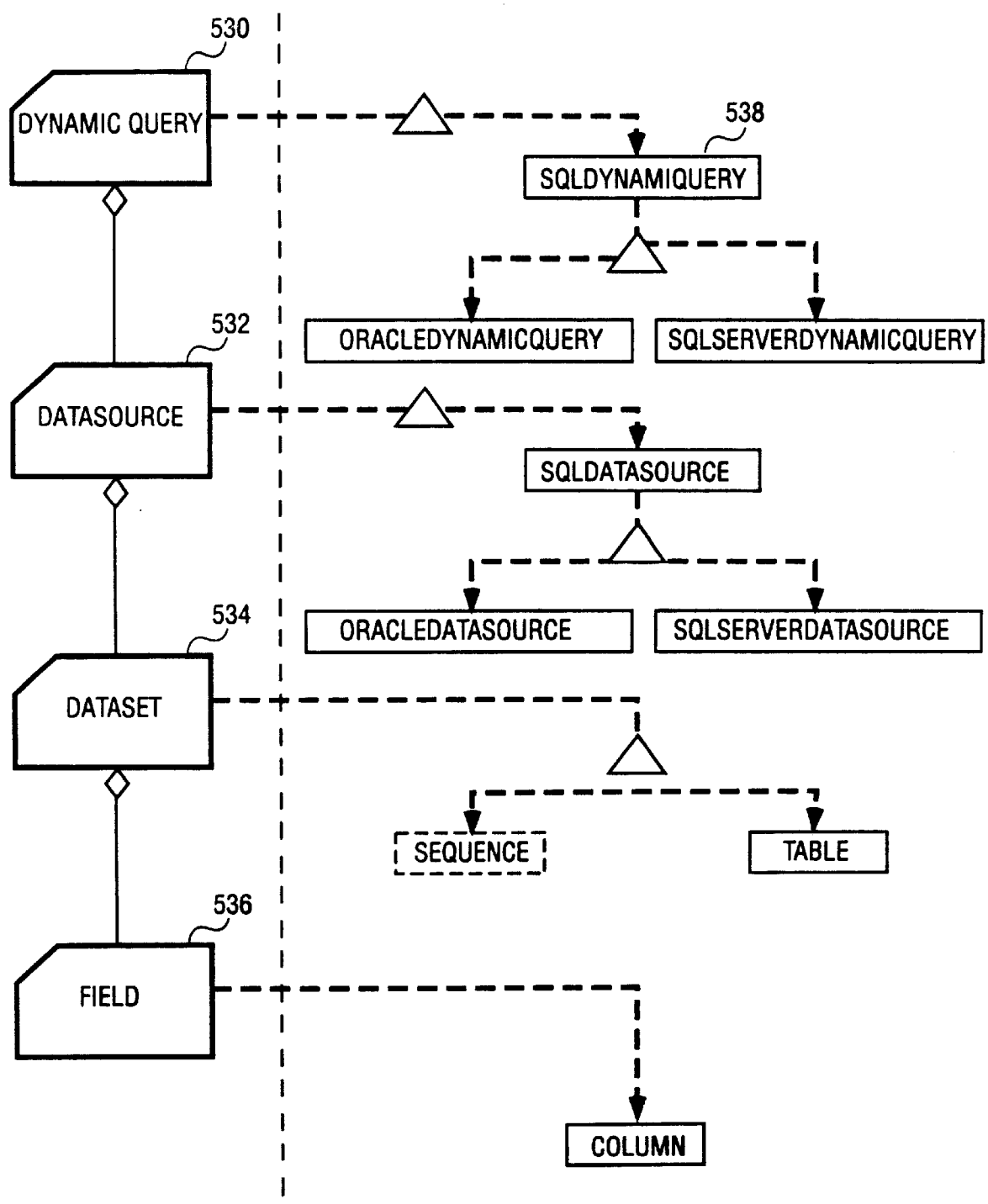
FIG. 4e is a block diagram for one embodiment for the implementation of a data object interface for a relational database.

FIG. 4e is a block diagram for one embodiment for the implementation of a data object interface for a relational database. Dynamic query 530 defines the access to the particular relational database. In the example illustrated, two relational databases may be accessed by the same dynamic query 530. Data source 532 defines the database used, data set 534 defines the sequence and/or table within the data set 534 used, and field 536 defines the column or filed within the data set 534 used.

Figure 5:
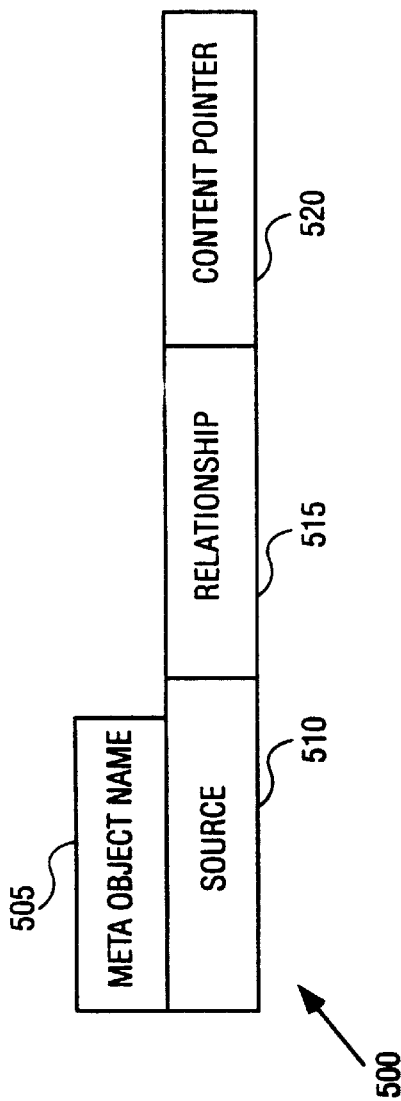
FIG. 5 is a block diagram of one embodiment for a meta object.

FIG. 5 is a block diagram of one embodiment for meta object 500. Referring to FIG. 5, meta object 500 includes meta object name 505, source 510, relationship 515, and content 520. Meta object name 505 is a unique name given to meta object 500 by the user of studio module 205 during creation of meta object 500. Source 510 indicates the source of the data utilized to create meta object 500. Source 510 may be, for example, from web server 235, file server 240, mass storage device 104, or any suitable data source. Relationship 515 contains the relationships developed between meta objects 500. Meta object 500 may include content pointer 520 which points to optional content source for display on the content of the data identified by meta object 500.

Figure 6:
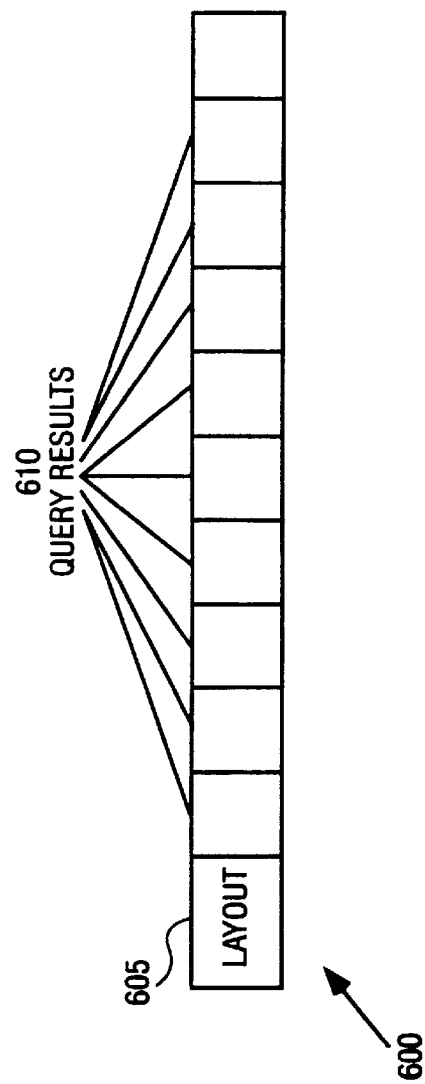
FIG. 6 is a block diagram of one embodiment for query results.

FIG. 6 is a block diagram of one embodiment for query 600. Referring to FIG. 6, query 600 includes layout 605 and a number of a query results 610. Layout 605 contains information for displaying meta objects 500 on client 106. Query result 610 contains information concerning the current state of the data to displayed on client 106. Query results 610 are retrieved from the data source, such as mass storage 104, and combined with meta project 440 data to display the data on client 106.

Runtime query 420 retrieves a meta project 440 from meta data 260 after initialization by client module 210. Runtime query 420 retrieves meta objects 500 from meta project 440 and queries source 510 to return current data for the meta objects 500 into query results 610. Runtime query 420 retrieves meta layout 445 from the returned meta project 440 and places the information in layout 605. Query result 600 is then passed to client module 210 for display.

Figure 7:
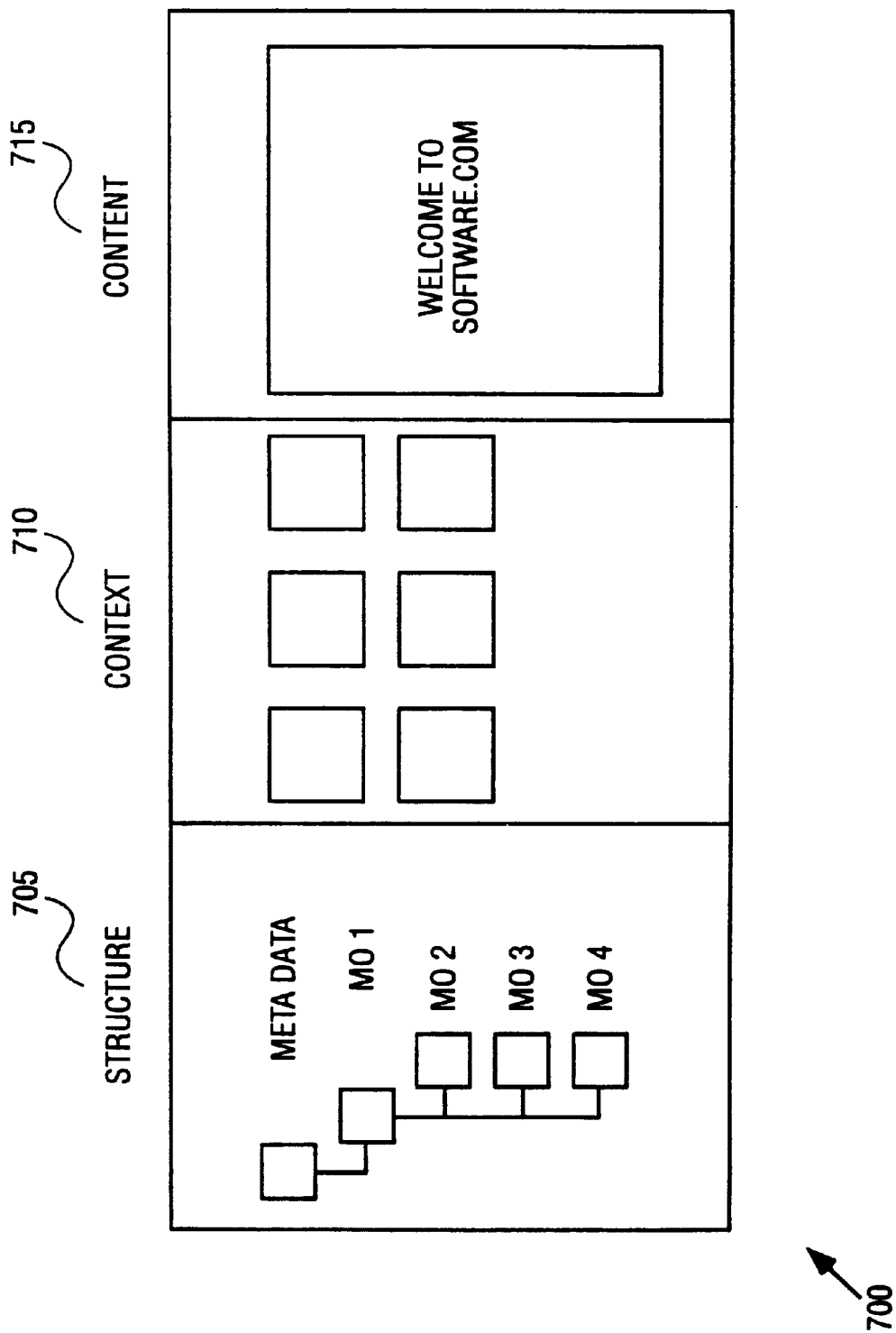
FIG. 7 is an exemplary block diagram for the display of meta objects.

FIG. 7 is an exemplary block diagram for the display of meta objects 500. Referring to FIG. 7, each meta object 500 is displayed in structure area 705 as a meta object structure 280 (FIG. 2c). In alternate embodiments, any structure representation may be used to display the meta objects 500 and is not limited to a hierarchical structure. In addition, meta object 500 may contain a sub-set of the hierarchical structure or any structure that may be built on the meta object map. Meta object 500 may also contain links to queries that are run on meta objects. Meta object structure 280 is displayed in a manner to indicate the hierarchical structure of the meta object 500. Context section 710 displays the context of meta objects 500 (282, FIG. 2c), and content section 715 displays any applicable content related to either the context 710 or structure 705.

Figure 8:
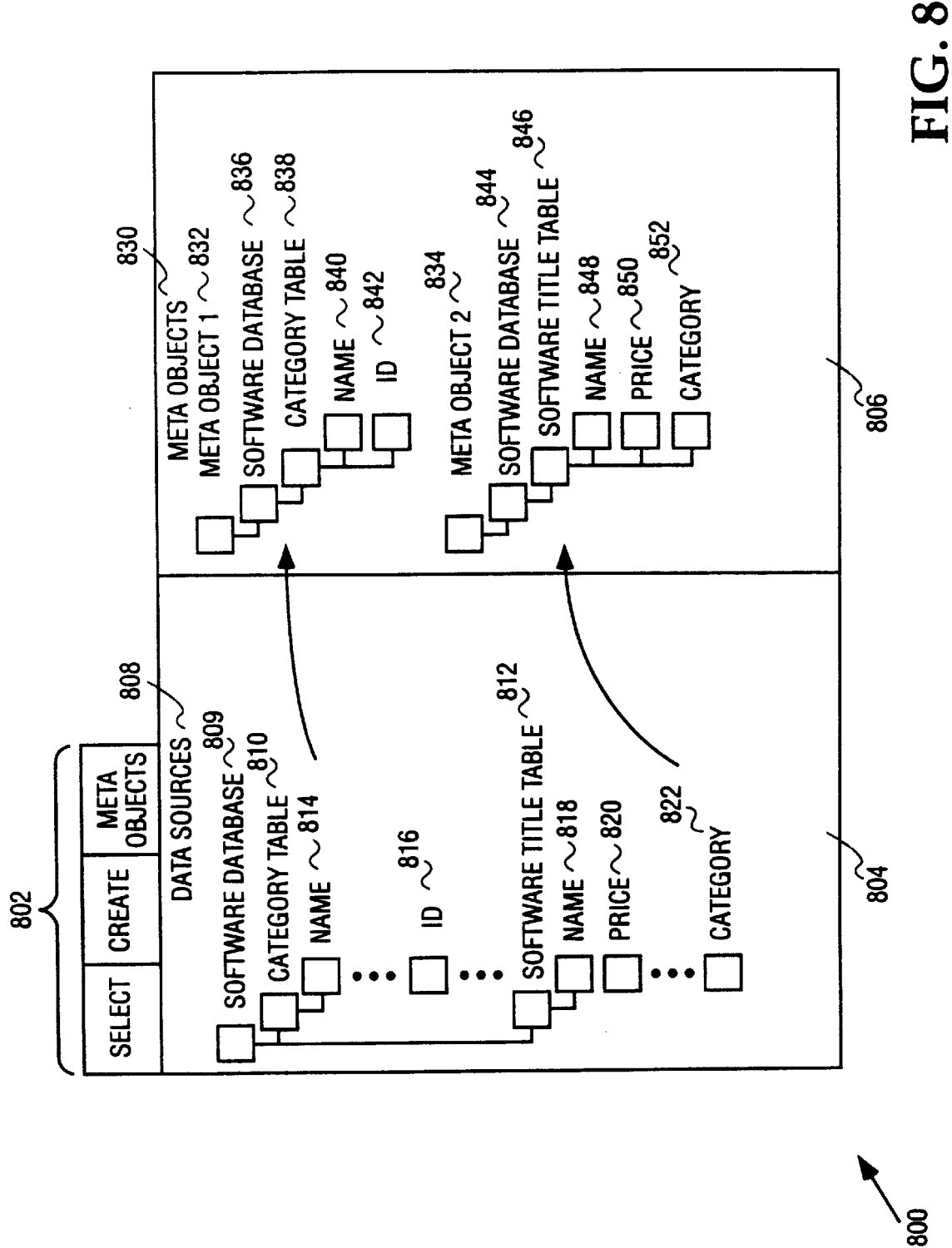
FIG. 8 is illustrates an exemplary window for a meta object creation dialog box.

FIG. 8 illustrates an exemplary window for a meta object 500 creation dialog box 800. Referring to FIG. 8, menu area 802 indicates that meta objects 500 are being created from parsed hierarchical data structure 272. Left window 804 displays the parsed hierarchical data structure 272 created by server 102 after a data source has been selected. A user first selects the data source as shown at 808. Once a source 808 is selected, the various tables or nodes contained within source 808 that may be selected are parsed by server routines 220 and are shown below source 808.

For example, in a software database, the database may contain a category table 810 and a software title table 812. Within category table 810, nodes such as name 814 and ID 816 may be shown. Within software title table 812, nodes such as name 818, price 820, or category 822 may maintained. In one embodiment, the user selects the various nodes to create meta objects 500 by selecting and "dragging" the various nodes from left window 804 to right window 806. Initially, a user names the meta object 830 (for example, meta object 1 (832) and meta object 2 (834)). As the user moves nodes from a category table within left window 804 to the meta object within right window 806, software routines automatically place the software database name 809 in right window 806 below the meta object name. If, for example, the user drags name 814 and ID 816 nodes from category table 810 to meta object 1 (832), software database name 809 will be placed as software database 836, category table name 810 will be placed in category table 838 and name 814 will be placed in name 840 and ID 816 at ID 842. Similarly, for meta object 2 (834), the name 816, price 820, and category 822 nodes are placed at name 848, price 850, and category 852 and software automatically incorporates the software database name at 844 and the software idle table name at 846.

Once the user is satisfied with the meta objects 500 created, the meta objects 500 are stored within meta data 260 as project 440. Meta project 440 is uniquely identified by the user during the meta object 500 creation process.

During the meta object 500 creation process, the user uses studio module 205 to access server routines 220 to define the data source utilized to create the meta objects 500. In one embodiment, a single data source is utilized to create meta objects 500. In an alternate embodiment, multiple data sources may be used to create meta objects 500 within meta project 440. The user creates meta objects 500 using studio modules 205 to define which nodes to include from which files and databases. For example, in the FIG. 8 example, a software database may contain categories and software titles tables. The user may select any of the nodes within the various tables to create meta objects 500. After creating meta objects 500, relationships between meta objects 500 are defined as described below.

In addition to creating connections by matching fields from meta objects, connections may also be created that contain a configurable query or queries. A configurable query is programmed within studio 205. If a configurable query exists for a meta object, when the meta object query is executed, the configurable query will be executed for that connection. If no configurable query exists for that connection, server 102 executes code for the query results based upon the original connection.

Meta objects and relationships are independently created and are distinct from their graphical representations. A developer may develop meta object maps and build multiple client applications for the meta object maps. Multiple graphical user interfaces may be created from the same meta object or objects. The meta object query results may be in a variety of formats such as, for example, HTML, XML, or other suitable format.

Figure 9A:
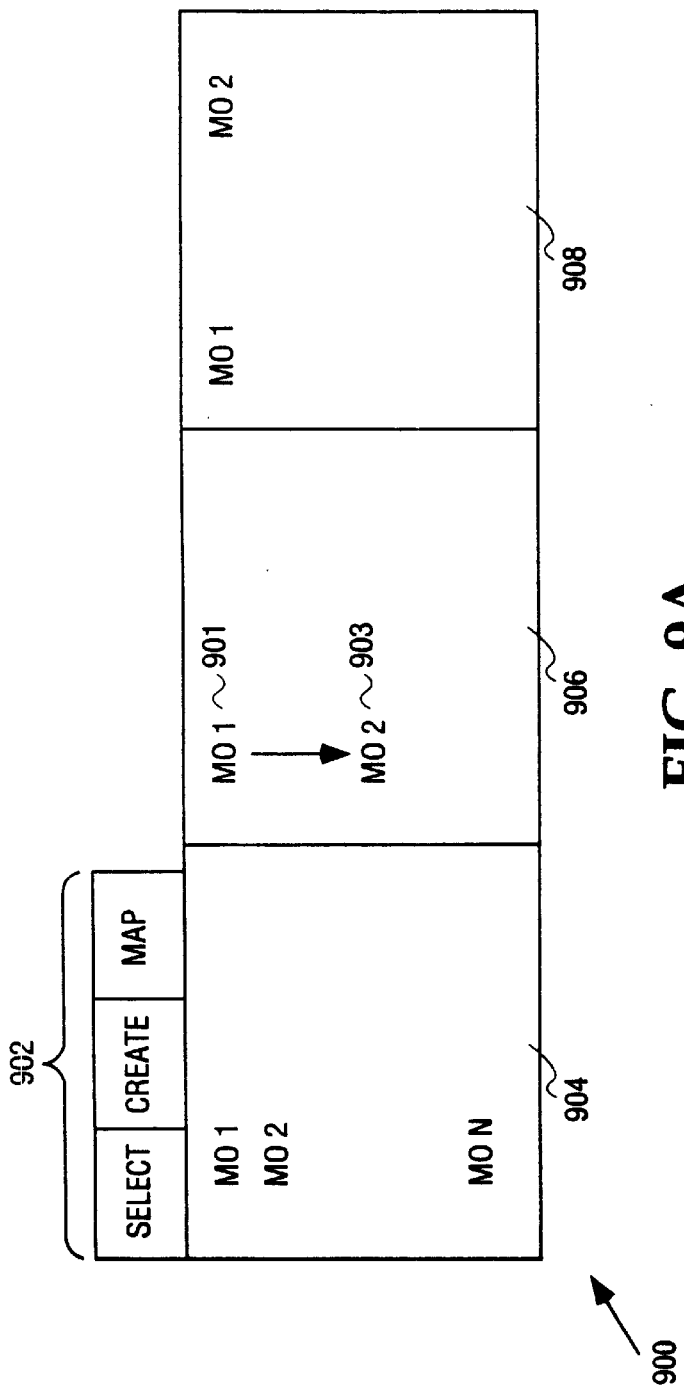
FIG. 9a illustrates an exemplary window for a meta object relationship defining dialog box.
Figure 9B:
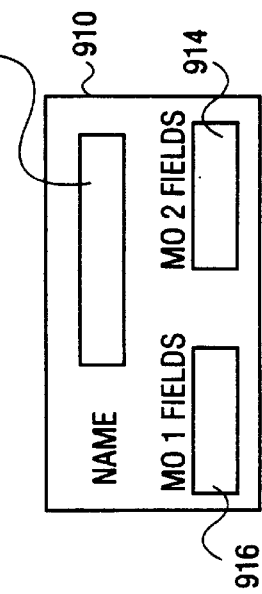
FIG. 9b illustrates an exemplary drop-down menu window for a meta object node relationship defining dialog box.

FIG. 9a illustrates an exemplary window for meta object 500 relationship defining dialog box 900. FIG. 9a includes menu item 902, indicating that a mapping between the meta objects 500 is to take place. Left window 904 contains a listing of the meta objects 500 previously defined (FIG. 8) for meta project 440. Middle window 906 is an area to create a relationship between at least two meta objects 500. In one embodiment, the users drag two or more meta objects 500 from left window 904 to middle window 906. After a second meta object 500 is dragged to middle window 906, a pop-up window 910 is displayed, as indicated in FIG. 9b. FIG. 9b, is an exemplary pop-up window 910 for a meta object 500 node relationship defining dialog box. Pop-up window 910 includes a name node 912 for uniquely naming the relationship between the selected meta objects 500. Pop-up window 910 also includes dropdown meta object node names 914 and 916. In the example shown in FIGS. 9a and 9b, two meta objects 500, meta object 1 (901) and meta object 2 (903), have been selected for mapping. Thus, in FIG. 9b, dropdown menus are shown for menu object 1 (916) and meta object 2 (914). If more than two meta objects 500 had been selected, an additional dropdown node area would be shown. In one embodiment, relationships 515 may only be created between two meta objects 500 at a time. In the FIG. 9b example, the user selects nodes from both meta objects 914, 916 to create the mapping which is displayed in right window 908. Thus, the user defines relationship 515 between meta object 1 (901) and meta object 2 (903) by connecting node names 914, 916 and the resulting relationship 515 is displayed within right window 908.

Figure 10:
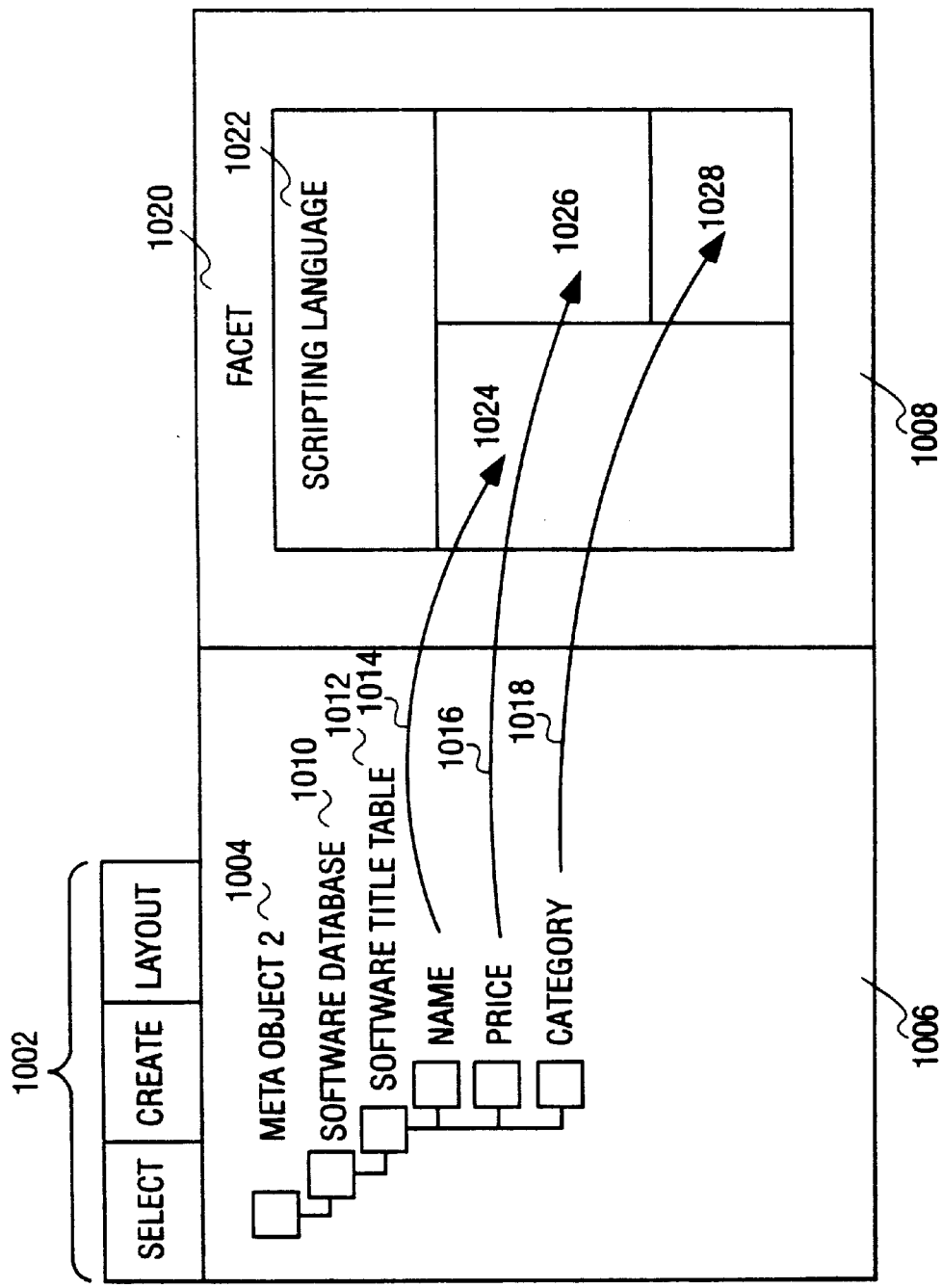
FIG. 10 illustrates an exemplary window for a meta layout dialog box.

FIG. 10 illustrates an exemplary window for a meta layout 445 dialog box 100. Referring to FIG. 10, menu display 1002 is shown indicating that meta layout 445 is to be created. The user selects a meta object 1004, which is displayed in left window 1006. The meta object 1004 is chosen from a list of meta objects 500 previously created and mapped (FIGS. 8, 9A, and 9B) and included in meta project 440. The meta object 1004 displays the hierarchical data structure that was previously created for the meta object 500 which includes the database name 1010 table name 1012 and selected nodes 1014, 1016, 1018. Right window 1008 displays a facet or layout for the display of the meta object 500 within context area 710 of the display. A facet may be chosen from a list of pre-assigned facets or a new facet may be created by the user. The facet name is shown at facet 1020. Facet 1020 includes a number of areas 1024, 1026, 1028 for the display of the various nodes 1014, 1016, 1018 from meta object 1004. The nodes may be chosen from one or more meta objects 500. In one embodiment, a user drags the node into a specific area 1024, 1026, 1028 within facet 1020 to create the layout. Thus, in the FIG. 10 example, name 1014 is dragged to area 1024, price 1016 is dragged to area 1026, and category 1018 is dragged to area 1028. In addition, a scripting language area 1022 is maintained for incorporating scripting instructions for the layout for the meta object 500 and for the inclusion of content to display in a content area 715 when a particular meta object 500 is accessed.

During runtime, runtime query 420 retrieves the facet 1020 from meta data 260 and loads the data indicated by the meta object 1004 into the areas of the facet 1020. The filled-in fault 1020 is then displayed within context area 710. Each data item within a node is used to create a separate facet for display. Facet 1020 is saved in meta layout 445.

Figure 11:
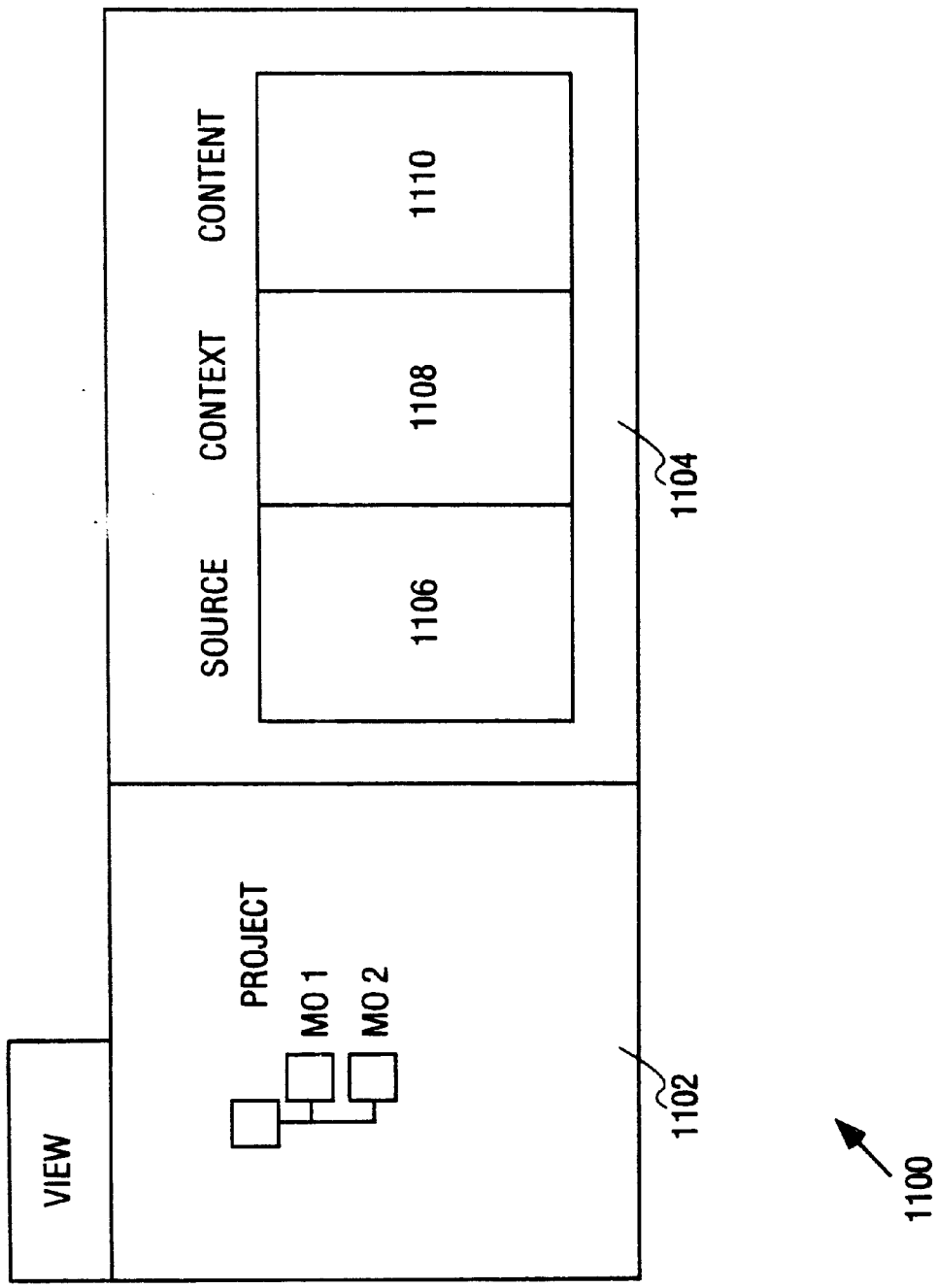
FIG. 11 illustrates an exemplary window for a structure-context-content view dialog box.

FIG. 11 illustrates an exemplary window for a structure-context-content view dialog box 1100. Meta objects 500 are shown for meta project 440 in left window 1102. The view also shows, in right window 1104, the source structure 1106, context 1108, and content area 1110 for display of the project 440. Within structure 1106, the user may choose from a variety of forms for display, such as, for example, a list tree. The context area 1108 indicates how the context is to be displayed. For example, the context may be displayed as a sphere, a cube or as an HTML page. In addition, the user may select a variety of preferences such as the colors of the various displays and a background color and background texture of the display. The view information is stored in meta layout 445.

Figure 12:
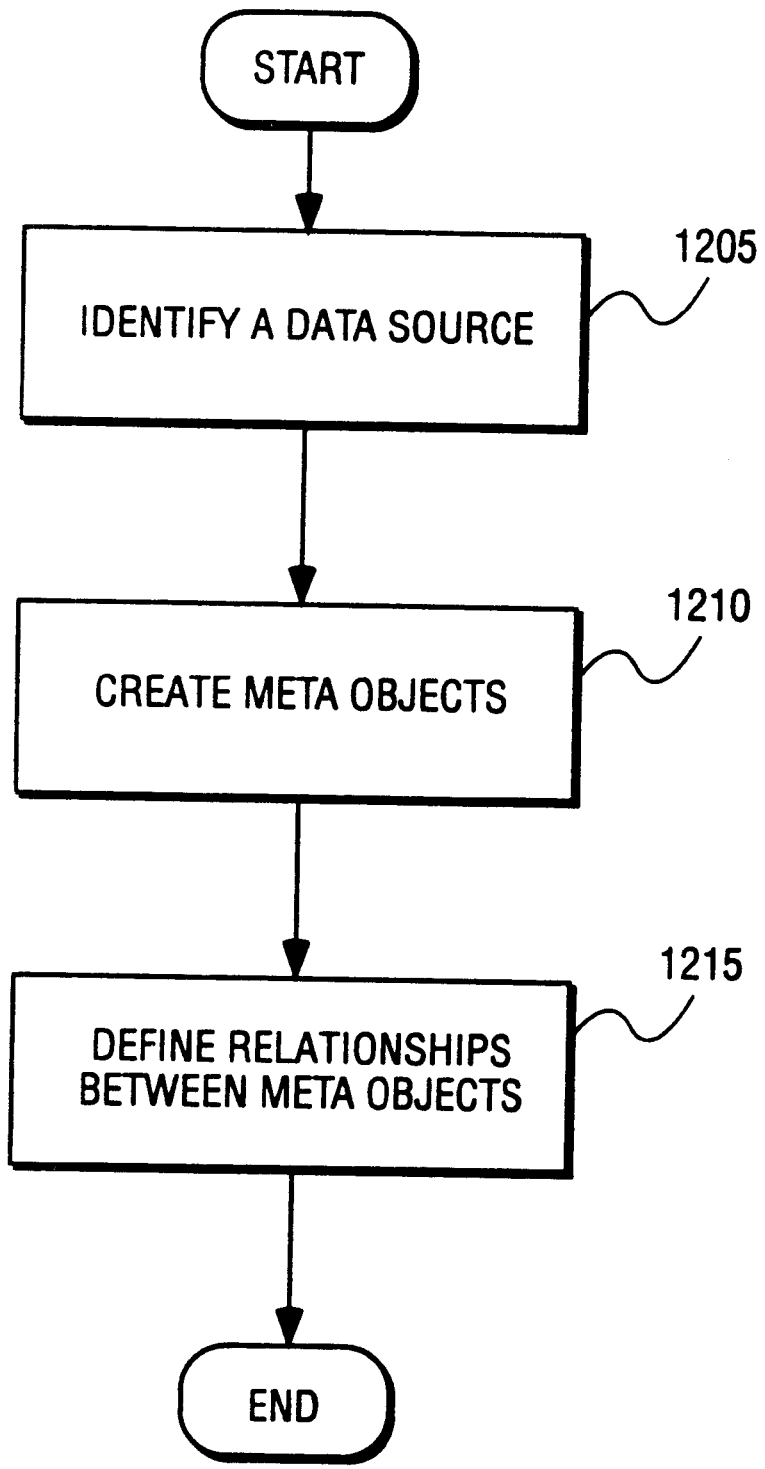
FIG. 12 is a flow diagram of one embodiment for creating meta objects.

FIG. 12 is a flow diagram of one embodiment for creating meta objects 500. Initially at processing block 1205, data sources are identified. The data sources may be from any of a variety of local or remote data sources such as mass storage device 104, web server 235, file server 240, multi-media server 245, legacy systems 250, enterprise resource planter 255, or any remote data source. Studio module 205 interacts with server routines 220 to access the various data sources. Data source connectivity modules 225 access and display the available data sources on client 106. Once the data source or sources are identified, software routines 220 create hierarchical data structures 272 from the data sources by parsing the data source. Thus, server routines 220 create a topographical representation of the data in the form of, for example, a tree structure.

After the data sources are identified and hierarchical data structure 272 created, at processing block 1210, meta objects 500 are created. Meta objects are created by selecting various nodes within the hierarchical data structure. Meta objects may be created from a single source or multiple sources. The meta objects 500 are saved in meta project 440. In alternate embodiments, a developer may create meta objects, define relationships and save the meta objects and relationships. Another developer may identify data sources and save those identification. Some time later, another developer may load the identified data sources and saved meta objects and make the connections between the data sources and the meta objects.

At processing block 1215, the created meta objects 500 are tagged by defining relationships 515 between nodes of the previously created various meta objects 500. Nodes within the meta objects 500 are chosen and a relationship 515 is defined between the nodes of meta objects 500. The relationships may be between nodes from different meta objects 500 or between nodes of the same meta object 500. In one embodiment, two meta objects 500 are used to define relationships 515. In alternate embodiments, any of a number of meta objects may be used to define relationships. The defined or tagged meta objects 500 are saved in meta project 440.

Figure 13:
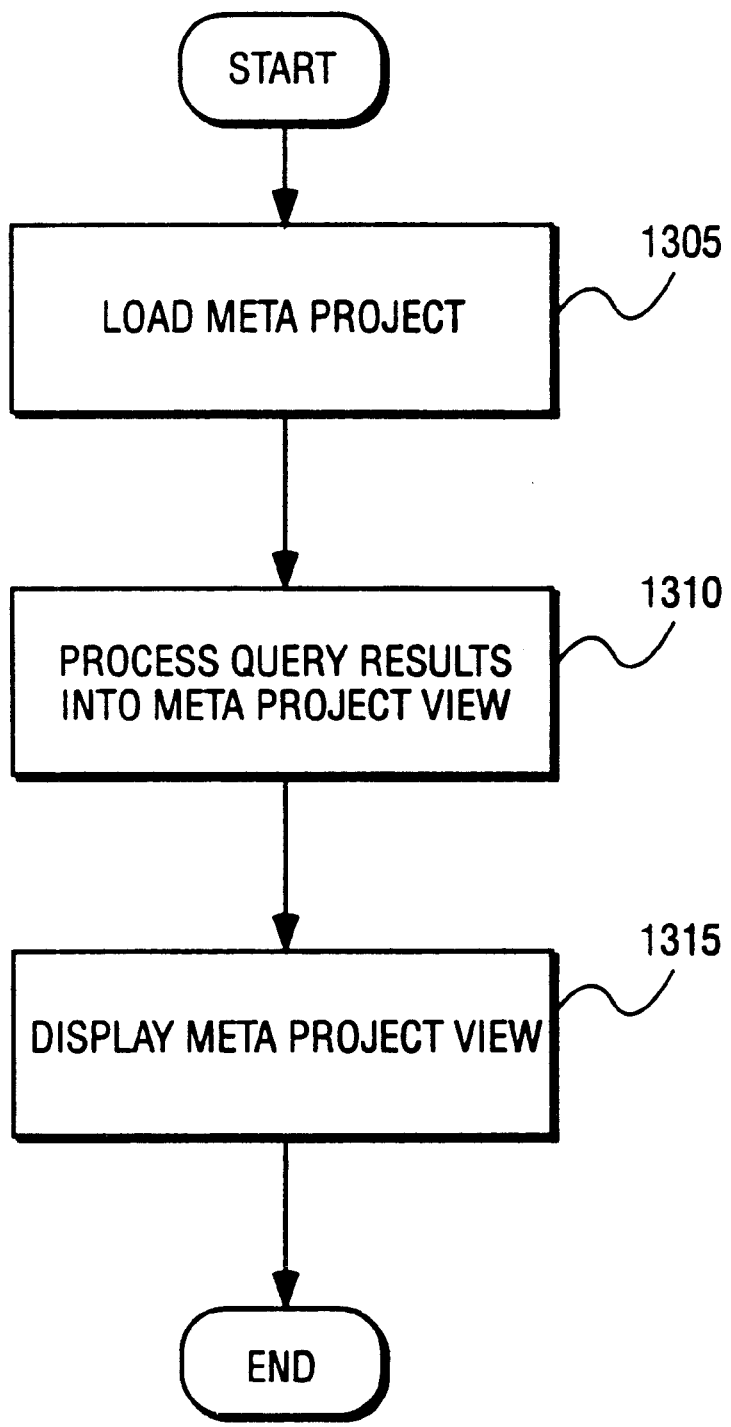
FIG. 13 is a flow diagram for the processing of meta objects.

FIG. 13 is a flow diagram for the processing of meta objects 500. Initially at processing block 1305, a meta project 440 is loaded from meta data 260. Each meta object 500 within the meta project 440 is retrieved and the source 510 for the meta object 500 is accessed. The meta layout 445 for the meta project 440 is placed in layout 605. Relationship 515 is queried and relationships 515 for each data item are built and placed in query results 610. Query results 600 are passed to server routines 220.

At processing block 1310, query results 600 are processed, together with the specific layout 605 and view created by the user for the meta object project 440. The meta objects 500 are processed to create the structure of the project 440 and displayed in the structure area 705. Each data item within the nodes of the meta object 500 are accessed from query results 600 and displayed in context area 710 using layout 605. A content for the meta object project 440, if available, is retrieved and displayed in content area 715. At processing block 1315, the entire view 1100 is displayed on client 106.

As the user accesses any node within structure 705 or layout context of a particular data item within context 710, the corresponding structure 705 or context 710, or content 715 changes. For example, if a specific meta object 500 is associated with a particular content 520, when that meta object 500 is accessed either within the structure 705 or context 710 areas, the particular content is retrieved and displayed in content area 715. The user may navigate through the data structure either through the structure 705 or context 710 areas. As the user accesses the different areas, the data is continuously updated from the data sources. Referring to FIG. 7, as the user accesses any of the meta data objects 1, 2, 3, or 4 as shown in the structure area 705, the context 710 area is updated with new source data. In addition, the particular area viewed within context area 710 is changed. Thus, at an initial start-up, the context area 710 is built from the root node of the meta data. Once a user selects a new node within the data structure, that node is used as the root node for display in contact area 710. In one embodiment, the root node is used to begin displaying data from the center of the context area, based upon the 3D representation, for the particular facet. In an alternate embodiment, the root node may begin to be displayed at the upper left corner, of the right corner, lower left corner, lower right corner, or any area within the 3D representation within context area 710.

Data displayed in the content area 715 may be represented in a variety of formats, such as, for example, HTML or XML. Server routines 220 translate the various data formats into a format suitable for display in content area 715.

Figure 14:
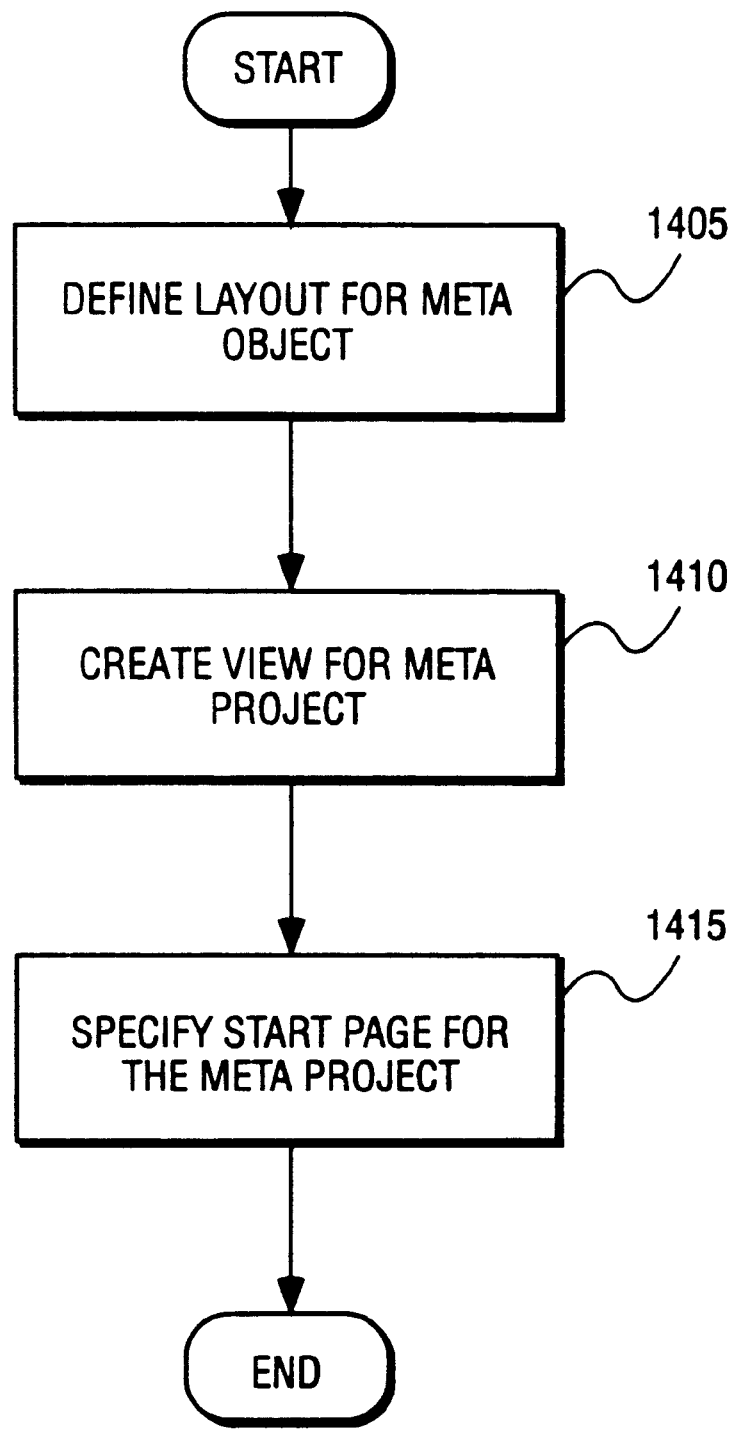
FIG. 14 is a flow diagram for the creation of a layout and a view of a meta object project.

FIG. 14 is a flow diagram for the creation of a layout and a view of a meta project 440. Referring to FIG. 14, initially at processing block 1405, meta layout 445 for the meta object 500 is defined. A predefined facet 1020 or layout is selected for the meta layout 445 of the meta object 500. In an alternate embodiment, the facet 1020 may be created at this time. Nodes within the created and tagged meta objects 500 are associated with given specific areas within the facet 1020. During the runtime display, the data items within the nodes are each displayed within the facet areas. In addition, a scripting language area may be used to create content links to the content of the data.

At processing block 1410, a view of the meta object project 440 is created. The structure layout of a project 440 is defined by selection from a list of prespecified structures. In an alternate embodiment, a user may specify specific structure. Such structures include, for example, hierarchical tree structures. In addition, the context of the data structure is selected, the user selects the specific three dimensional display representation for displaying the facets of the data. Such context facets include, for example, cube structure, sphere structure, or the like.

At processing block 1415, the user may specify a start page for the meta project 440. The start page is used for a distributed application of the above embodiments to initially access the meta project 400 at runtime. In alternate embodiments, other methods of access may be used.

Figure 15:
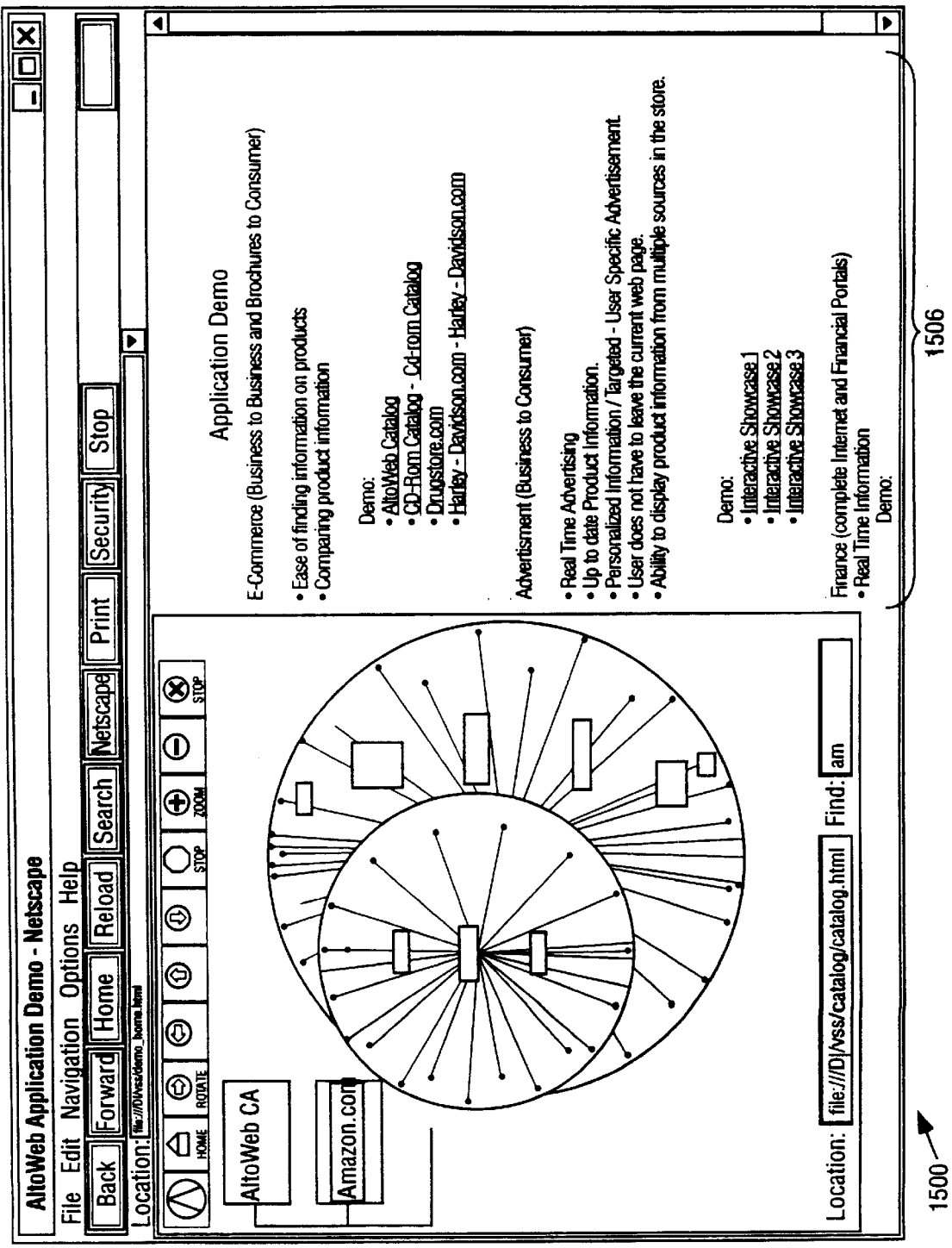
FIGS. 15–25 illustrate exemplary windows for the display of meta objects.

FIG. 15 illustrates an exemplary window for the display of meta objects 1500. Referring to FIG. 15, window 1500 shows the structure 1502, context 1504 and content 1506 for a web page. In the FIG. 15 example, the web page illustrates a number of e-commerce stores that may be accessed. Structure 1502 is a hierarchical data structure of tagged meta objects indicating the various stores within the data structure. Context 1504 illustrates a sphere 1508 with the variety of stores indicated on the sphere and a second sphere 1510 illustrating the context of an access store from sphere 1508. Content 1506 illustrates exemplary information that may be shown for a given structure 1502 or context 1504.

Figure 16:
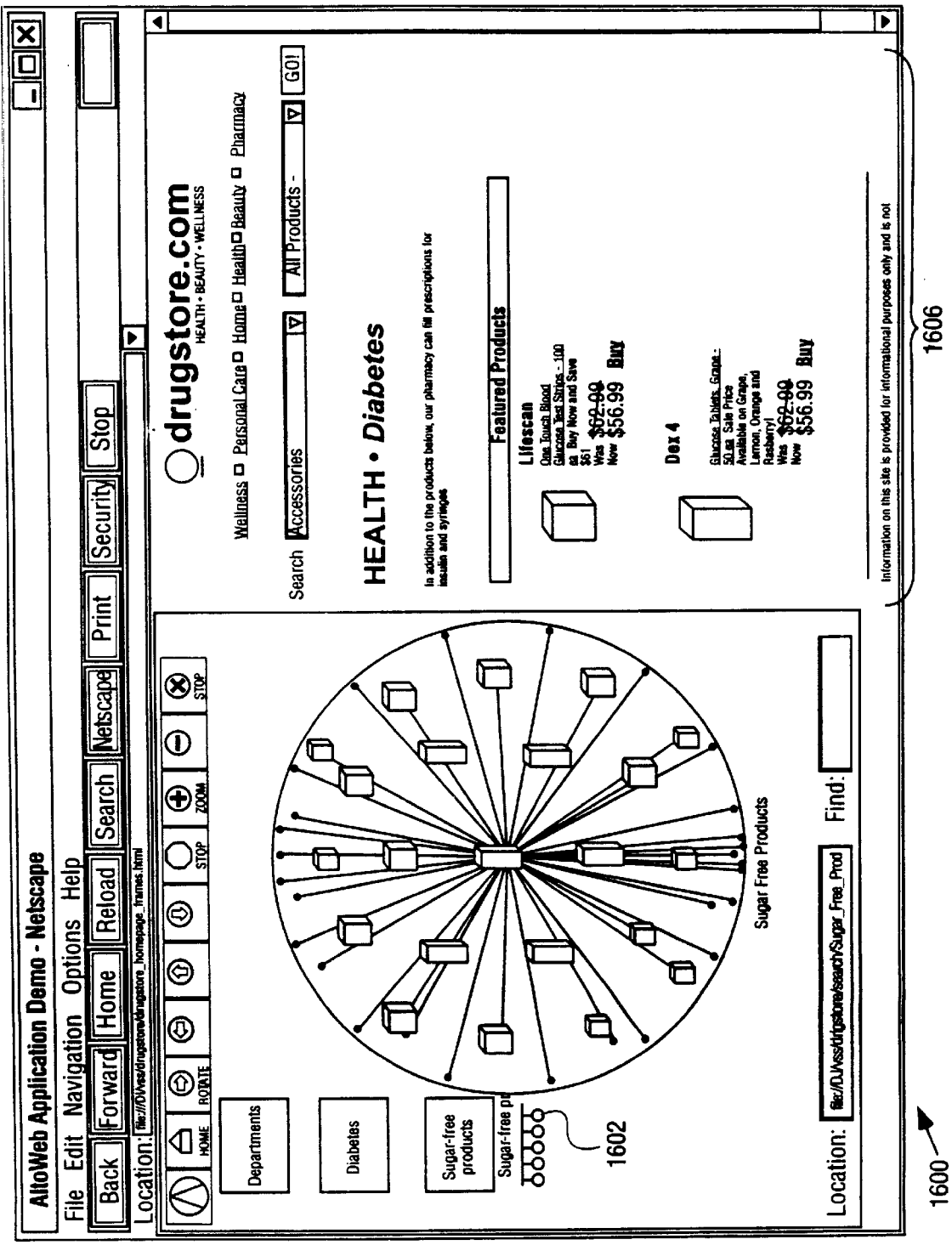

FIG. 16 illustrates an exemplary window for the display of meta object 1600. Window 1600 illustrates structure 1602, context 1604, and content 1606 for a selected stored from the FIG. 15 example. Within structure 1602, a subcategory within the store category for sugar-free products has been selected. Within context 1604, the sugar-free products are illustrated on a sphere. After accessing this particular product within context 1604 or structure 1602, content 1606 is shown on the right side of window 1600. In the FIG. 16 example, structure 1602 and context 1604 is illustrated for a parsed hypertext web page.

Figure 17:
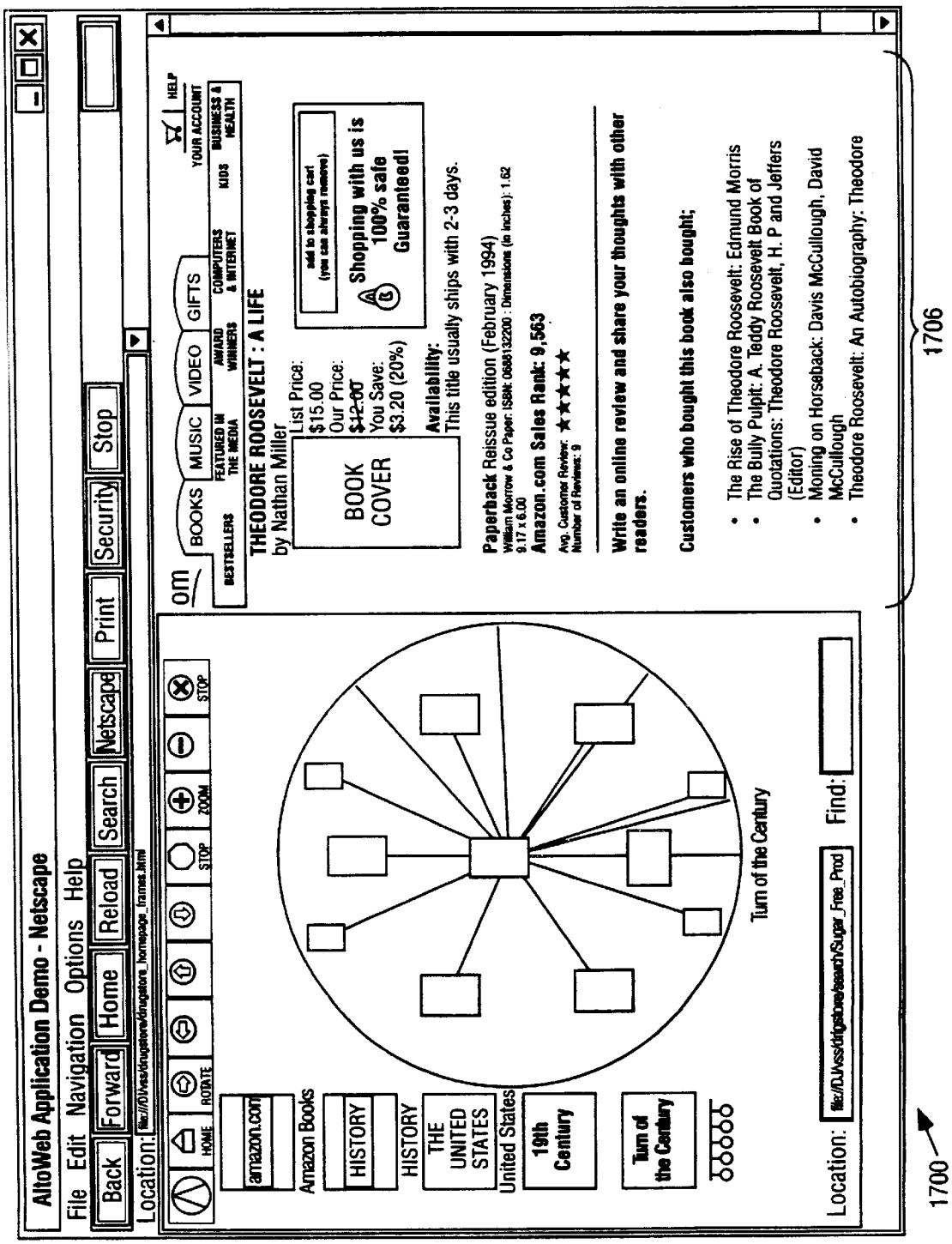

FIG. 17 illustrates an exemplary window for the display of meta objects 1700. Referring to FIG. 17, window 1700 includes structure 1702, context 1704, and content 1706. A FIG. 17 illustration indicates a bookstore and is a parsed representation of a particular hypertext web page.

Figure 18:
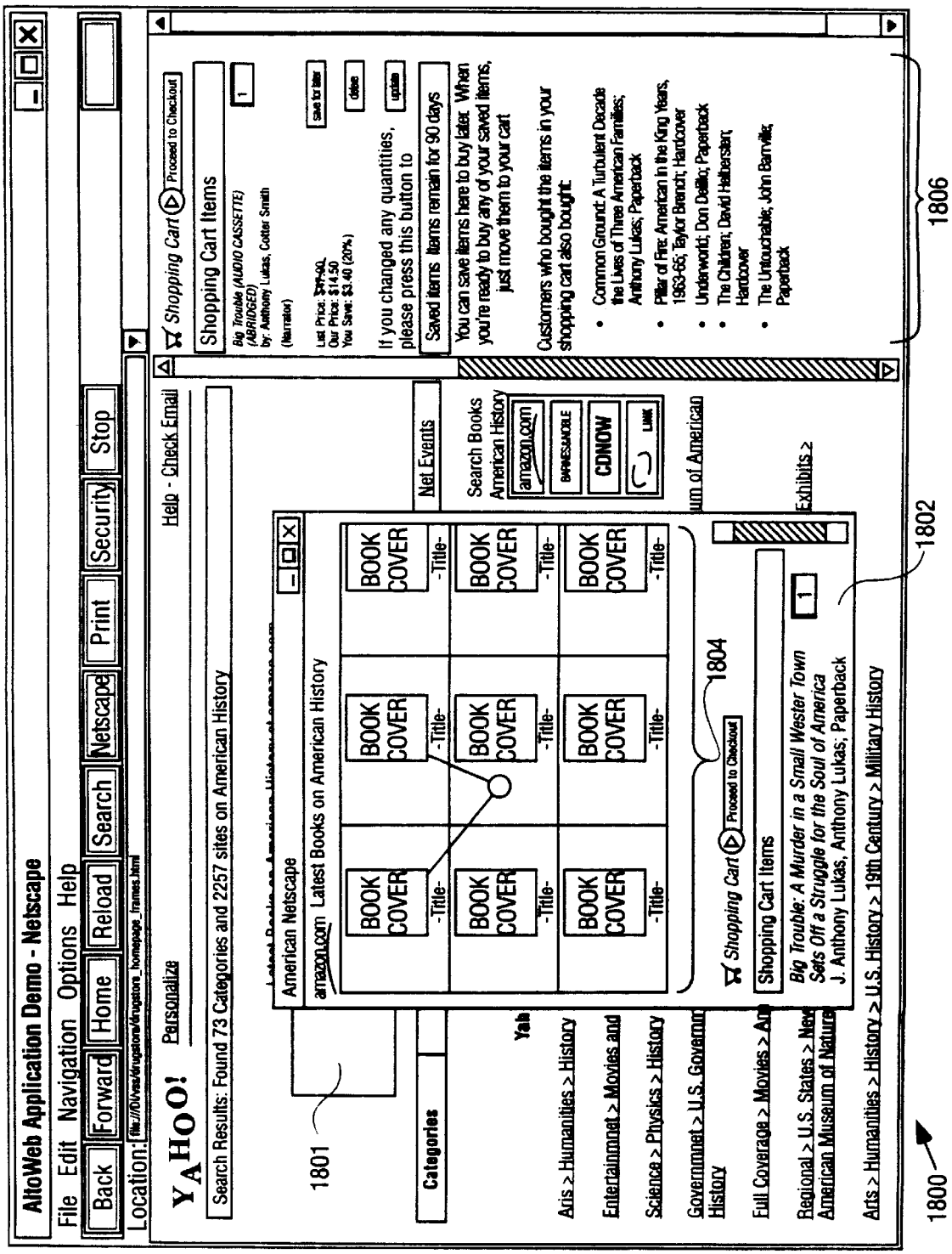

FIG. 18 illustrates an exemplary window for the display of meta objects from a hypertext web page 1800. Web page 1800 is accessed in a banner ad 1801, illustrates or displays a banner ad for a particular web page. As the user accesses the web page 1800 through the banner ad 1801, a pop-up window 1802 is displayed illustrating the context 1804 of the parsed web page represented or linked to the banner ad 1801. In addition, the FIG. 18 example illustrates content 1806 area for the accessed context 1804.

Figure 19:
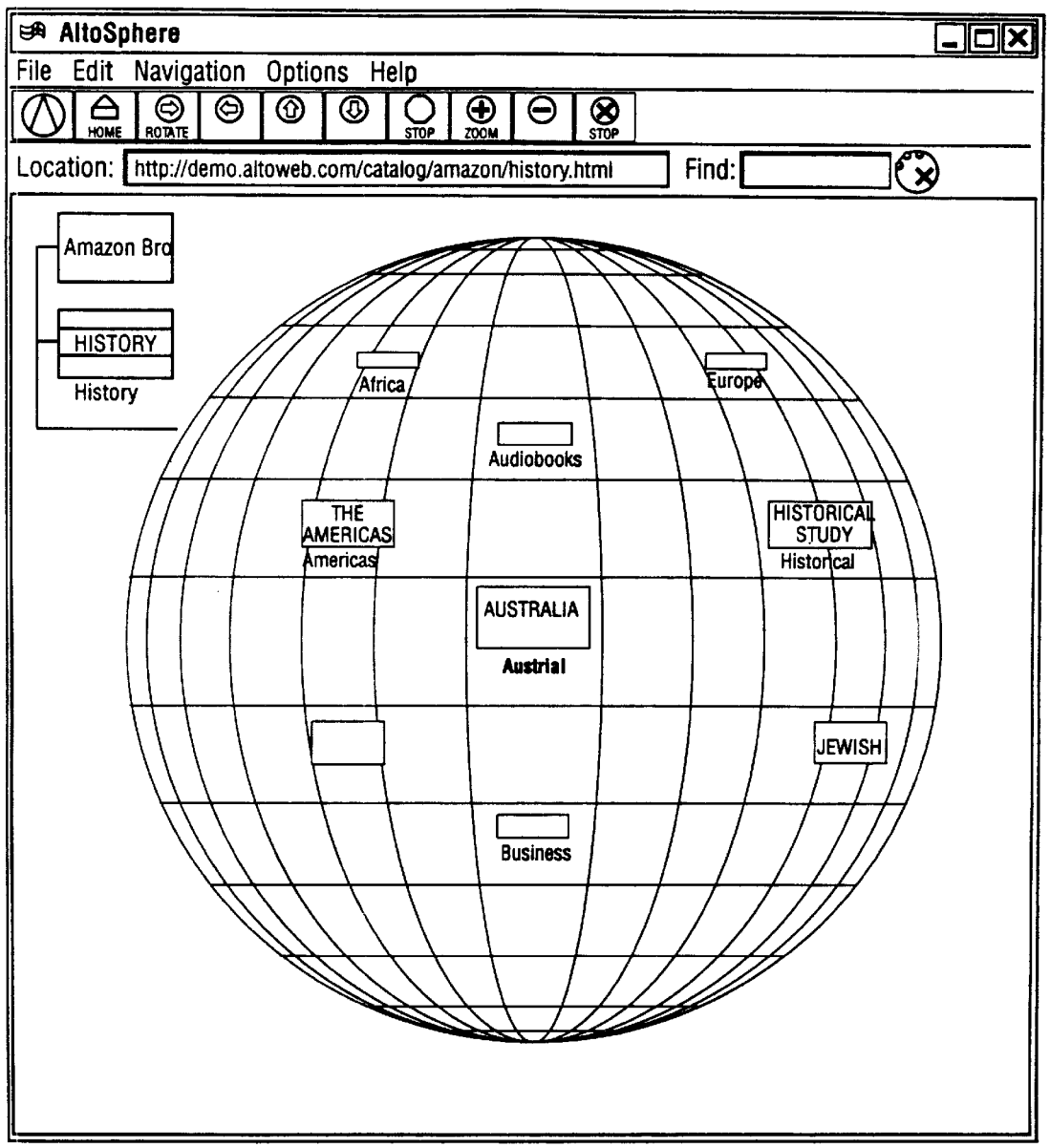

FIG. 19 illustrates an exemplary window for the display of meta objects utilizing a sphere structure. FIG. 19 example includes structure 1902 and context 1904. In the FIG. 19 example, no content is shown for the context and structure. A user may access various areas of the linked meta objects through either structure 1902 or context 1904. As the user navigates around the globe, the view within context 1904 will change. In addition, as the user navigates through structure 1902, context 1904 will change and the various components shown on the sphere or globe will change accordingly.

Figure 20:
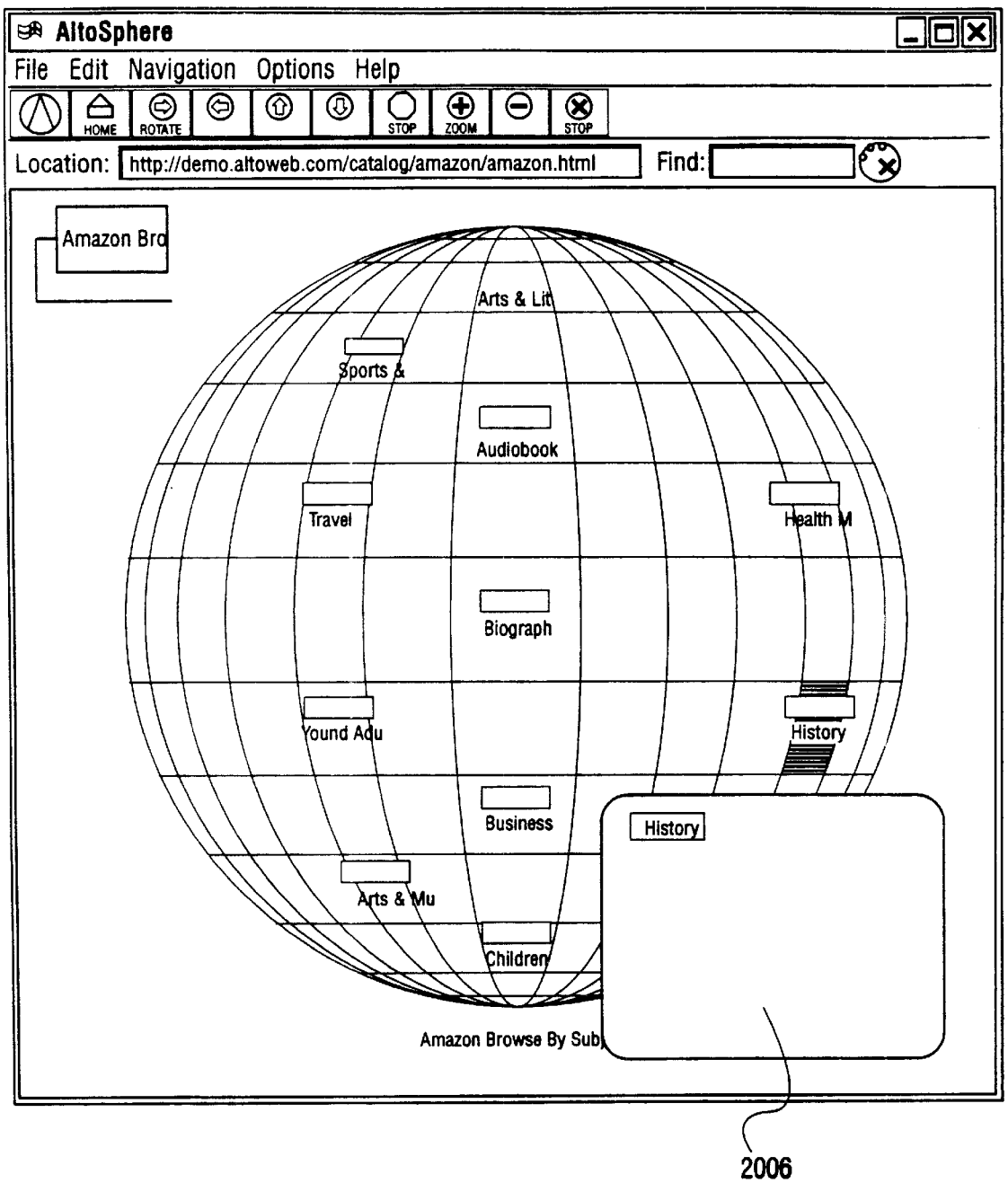

FIG. 20 illustrates an exemplary window for the display of meta objects using a globe display. FIG. 20 illustrates a structure 2002, context 2004, and pop-up content window 2006. In this example, the user may access various components of the meta object through either structure 2002 or context 2004. As the user navigates through either, the display on the globe will change depending on the location within the linked meta objects. As the user accesses a given component of the meta object either in structure 2002 or context 2004, a content pop-up screen 2006 may appear for that given object.

Figure 21:
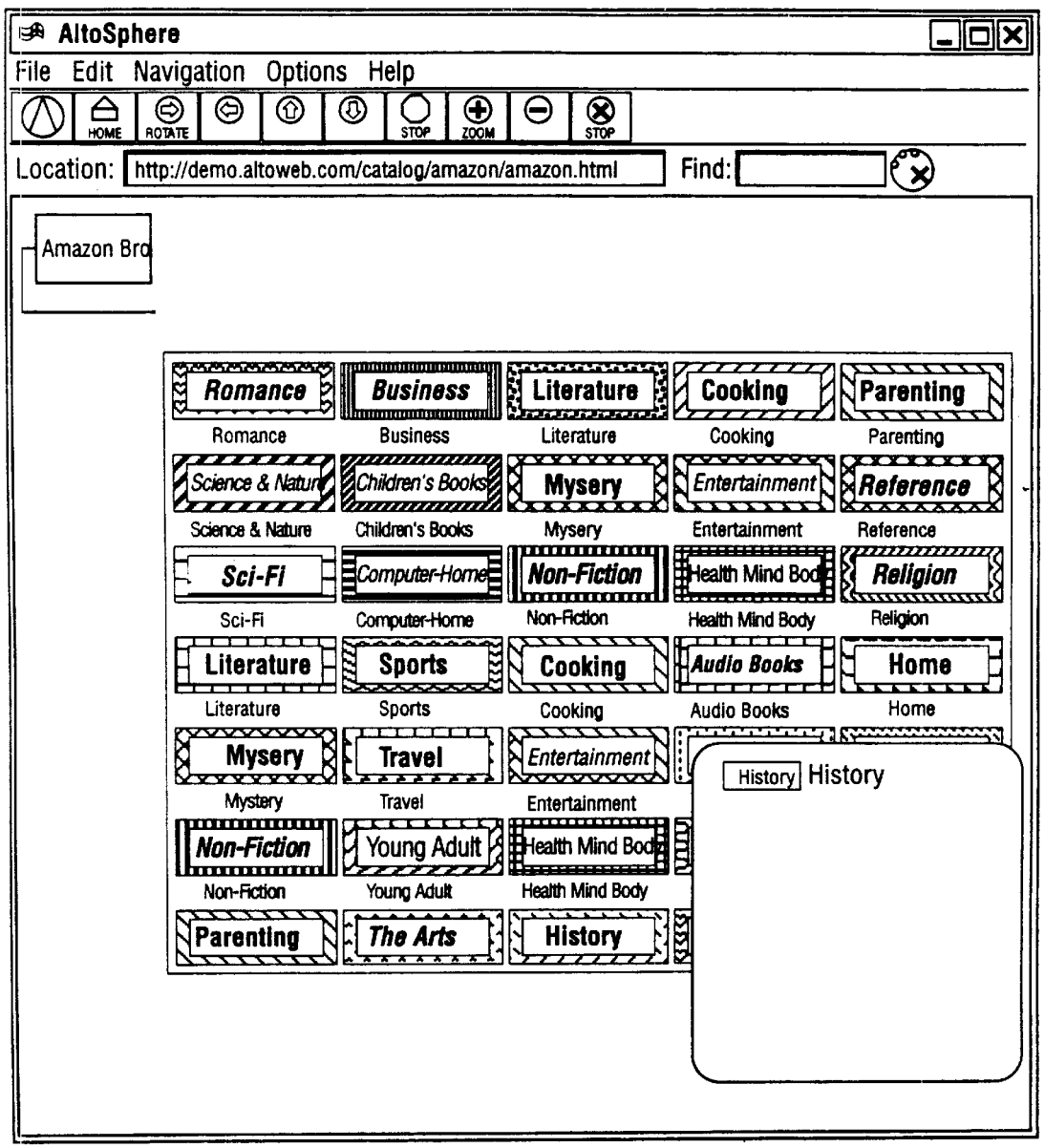

FIG. 21 illustrates an exemplary window for the display of meta objects using a cube structure. FIG. 21 includes structure area 2102, context 2104 and pop-up content 2106. As the user navigates through either context 2104 or structure 2102, the display within both changes depending on the location accessed within the data structure. As the user accesses particular areas within the data structure, either through context 2104 or structure 2102, content pop-up window 2106 may be displayed indicating the content or additional information of the various areas displayed and accessed.

Figure 22:
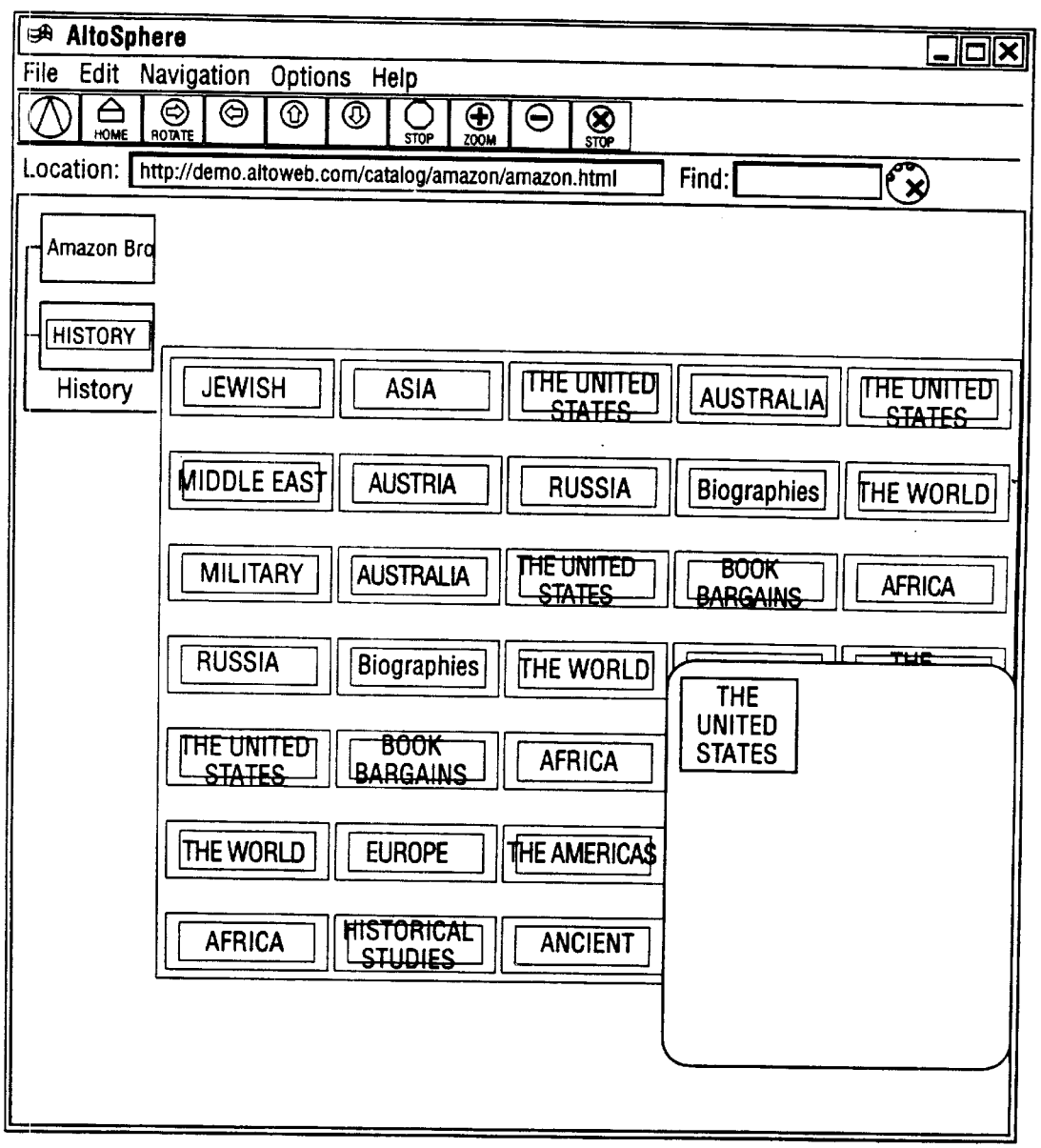

FIG. 22 illustrates an exemplary window for the display of meta objects using a cube structure. FIG. 22 includes structure area 2202, context 2204, and content pop-up window 2206. As the user navigates through the system of the meta objects, various displays may be shown. For example, referring again to FIG. 21, as the user navigates through structure 2102 or context 2104 to the history area, a new display within both structure 2202 and context 2204 may be displayed. In addition, pop-up content area 2206 displays an accessed component of the meta object. Thus, in the FIG. 21 and FIG. 22 example, the user navigates to the history area, clicks on that area, and a new context is displayed showing various components of the history component.

Figure 23:
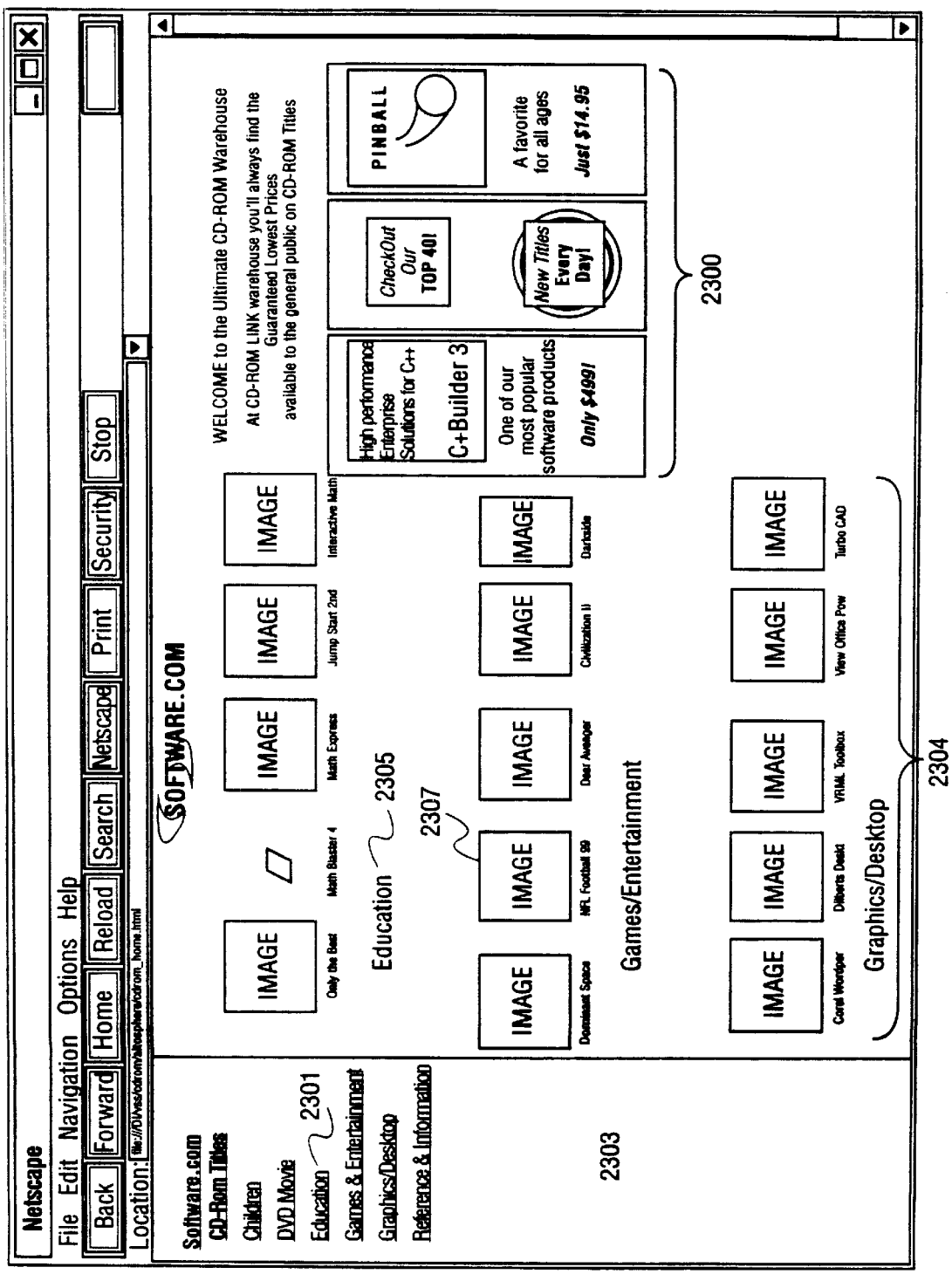

FIG. 23 illustrates an exemplary window for the display of meta objects using a band-like context structure. FIG. 23 includes structure 2302, context 2304, and content 2306. Structure 2302 includes the linked meta object hierarchical data structure created by the system of the embodiments described above. Context 2304 illustrates the context of the given area of the data structure accessed by the user. The user may navigate through the linked meta objects either through structure 2302 or context 2304. As the user accesses a given structure 2302 or context 2304, different content may be displayed within content 2306. In this example, the user has accessed "CD ROM" titles within "software.com" as indicated in structure 2302. The bands or rows of displayed items may represent meta objects and the bands may represent a query on the meta object. For a given meta object within structure 2302, for example, education at 2301, the context 2304 will show the linked objects in a band across a display area, as for example, education at 2305.

Figure 24:
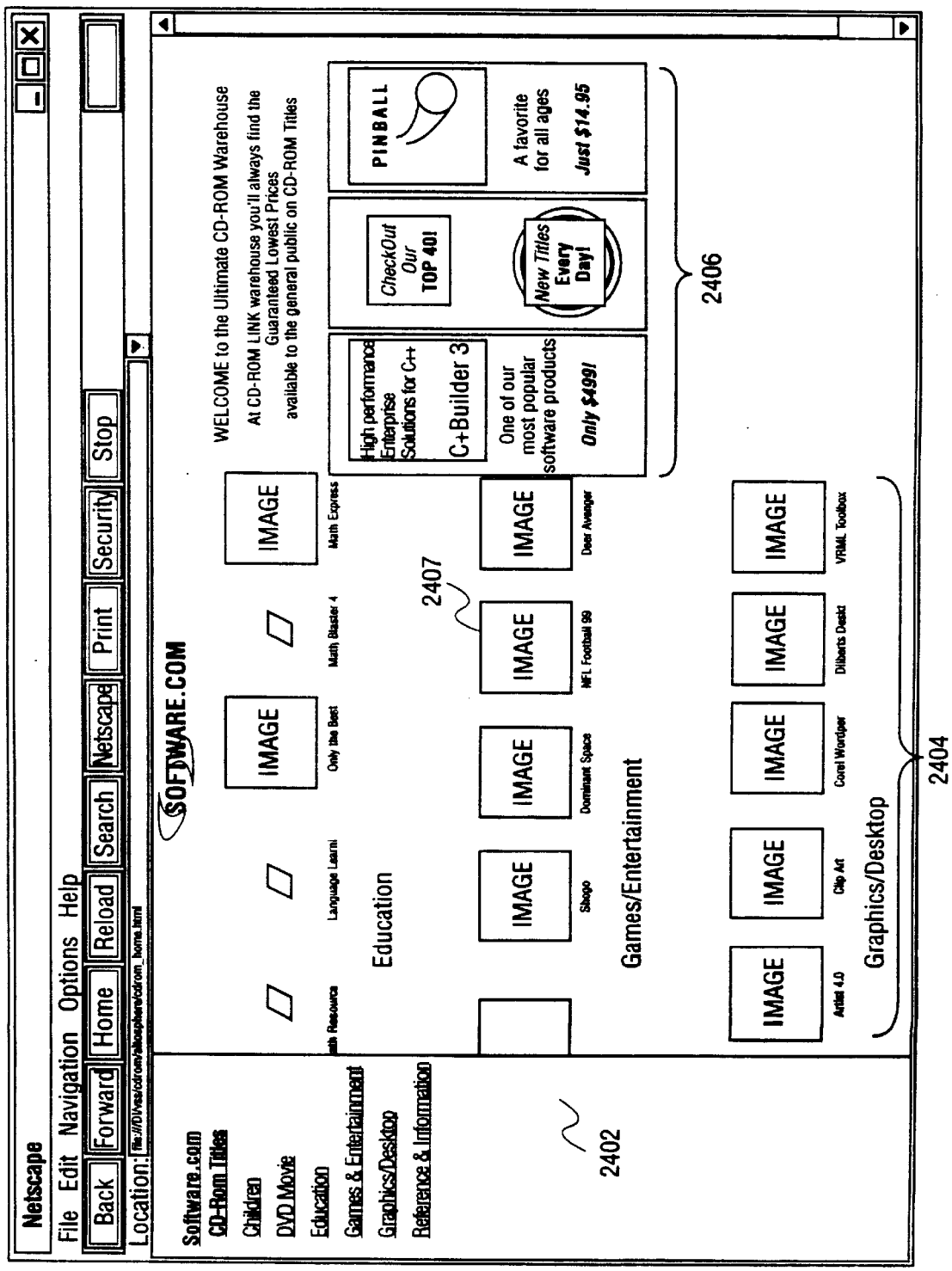

FIG. 24 illustrates an exemplary window for a display of meta objects using a band-like 3D representation. FIG. 24 illustrates the movement of the context 2404 as the user navigates through either structure 2402 or context 2404. In this example, as the user manipulates the display of context 2304 with either keyboard movement or mouse movement, the display within context 2404 shifts to the right. Thus, element 2307 shifts two positions to the right as shown in 2407.

Figure 25:
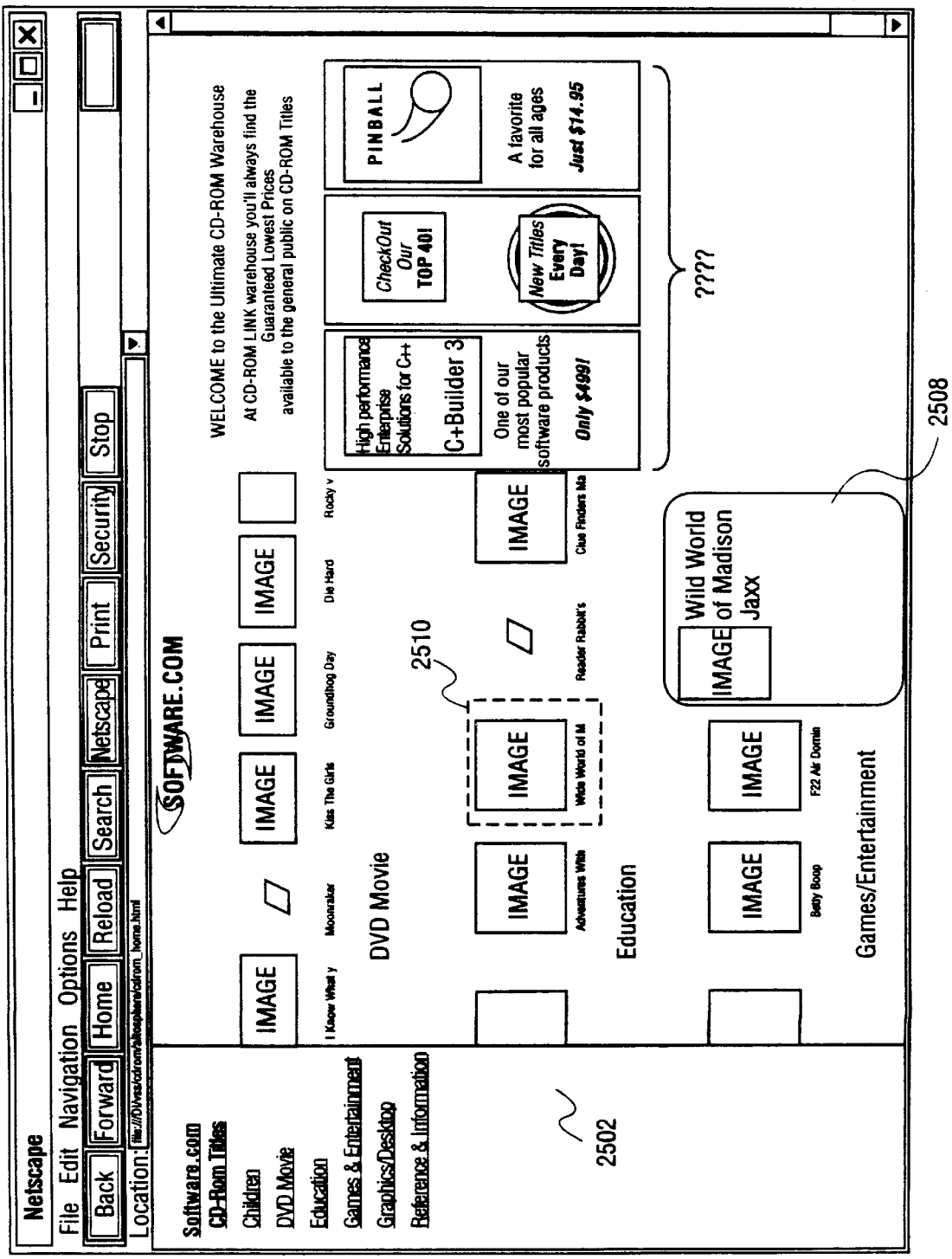

FIG. 25 illustrates an exemplary window for the display of meta objects in a band-like 3D representation. FIG. 25 is a continuation of FIG. 23 and FIG. 24 in which the user has accessed a particular item 2510 and a pop-up content window 2508 is displayed for the accessed element 2510.

Figure 26:
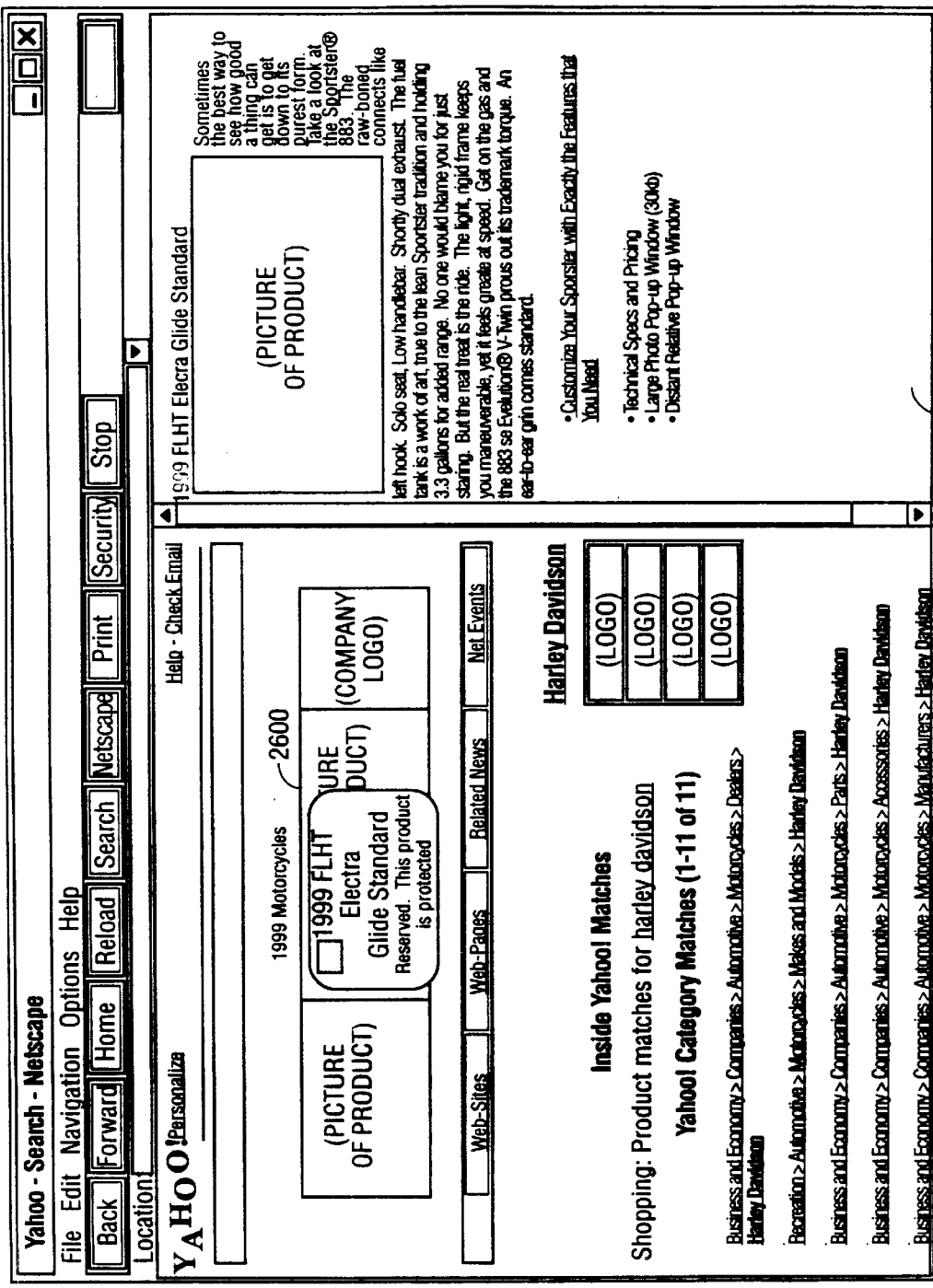
FIG. 26 illustrates an exemplary window for the display of meta objects from a banner ad.

FIG. 26 illustrates an exemplary window for the display of meta objects from a banner ad 2600. The user accesses the banner ad 2600 which moves the context of a particular data structure across the banner ad 2600. As the user accesses a particular element within banner ad 2600, the content is displayed in content window 2606.

In one embodiment, when a web page loads with a banner ad in it, several tasks may be performed in the background. The viewer's browser is first enabled by an applet imbedded in the web page. This applet allows the end user to view the banner ad in its intended rendering without any user intervention or downloading of software. The process continues with the activation of a content pointer to a site designated by the advertiser (this may be the advertiser's website, or a host site) and retrieves the information that the advertiser has designated to be viewed on this web page. The information retrieved depends on the content or context of the web page that the banner ad resides in and/or a user profile held by the advertiser or third party. In alternate embodiments, business rules and collaborative filtering capabilities would be an optional feature. The content is determined by an advertising server, and is a real-time transaction. In this way, banner ad content may change at the discretion of the advertiser and not be subject to the administrative burden of contacting multiple agencies and target banner ad website owners.

Once the content is delivered to the banner ad space on the target web page, the viewer may view the add. The banner content may have a carrousel-like motion to it in witch the content inside the banner rotates in a horizontal direction, either from left to right, or right to left. In alternate embodiments, the banner content may move in any direction. As stated above, this content is delivered to the web site by the ad server of the advertiser or host, and may consist of large amounts of information in a visual format. The information may be rendered in frames, each frame representing a different product, and those product would revolve across the viewer's web page in the banner space provided, without any interaction on the part of the end user. The ad banner is interactive, and if the end user moves their mouse over the images rotating across the screen, a pop-up window will appear, giving more information about a particular item. If a particular image is clicked upon, a new frame opens up in the end user's viewable screen, with content describing the clicked upon item. Both the additional frame of information and the pop-up box are driven from the ad server, with content originating at the advertiser site or host site. Again this gives the advertiser the ability to change content and serve it up into a banner in real-time. The new frame that opens with content on the clicked upon item is a live connection to the advertiser's site and is fully enabled to be clicked upon further for item configuration, more information, or purchasing functionality, depending on the intent of the advertiser. In this way, the advertiser gets the end user to the relevant site content, while the current page where the banner ad appears is still on the screen. The end user never leaves the site that has presented the ad banner, but has allowed the end user to visit and interact with the site of the banner advertiser.

Figure 27:
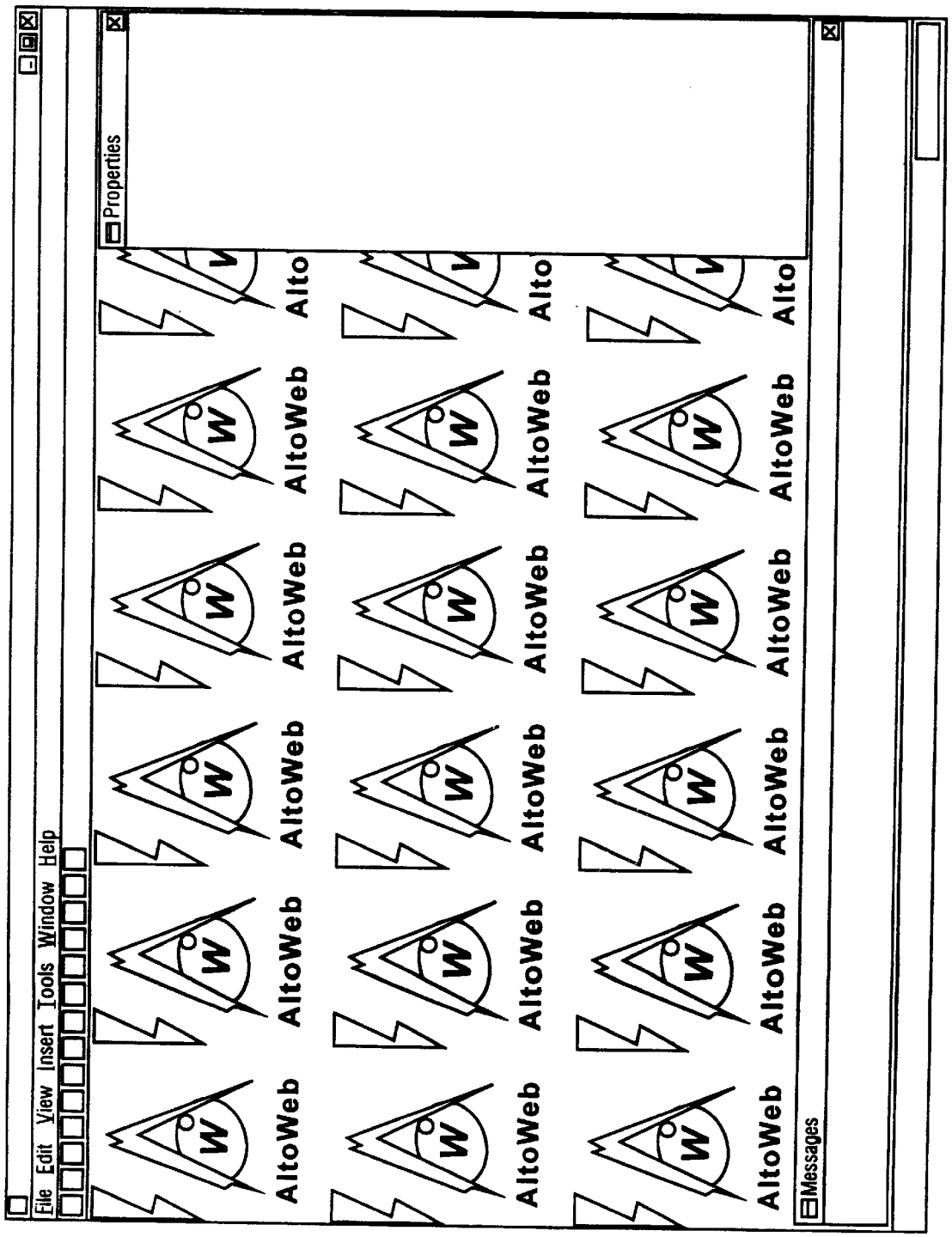
FIGS. 27–51 illustrate exemplary windows for creating and editing a meta object project.

FIGS. 27–51 illustrate exemplary windows for creating and editing a meta object project. FIG. 27 illustrates the beginning of the editing process as a blank screen.

Figure 28:
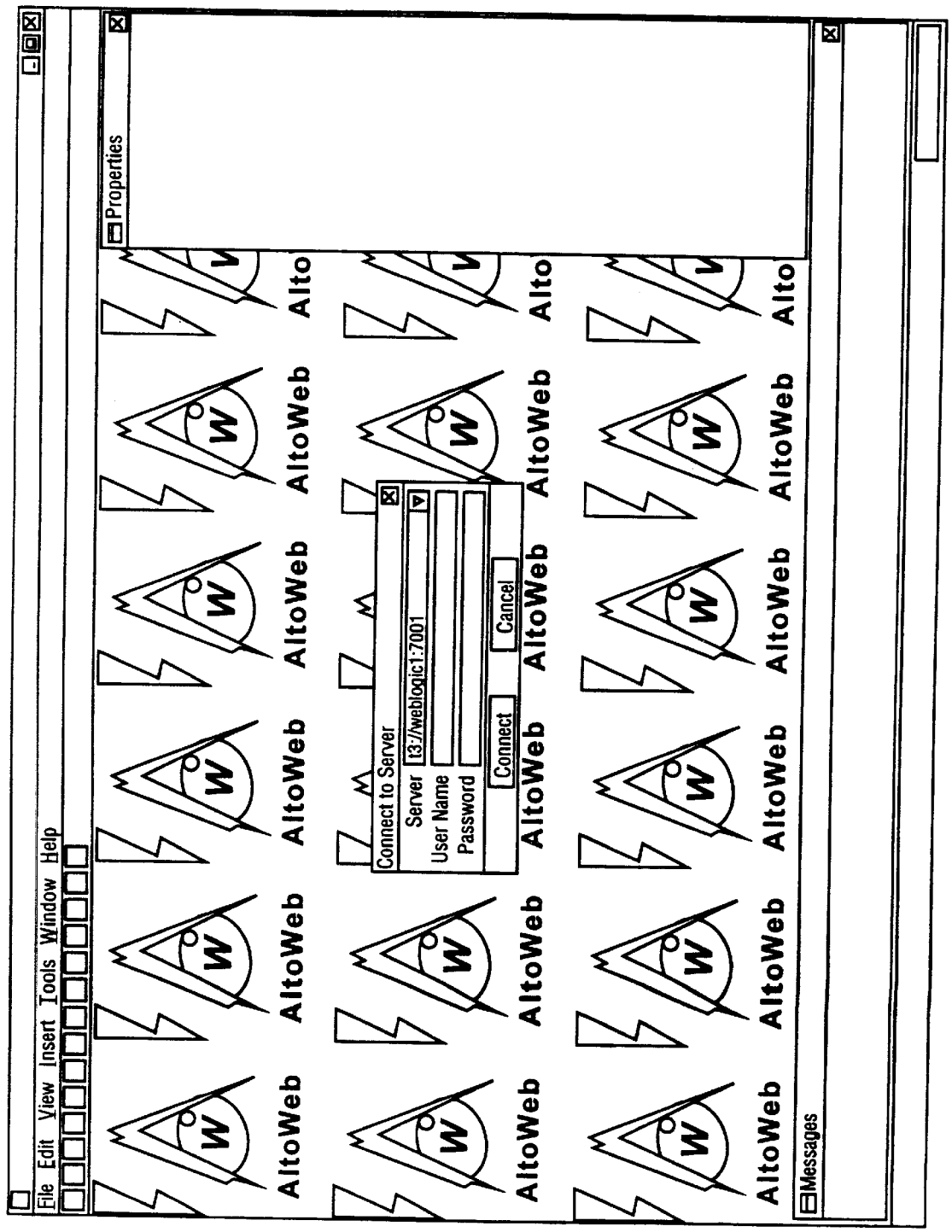

FIG. 28 illustrates the client connecting to the server through a connector server window 2802. A user connects to the server by entering a user name or password and pressing the connect button with a mouse click input.

Figure 29:
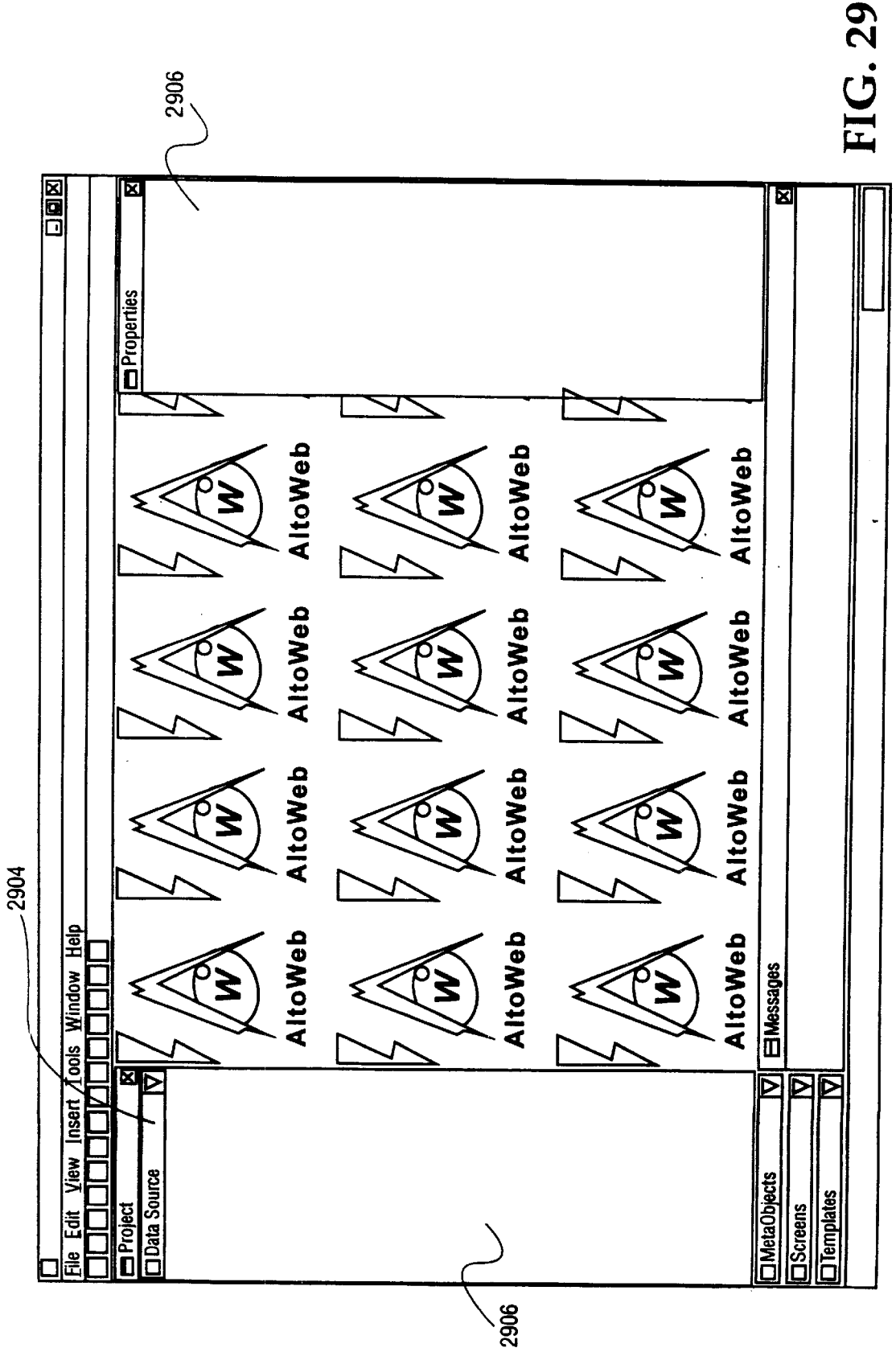

FIG. 29 illustrates the start-up of the editing and creation of a meta project after a connection has been made to server 102. Referring to FIG. 29, a project data source pull-down window 2904 is shown together with a project structure area 2902 and a project properties area 2906.

Figure 30:
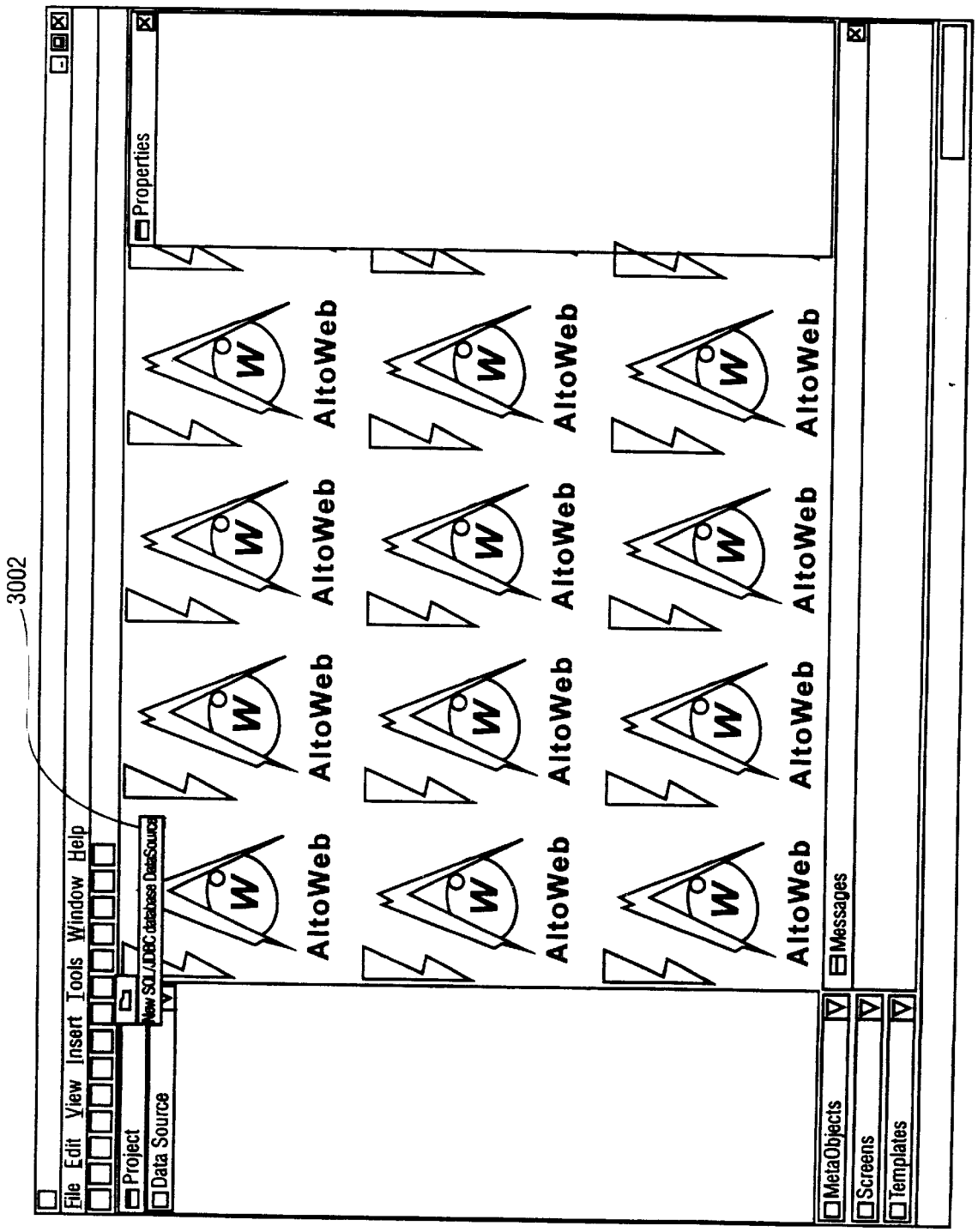

FIG. 30 illustrates an exemplary window for creating and editing a meta object project with a pull-down data source selection window 3002.

Figure 31:
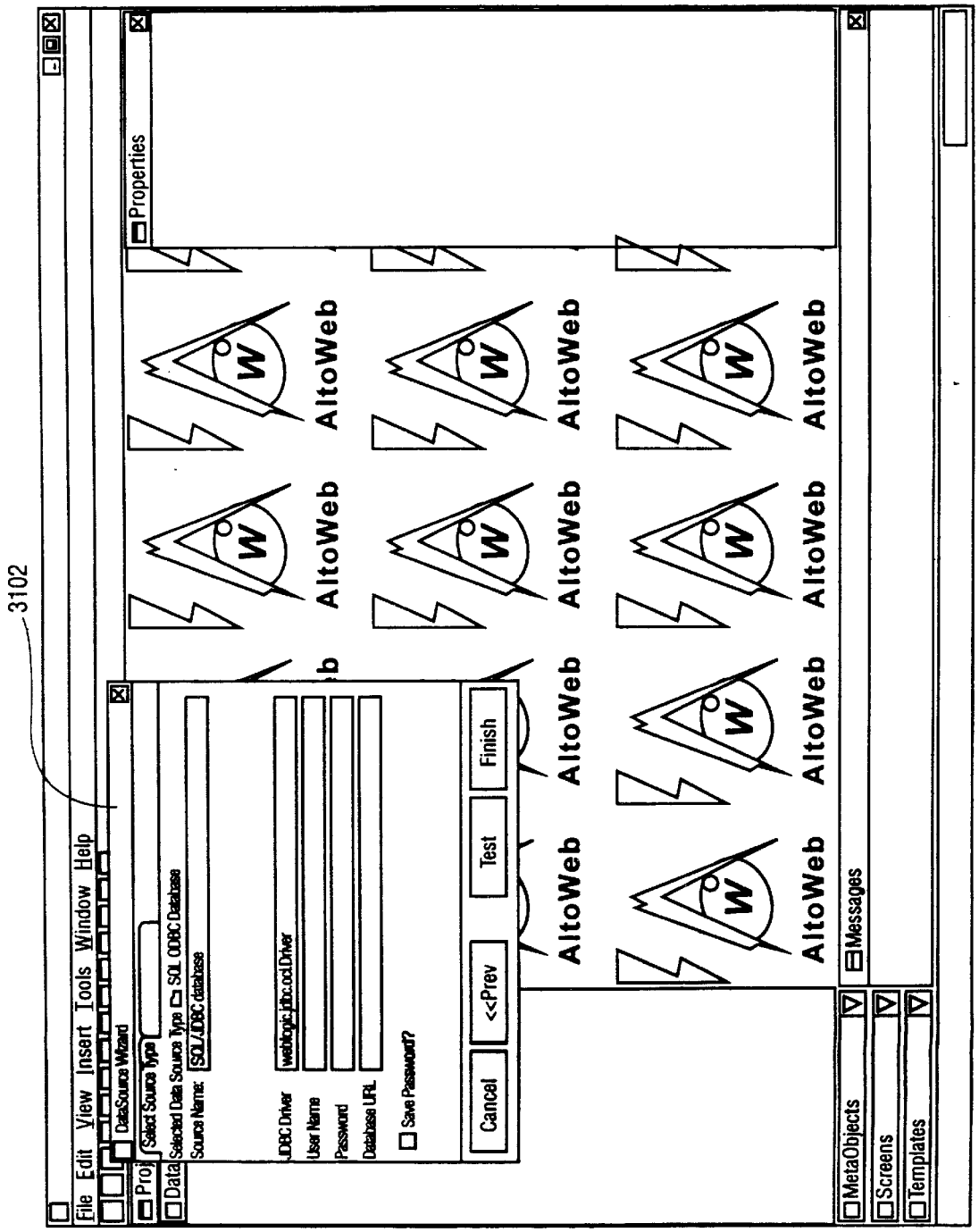

FIG. 31 illustrates an exemplary window after a data source has been selected showing a data source pop-up window 3102. Within the pop-up window 3102, the user may select the source type and the source properties as well as the source name. Alternatively, the user may indicate the location of the data source. If a user name or password is required to access the data source, the user may enter the user name or password in the appropriate fields.

Figure 32:
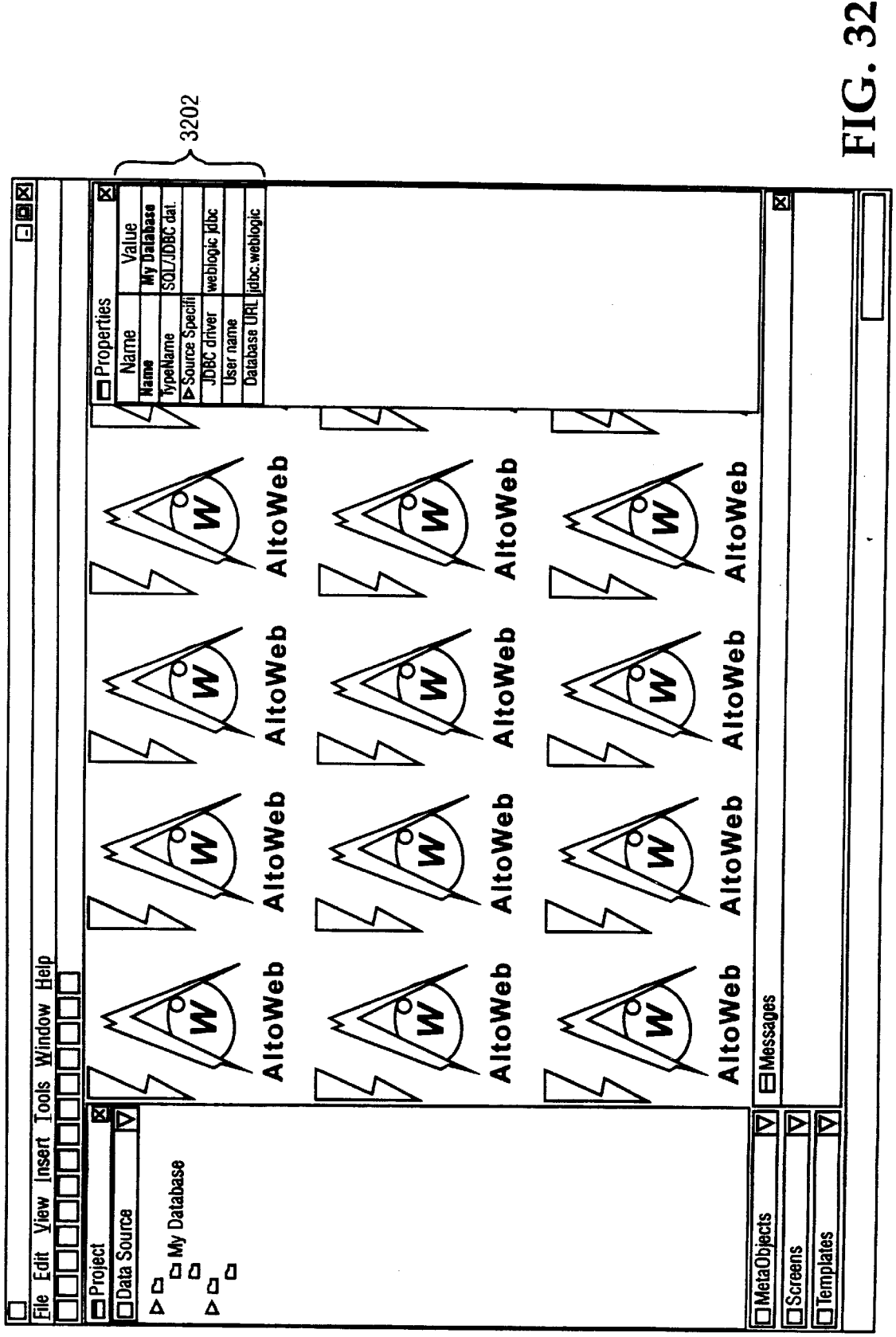

FIG. 32 illustrates an exemplary window for showing the properties of a selected data source. The properties are shown in a property window 3202.

Figure 33:
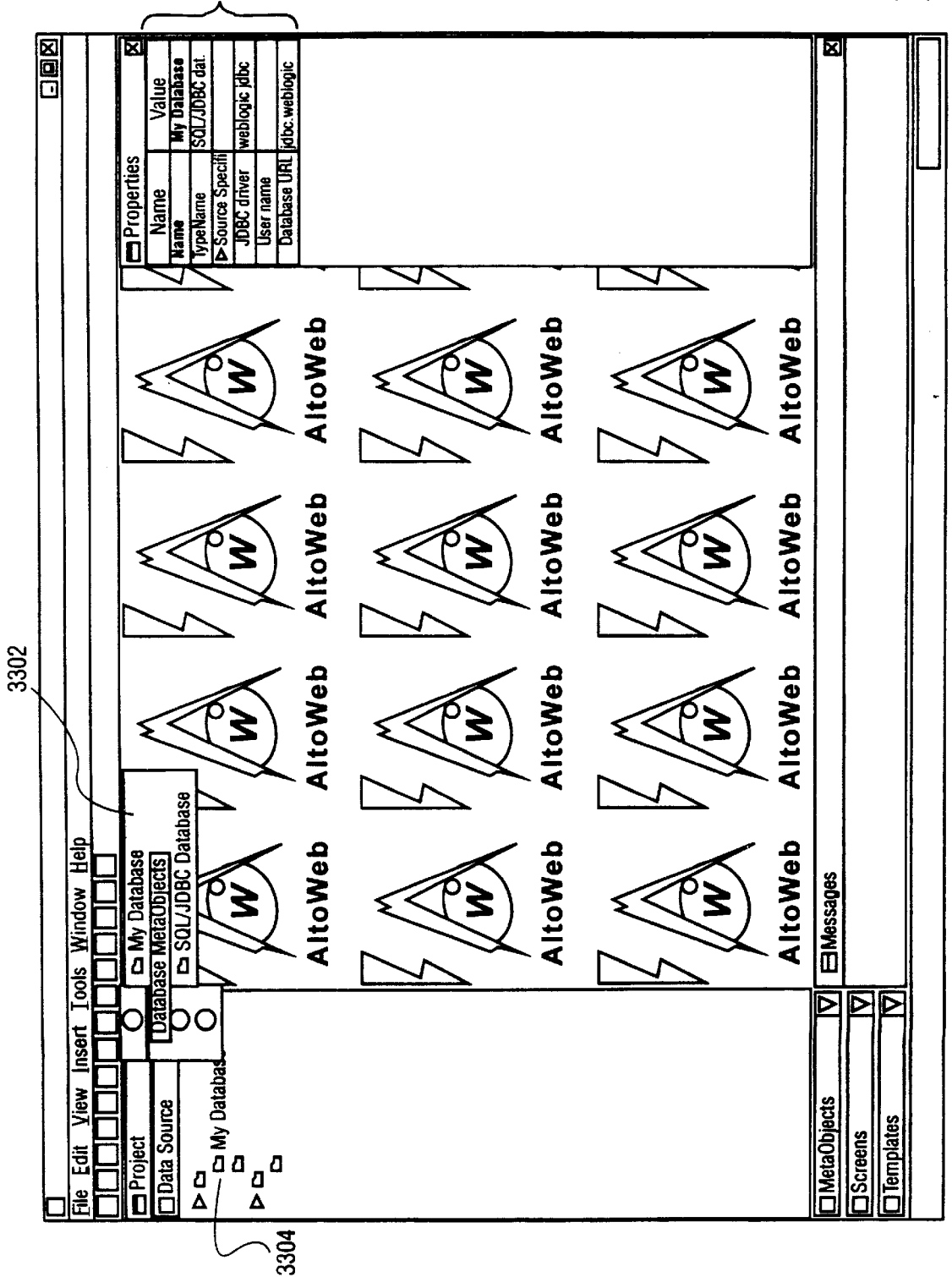

FIG. 33 illustrates an exemplary window for creating meta objects from selected data sources. The selected data sources are shown at 3304 and a pull-down meta object window is shown at 3302. By selecting the appropriate meta object data sources, the user may create the meta object relationships as described above.

Figure 34:
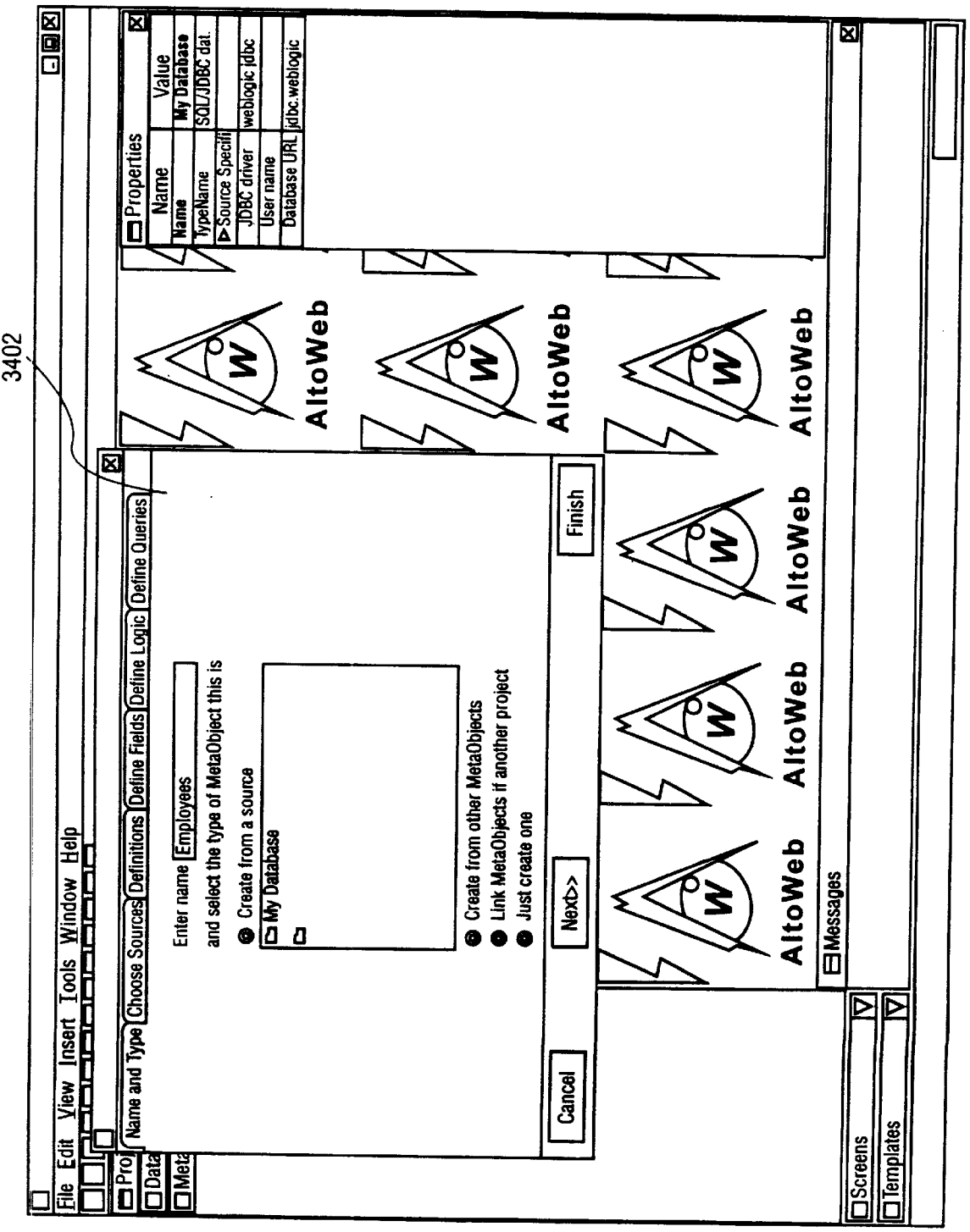

FIG. 34 illustrates an exemplary window for editing and creating meta objects within meta object pop-up window 3402. Within meta object pop-up window 3402, the user may define and create and edit appropriate meta objects and relationships between the items and meta objects. The creation of the meta objects is as described above.

Figure 35:
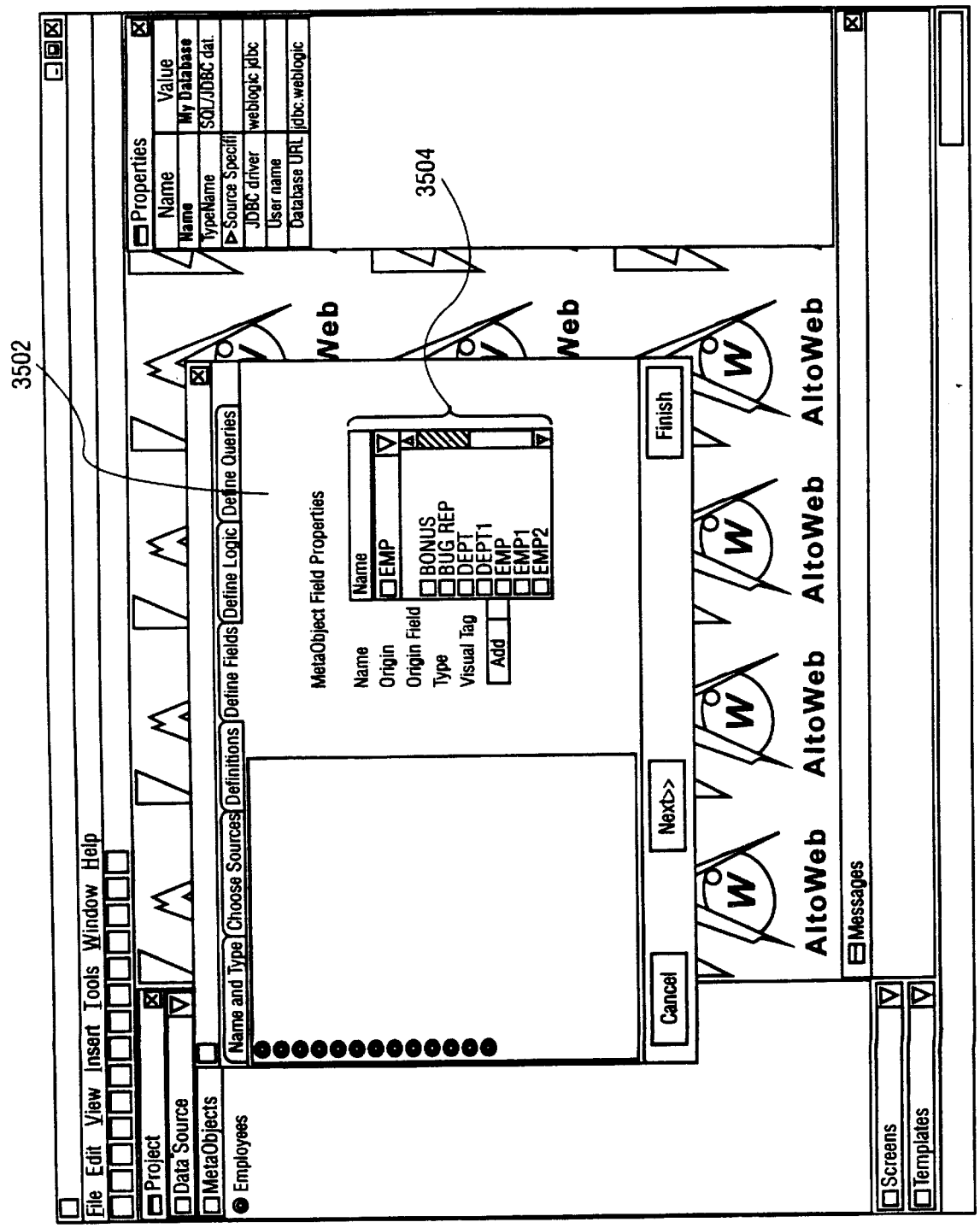

FIG. 35 illustrates an exemplary window for showing a pop-up meta object editing window 3502. In addition, the pop-up window 3502 includes a pull-down menu 3504 for the selection of field properties. Within the context of the pop-up window 3502, the user may define fields to be included in the meta object.

Figure 36:
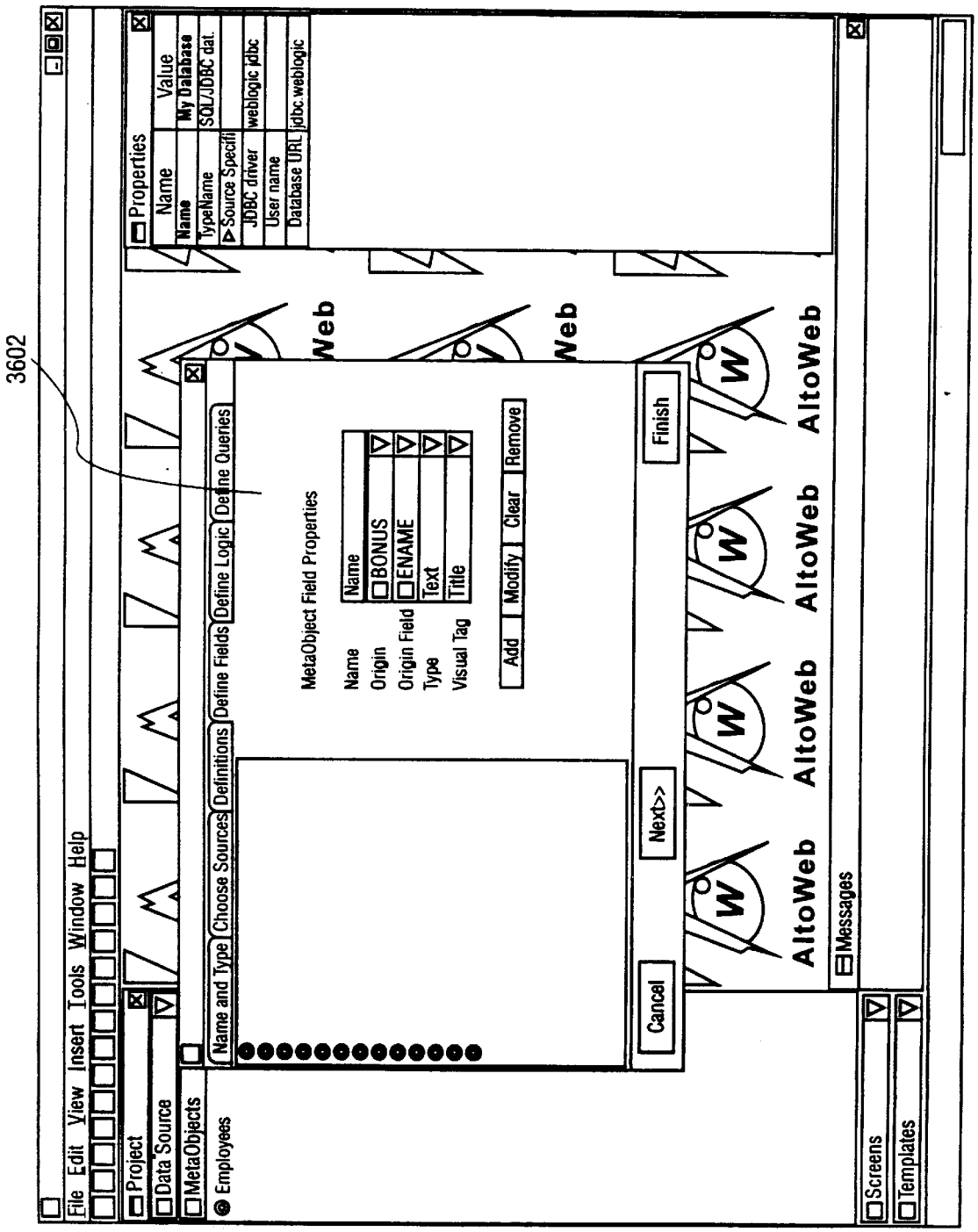

FIG. 36 illustrates an exemplary window for the defining of fields within the meta object. The window of FIG. 36 includes a pop-up meta object define fields window 3602 showing the meta object field properties for a selected meta object. In the example shown, the name of the field chosen as shown by name and the origin of the field is shown. The origin is the source from which the field has been chosen. In one embodiment, the field name of the original field chosen is shown as well as the type of data and if a visual tag is associated with the field are shown.

Figure 37:
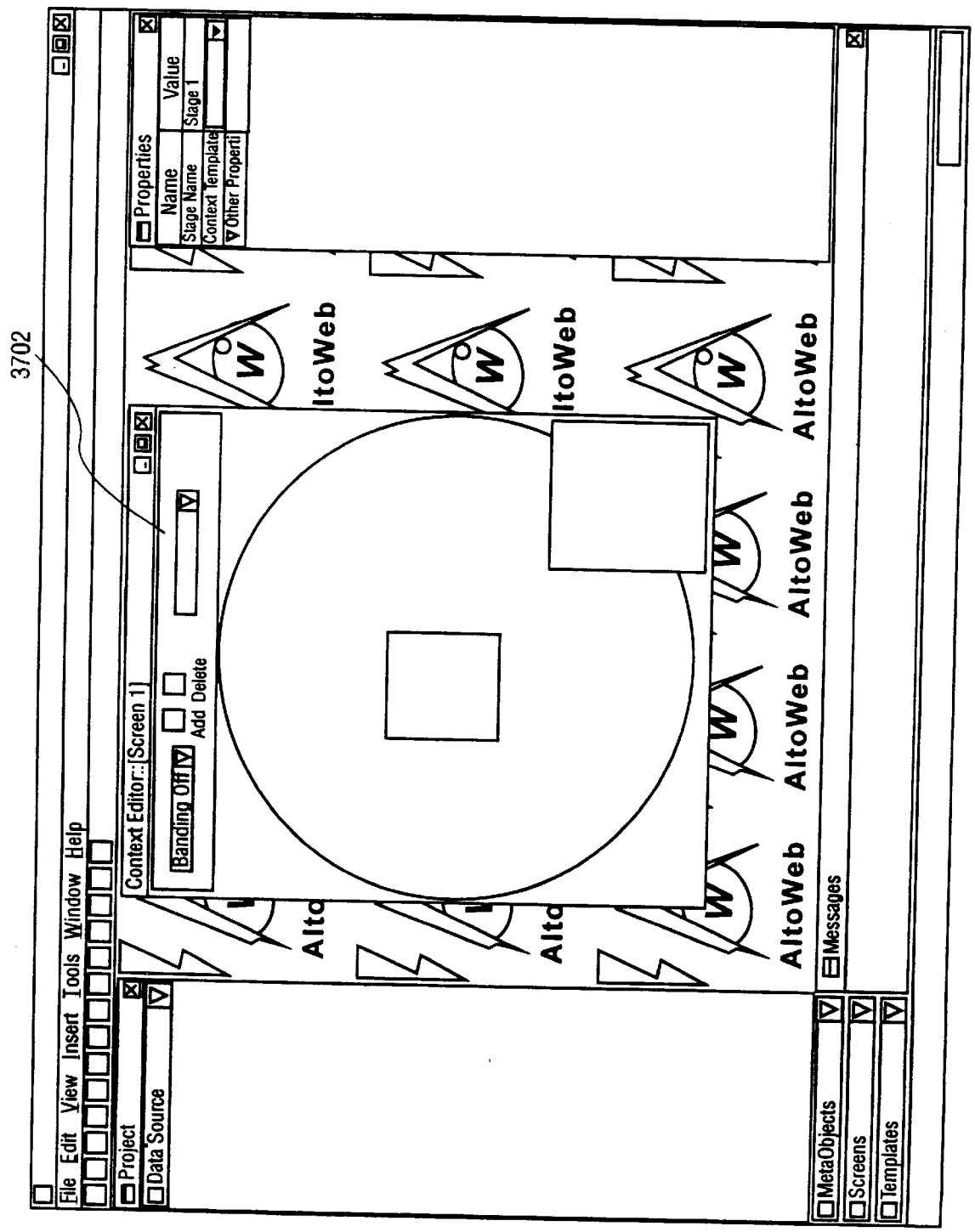

FIG. 37 illustrates an exemplary window for creating the context of the meta object. Context pop-up window 3702 indicates the type of context that the user wishes to create. The pop-up window 3702 is displayed after the user has selected the context editor from one of the pull-down menus.

Figure 38:
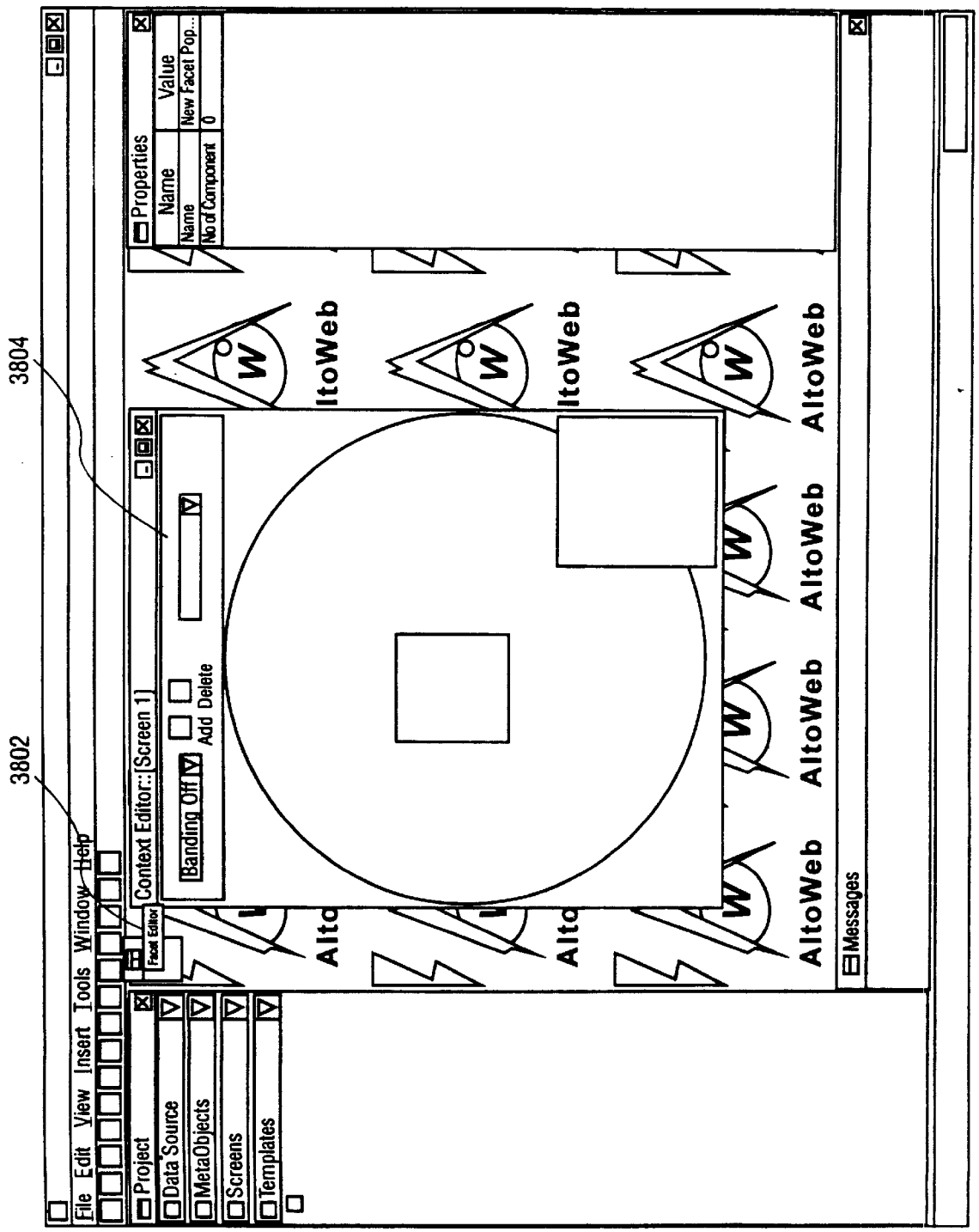

FIG. 38 illustrates an exemplary window for the editing of context and a facet editor pull-down window menu 3802. In addition, the window of FIG. 38 shows the context editor pop-up window 3804.

Figure 39:
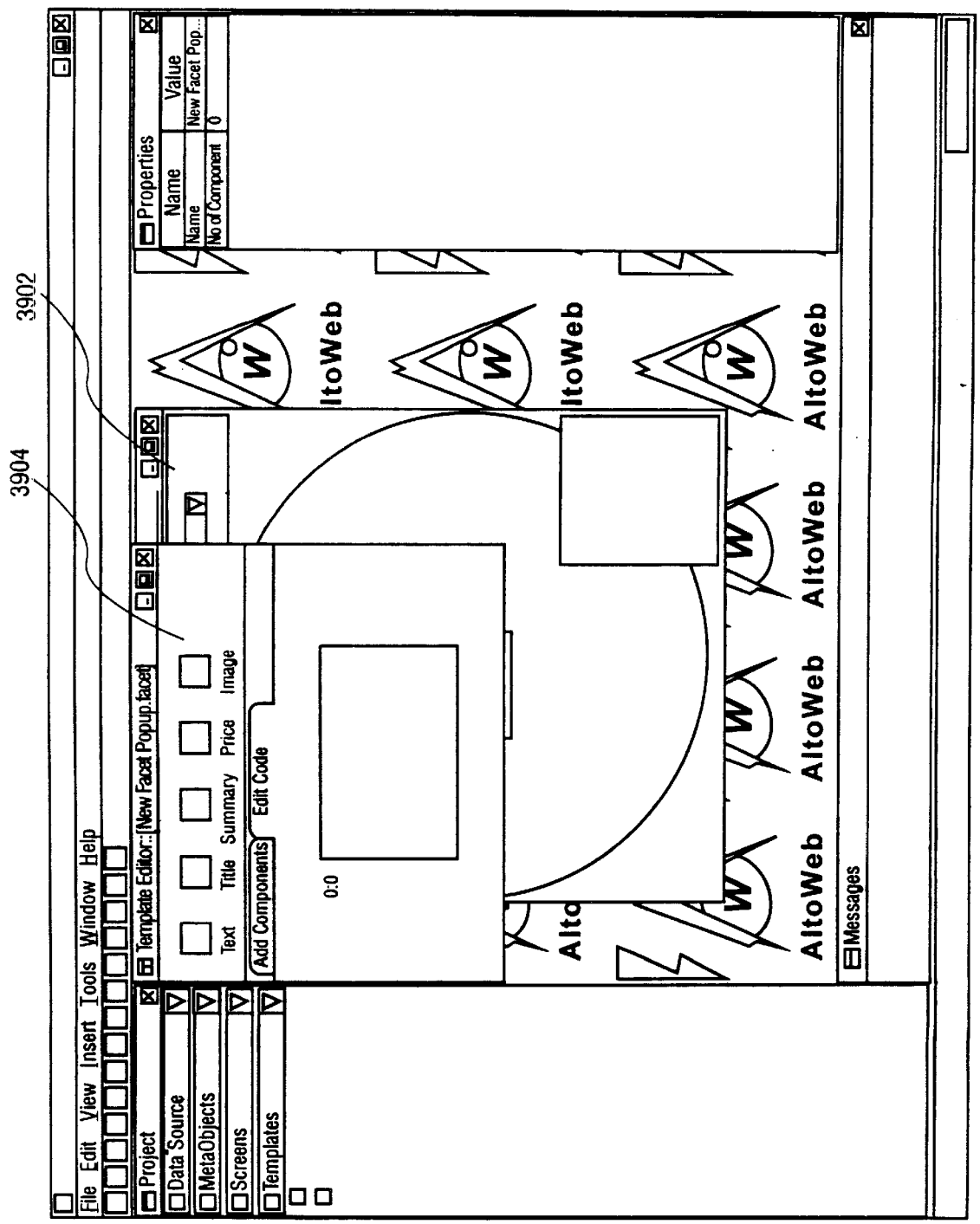

FIG. 39 illustrates an exemplary window for the editing of a template for the facet of the context. The window of FIG. 39 shows a pop-up context editor window 3902. Superimposed over the context pop-up menu 3902, a template editor for a new facet pop-up is shown at 3904. Within the facet pop-up window 3904, the user may add components and edit the code of the facet.

Figure 40:
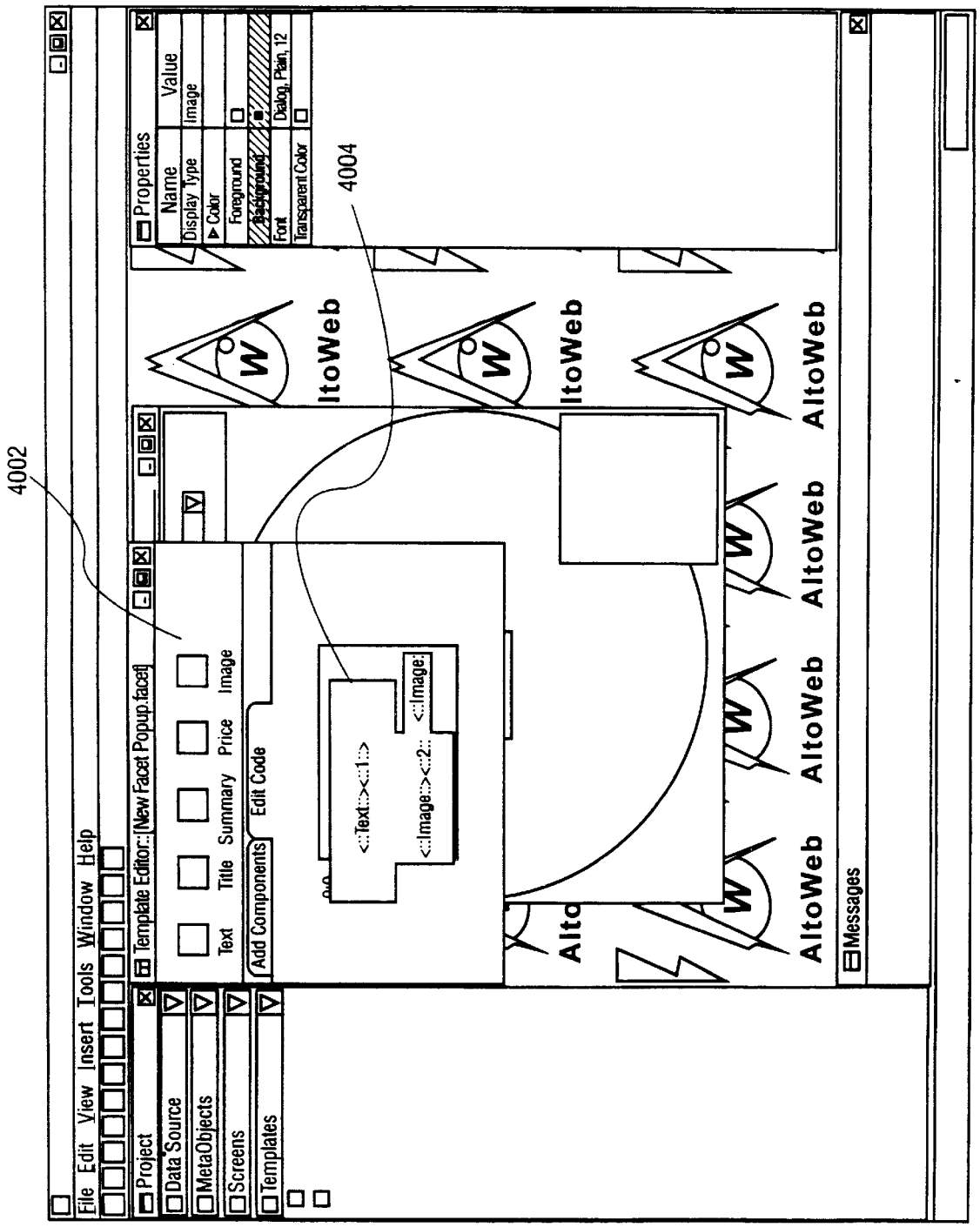

FIG. 40 is another illustration of the template editor pop-up window 4002. Within template pop-up window 4002, pop-up screens for the insertion of text 4004 are shown. The user may enter or paste text and image references in the appropriate boxes within the pop-up boxes 4004.

Figure 41:
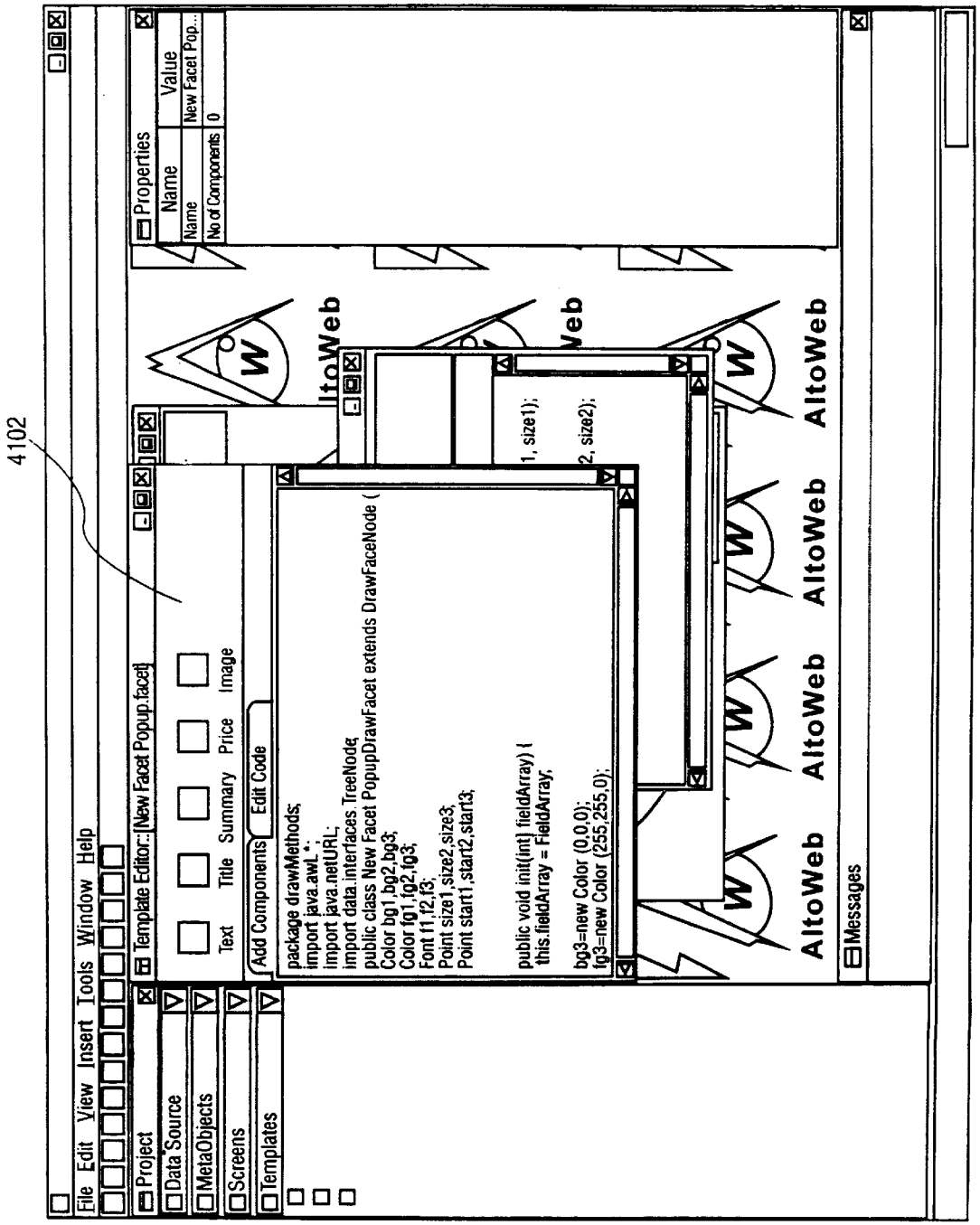
Figure 42:
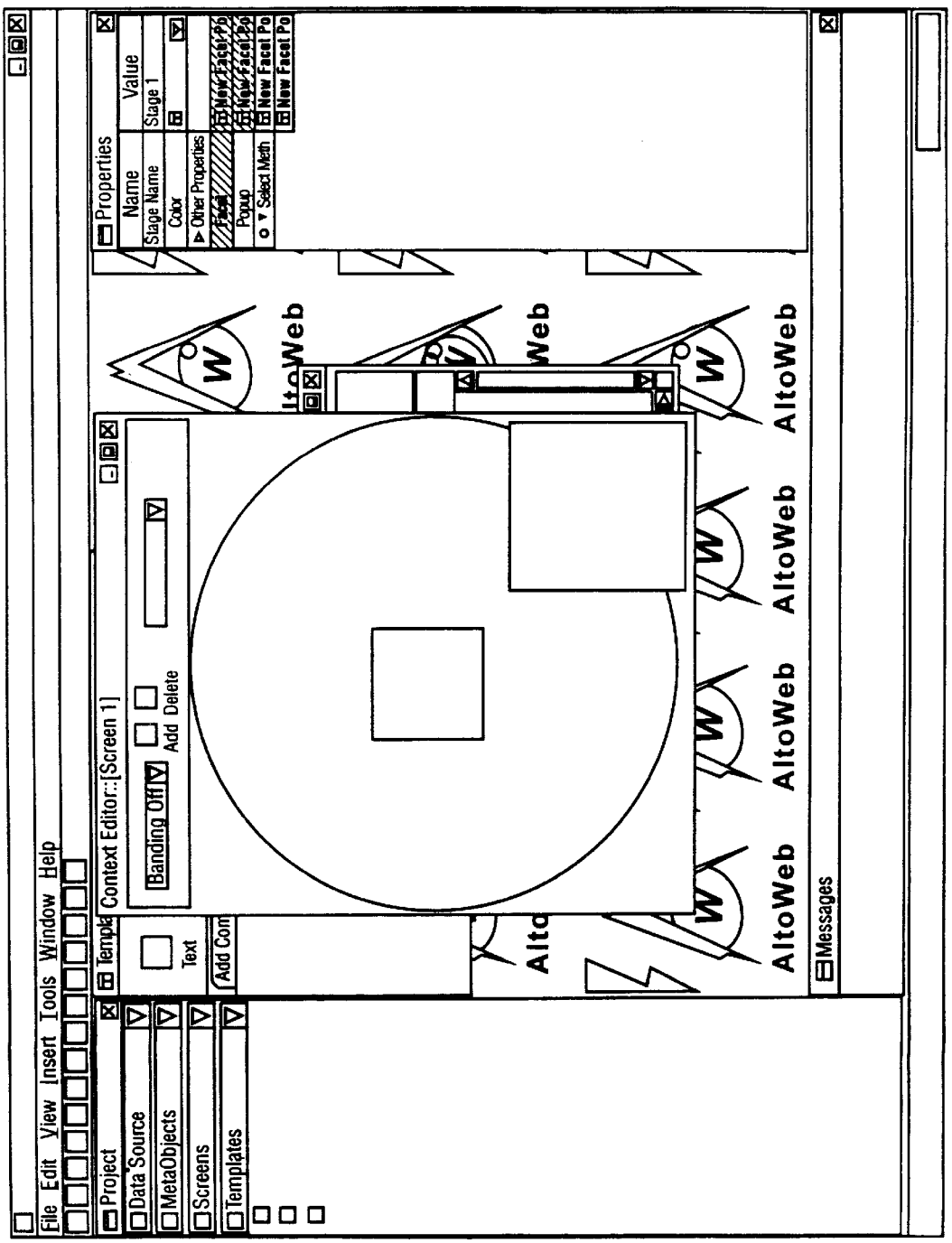
Figure 43:
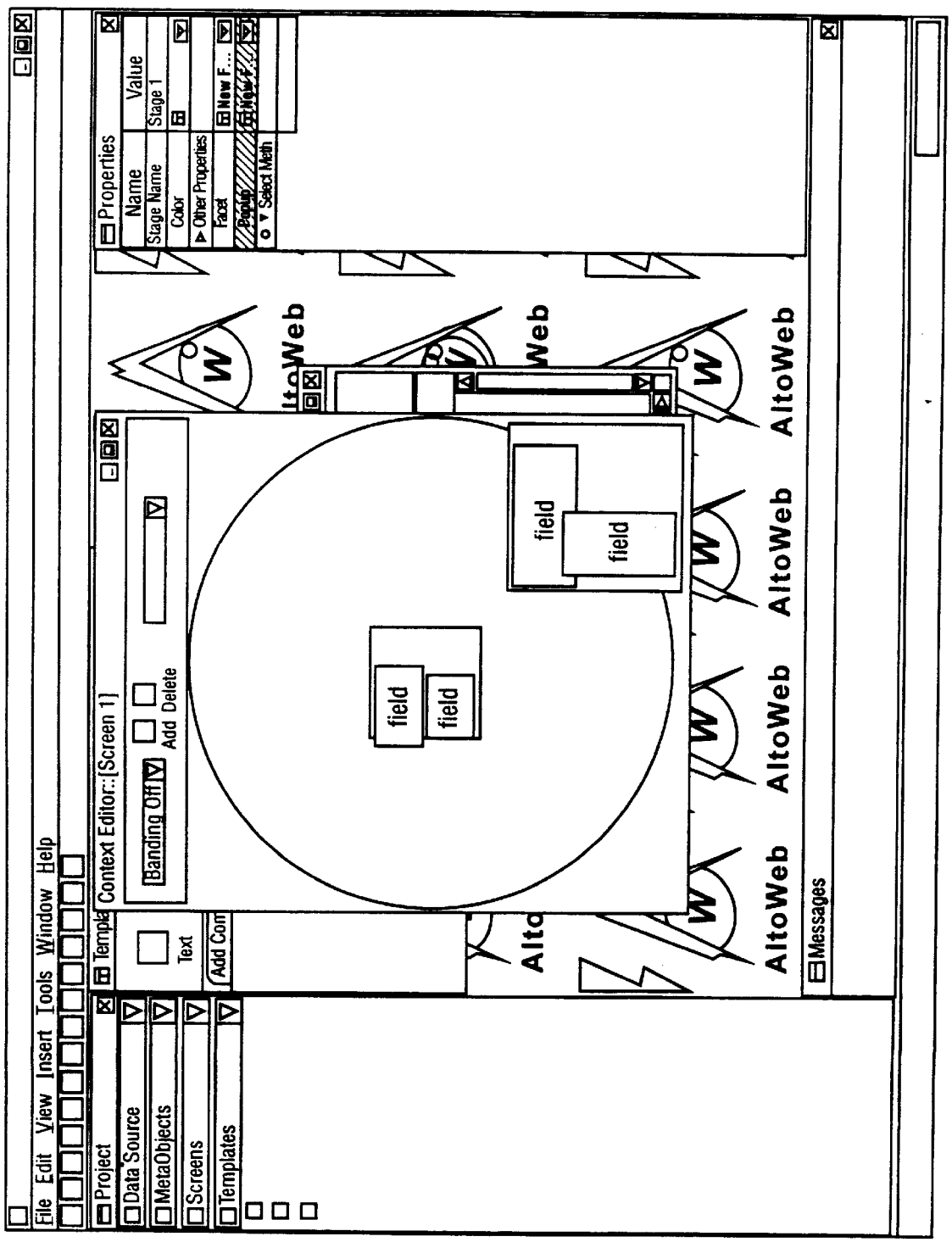
Figure 44:
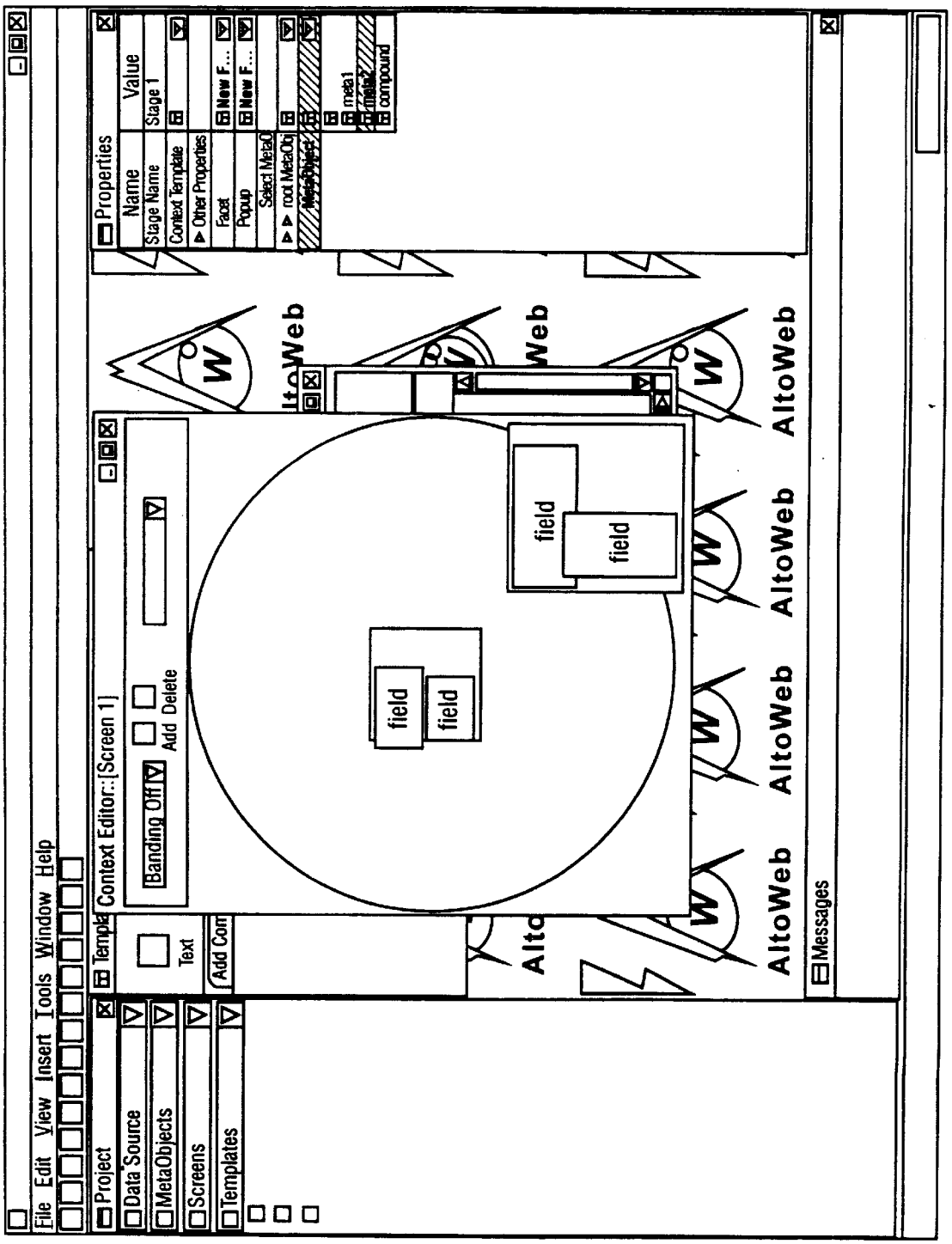
Figure 45:
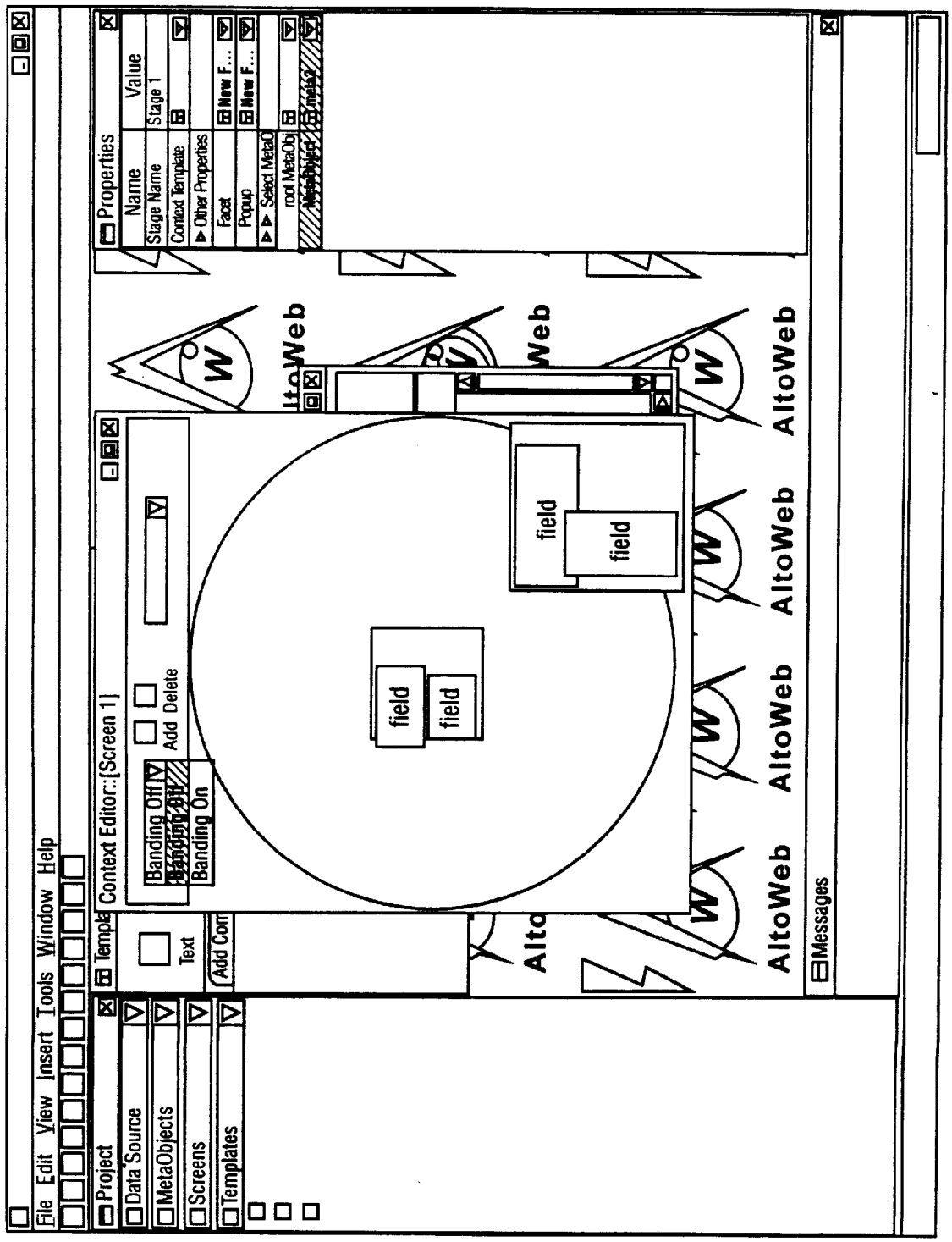
Figure 46:
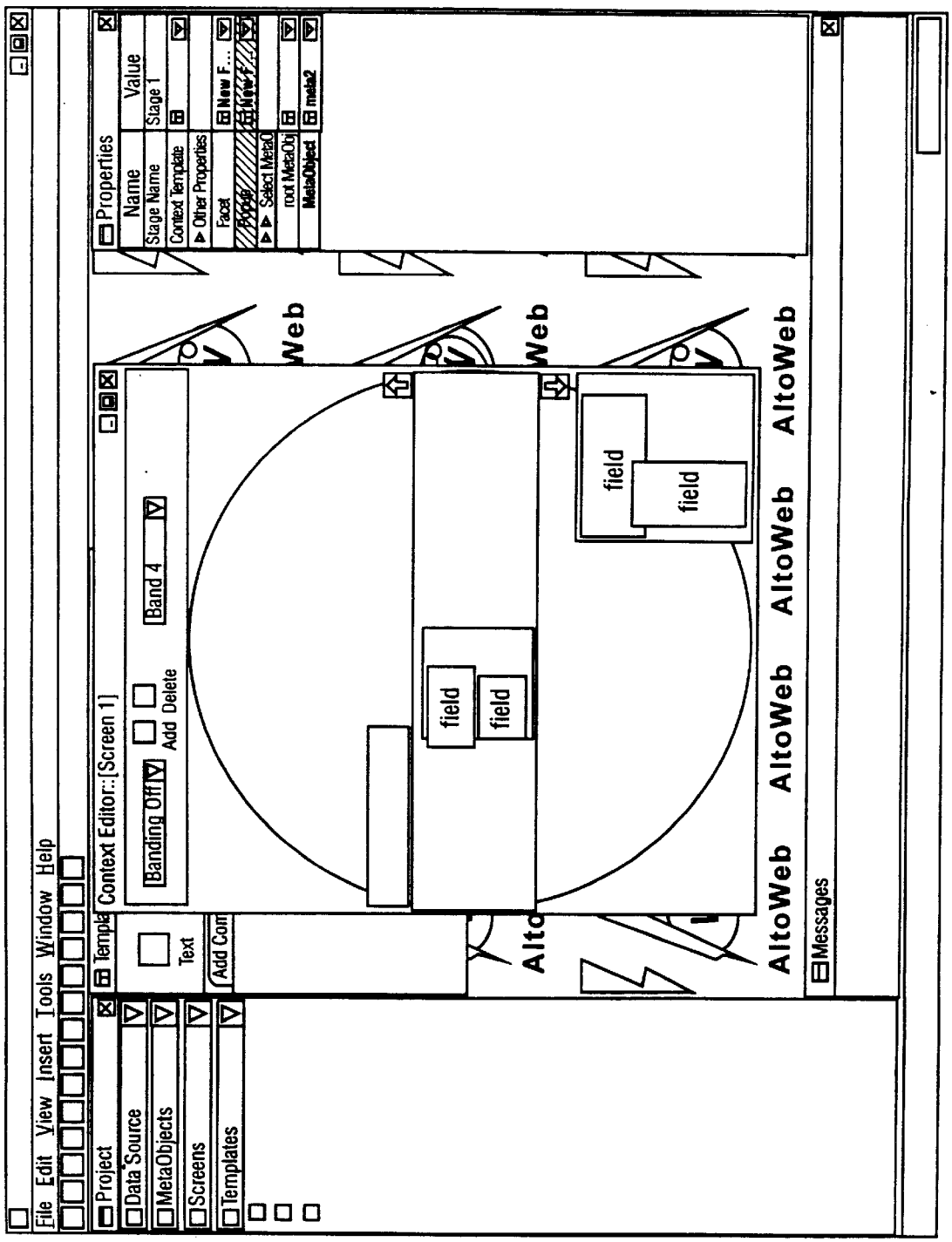
Figure 47:
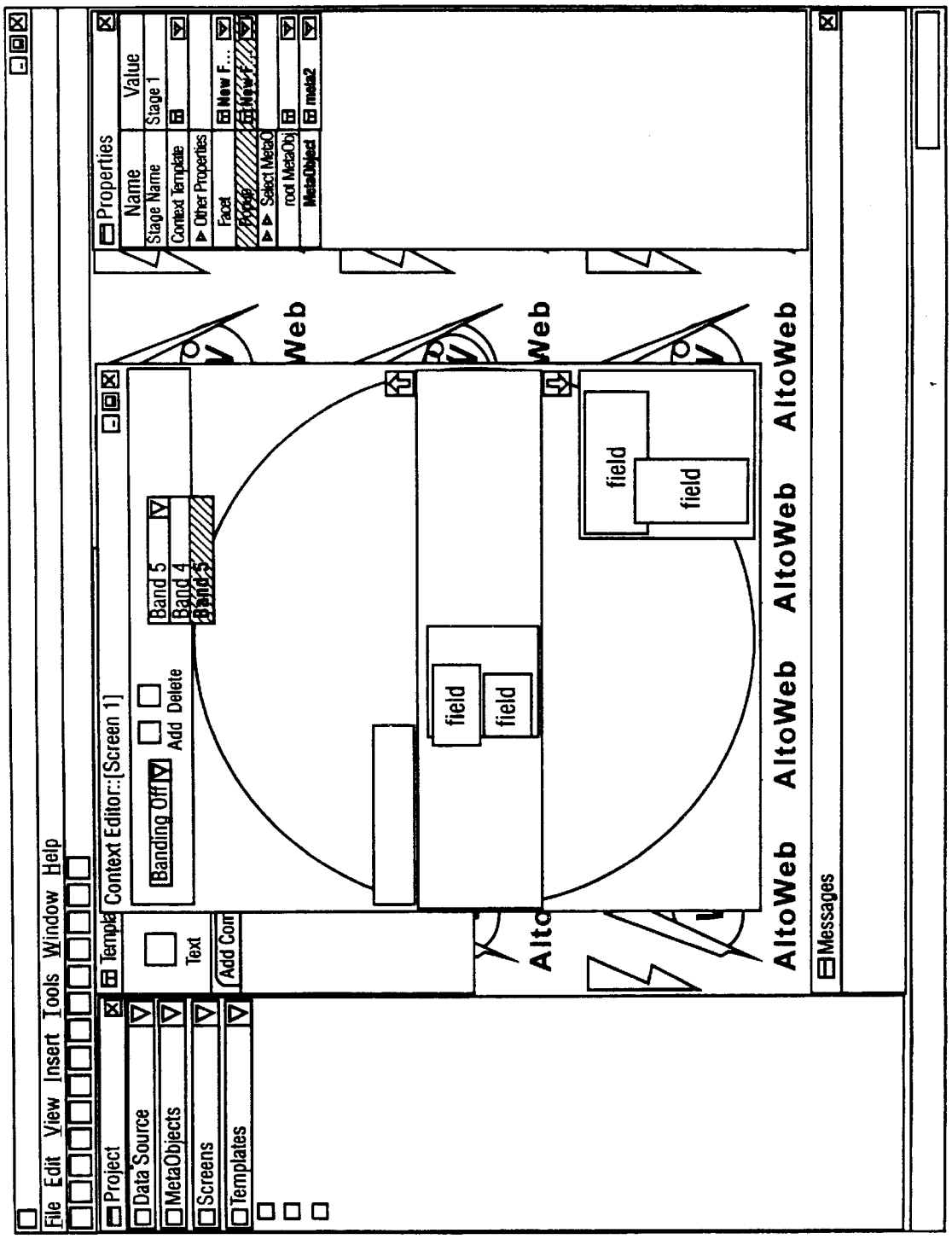

FIG. 41 illustrates the template editor pop-up in which the user has selected edit code. The pop-up window is shown as 4102. Within the pop-up window 4102, the user may edit the code that defines the facet by adding or replacing text within the screen area.

FIGS. 42–47 illustrate windows for the continued editing of the context of the meta object. Within the pop-up screens that appear on the windows, the user may define the layout and look of the context of the meta object. The operation of creating the layout is as described above.

FIGS. 48–51 illustrate exemplary windows for the definition of relationships between items within meta objects and between meta objects. The operation of defining relationships between meta objects is as described above.

Figure 48:
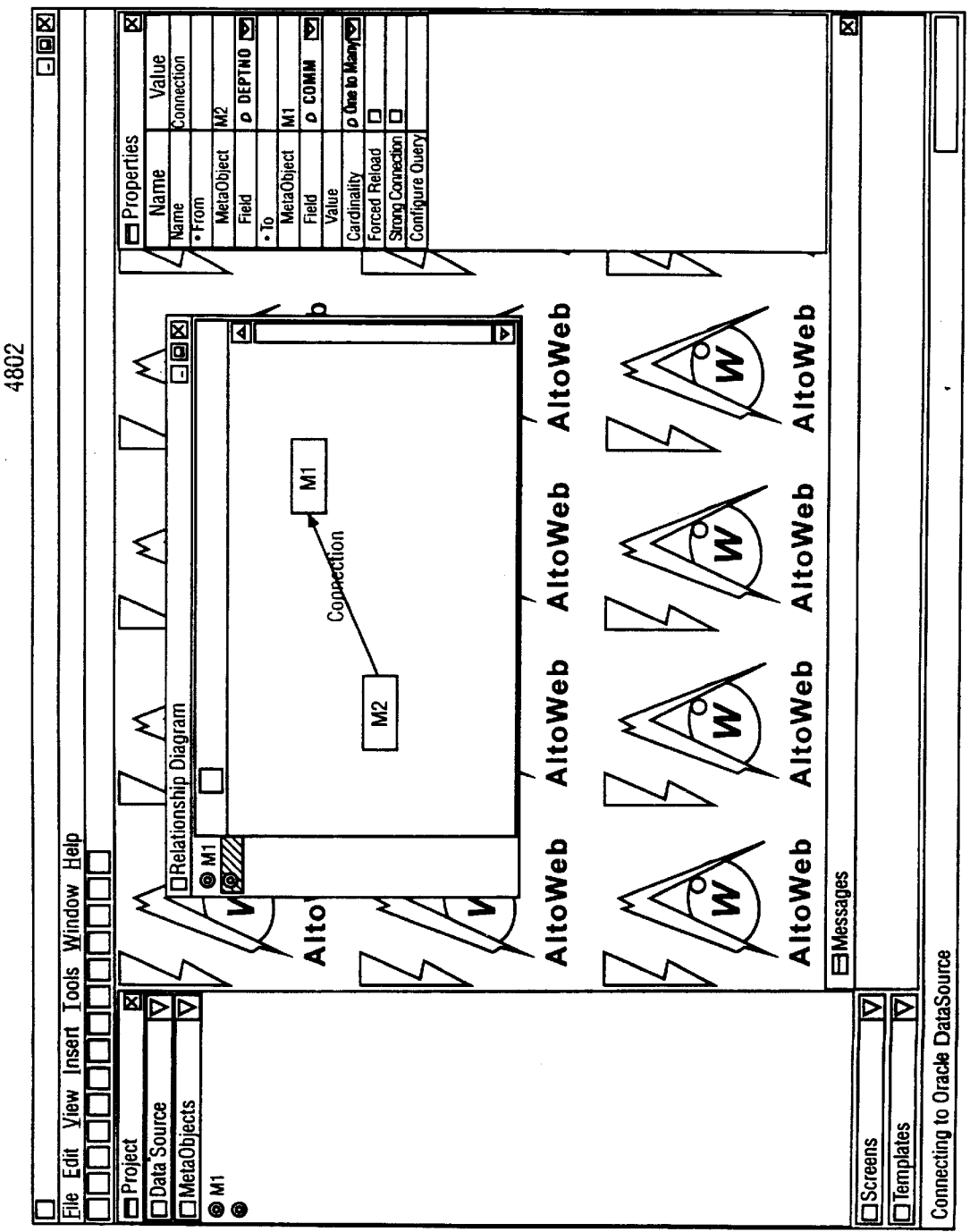

FIG. 48 illustrates a pop-up window 4802 for the connection of meta object M1 to meta object M2. In the example shown, M2 is connected to M1 by the arrow.

Figure 49:
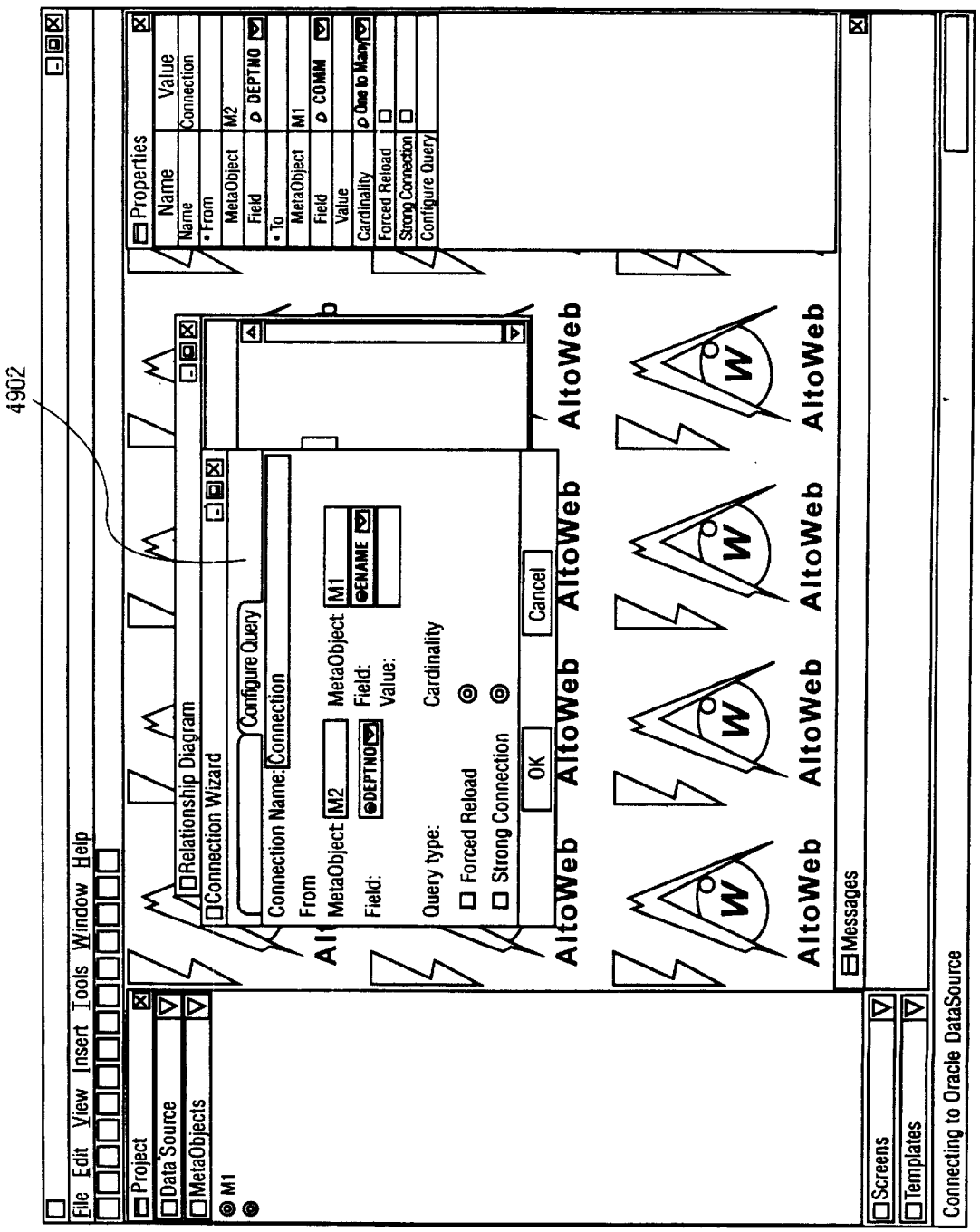

FIG. 49 illustrates the connection wizard pop-up screen 4902 after a connection between the two meta objects has occurred. In the example shown, the meta objects for M1 and M2 illustrate the fields within the various meta objects.

Figure 50:
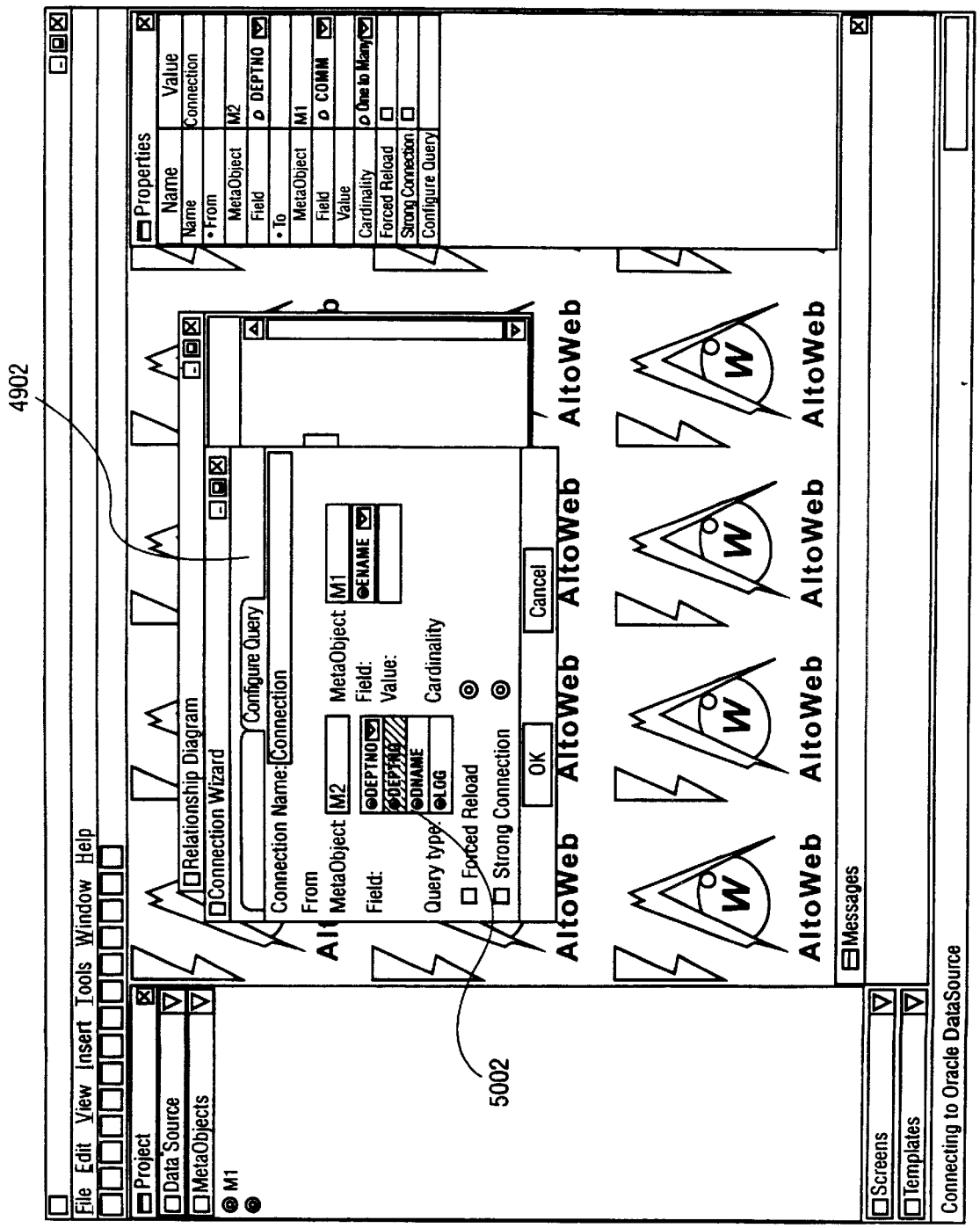

FIG. 50 shows the meta object connection wizard pop-up window 4902 with a field drop-down menu 5002 for the fields of meta object 2. Within 5002, the user has selected department number as the field to be used for the connection.

Figure 51:
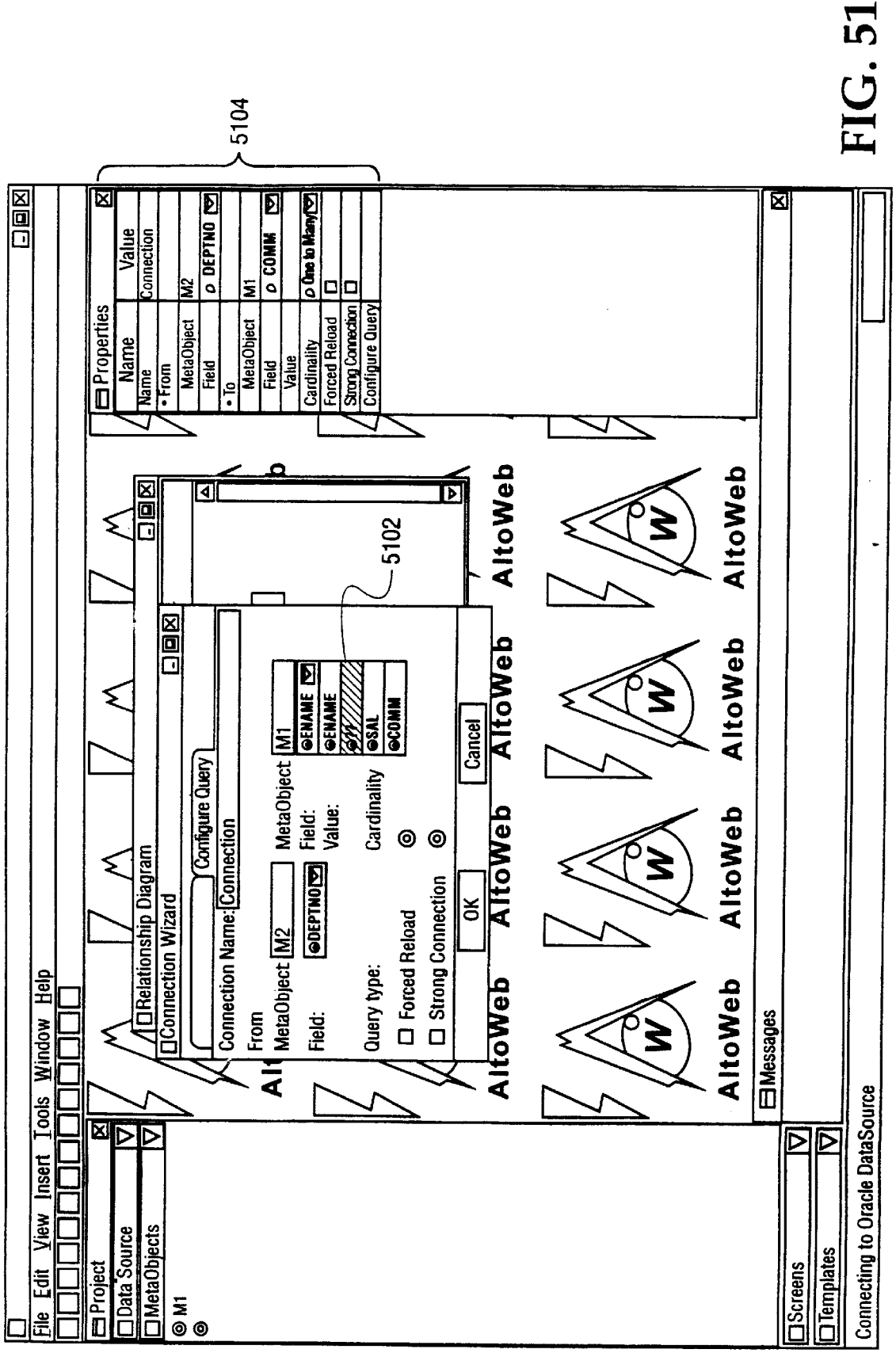

FIG. 51 illustrates the drop-down menu for meta object 1 at 5102 in which job has been selected as the item to be connected. Once the selections are made, the properties of the meta object connections are updated in properties section 5104.

The specific arrangements and methods herein are merely illustrative of the principles of this invention. Numerous modifications in form and detail may be made by those skilled in the art without departing from the true spirit and scope of the invention.

What is claimed is:

1. A method of manipulating at least one sub-structure of at least one data structure, which identifies data distributed across a plurality of data sources, said method comprising:

accessing said at least one data structure, said at least one data structure comprising a plurality of nodes;

accessing a collection of sub-structures, said at least one sub-structure of said collection comprising a sub-set of the plurality of nodes and at least one relationship defined between nodes of the sub-set;

creating a plurality of query results by querying said plurality of data sources using said at least one sub-structure and said at least one data structure; and sending said plurality of query results and at least one layout structure containing layout information for displaying said at least one sub-structure to a client.

2. The method of claim 1 further comprising:

parsing said at least one data structure to obtain a spatial representation of the at least one data structure.

3. The method of claim 2 wherein said spatial representation is a graph structure.

4. The method of claim 1 further comprising:

mapping said nodes of the sub-set into said query results using said data associated with said at least one data structure.

5. The method of claim 1 wherein said creating further comprises:

creating at least one facet using the nodes of the sub-set, the at least one layout structure, and the at least one relationship defined between the nodes.

6. A method of manipulating at least one sub-structure of at least one data structure, which identifies data distributed across a plurality of data sources, said method comprising:

receiving a layout structure containing layout information for displaying said at least one sub-structure and a plurality of query results created by querying said plurality of data sources using said at least one sub-structure and said at least one data structure from a server; and displaying said plurality of query results and said at least one sub-structure using said layout information of said layout structure.

7. The method of claim 6 wherein said displaying further comprises:

receiving said at least one sub-structure from said server, said at least one sub-structure comprising a sub-set of nodes of a plurality of nodes of said at least one data structure and at least one relationship defined between said nodes of said sub-set; and displaying said at least one sub-structure within a structure display using said layout information.

8. The method of claim 7 wherein said displaying further comprises:

receiving at least one facet associated with said at least one sub-structure;

mapping said at least one sub-structure into a three-dimensional representation using said at least one facet, the layout structure, and the plurality of query results; and displaying said three-dimensional representation within a context display interactively linked to said structure display.

9. The method of claim 8 wherein said three-dimensional representation is a sphere.

10. The method of claim 8 wherein said three-dimensional representation is a cube.

11. The method of claim 8 wherein said displaying further comprises:

receiving a content source for the at least one sub-structure; and displaying the content source within a content display interactively linked to said context display.

12. The method of claim 11 further comprising:

if the at least one sub-structure is accessed within the structure display, displaying said content source within said content display.

13. The method of claim 11 further comprising:

if the three-dimensional representation is accessed within said context display, displaying said content source within said content display.

14. A system for manipulating at least one sub-structure of at least one data structure, which identifies data distributed across a plurality of data sources, said method comprising:

means for accessing said at least one data structure, said at least one data structure comprising a plurality of nodes;

means for accessing a collection of sub-structures, said at least one sub-structure of said collection comprising a sub-set of the plurality of nodes and at least one relationship defined between nodes of the sub-set;

means for creating a plurality of query results by querying said plurality of data sources using said at least one sub-structure and said at least one data structure; and means for sending said plurality of query results and at least one layout structure containing layout information for displaying said at least one sub-structure to a client.

15. A system for manipulating at least one sub-structure of at least one data structure, which identifies data distributed across a plurality of data sources, said method comprising:

means for receiving a layout structure containing layout information for displaying said at least one sub-structure and a plurality of query results created by querying said plurality of data sources using said at least one sub-structure and said at least one data structure from a server; and means for displaying said plurality of query results and said at least one sub-structure using said layout information of said layout structure.

16. A system for manipulating at least one sub-structure of at least one data structure, which identifies data distributed across a plurality of data sources, said method comprising:

a server configured to access said at least one data structure, said at least one data structure comprising a plurality of nodes, configured to access a collection of sub-structures, said at least one sub-structure of said collection comprising a sub-set of the plurality of nodes, configured to create a plurality of query results by querying said plurality of data sources using said at least one sub-structure and said at least one data structure, and configured to send said plurality of query results and at least one layout structure containing layout information for displaying said at least one sub-structure to a client.

17. The system of claim 16 wherein said server is further configured to parse said at least one data structure to obtain a spatial representation of the at least one data structure.

18. The system of claim 17 wherein said spatial representation is a graph structure.

19. The system of claim 16 wherein said server is further configured to map said nodes of the sub-set into said query results using said data associated with said at least one data structure.

20. The system of claim 16 wherein said server is further configured to create at least one facet using the nodes of the sub-set, the at least one layout structure, and at least one relationship defined between a nodes of the sub-set.

21. A system for manipulating at least one sub-structure of at least one data structure, which identifies data distributed across a plurality of data sources, said method comprising:

a client configured to receive a layout structure containing layout information for displaying said at least one sub-structure and a plurality of query results created by querying said plurality of data sources using said at least one sub-structure and said at least one data structure from a server, and to display said plurality of query results and said at least one sub-structure using said layout information of said layout structure.

22. The system of claim 21 wherein said client is further configured to receive said at least one sub-structure from said server, said at least one sub-structure comprising a sub-set of nodes of a plurality of nodes of said at least one data structure and at least one relationship defined between said nodes of said sub-set, and configured to display said at least one sub-structure within a structure display using said layout information.

23. The system of claim 22 wherein said client is further configured to receive at least one facet associated with said at least one sub-structure, configured to map said at least one sub-structure into a three-dimensional representation using said at least one facet, the layout structure, and the plurality of query results, and configured to display said three-dimensional representation within a context display interactively linked to said structure display.

24. The system of claim 23 wherein said three-dimensional representation is a sphere.

25. The system of claim 23 wherein said three-dimensional representation is a cube.

26. The system of claim 23 wherein said client is further configured to receive a content source for the at least one sub-structure, and to display the content source within a content display interactively linked to said context display.

27. The system of claim 26 wherein said client is further configured to display said content source within said content display if the at least one sub-structure is accessed within the structure display.

28. The system of claim 26 wherein said client is further configured to display said content source within said content display if the three-dimensional representation is accessed within said context display.

29. A computer readable medium comprising instructions, which when executed on a processor, perform a method for manipulating at least one sub-structure of at least one data structure, which identifies data distributed across a plurality of data sources, said method comprising:

accessing said at least one data structure, said at least one data structure comprising a plurality of nodes;

accessing a collection of sub-structures, said at least one sub-structure of said collection comprising a sub-set of the plurality of nodes and at least one relationship defined between nodes of the sub-set;

creating a plurality of query results by querying said plurality of data sources using said at least one sub-structure and said at least one data structure; and sending said plurality of query results and at least one layout structure containing layout information for displaying said at least one sub-structure to a client.

30. The media of claim 29 further comprising:

parsing said at least one data structure to obtain a spatial representation of the at least one data structure.

31. The media of claim 29 further comprising:

mapping said nodes of the sub-set into said query results using said data associated with said at least one data structure.

32. The media of claim 29 wherein said creating further comprises:

creating at least one facet using the nodes of the sub-set, the at least one layout structure, and the at least one relationship defined between the nodes.

33. A computer readable medium comprising instructions, which when executed on a processor, perform a method for manipulating at least one sub-structure of at least one data structure, which identifies data distributed across a plurality of data sources, said method comprising:

receiving a layout structure containing layout information for displaying said at least one sub-structure and a plurality of query results created by querying said plurality of data sources using said at least one sub-structure and said at least one data structure from a server; and displaying said plurality of query results and said at least one sub-structure using said layout information of said layout structure.

34. The media of claim 33 wherein said displaying further comprises:
  receiving said at least one sub-structure from said server, said at least one sub-structure comprising a sub-set of nodes of a plurality of nodes of said at least one data structure and at least one relationship defined between said nodes of said sub-set; and
  displaying said at least one sub-structure within a structure display using said layout information.

35. The media of claim 33 wherein said displaying further comprises:
  receiving at least one facet associated with said at least one sub-structure;
  mapping said at least one sub-structure into a three-dimensional representation using said at least one facet, the layout structure, and the plurality of query results; and
  displaying said three-dimensional representation within a context display interactively linked to said structure display.

36. The media of claim 33 wherein displaying further comprises:
  receiving a content source for the at least one sub-structure; and
  displaying the content source within a content display interactively linked to said context display.

37. The media of claim 36 further comprising:
  if the at least one sub-structure is accessed within the structure display, displaying said content source within said content display.

38. The media of claim 36 further comprising:
  if the three-dimensional representation is accessed within said context display, displaying said content source within said content display.

39. A memory for storing data distributed across a plurality of data sources for access by an application program being executed on a data processing system, comprising:
  a data structure stored in said memory, said data structure including information resident in a database used by said application program and including:
  a plurality of projects used for the construction and display of a data structure, wherein each project includes
  a project layout, and
  a plurality of sub-structures, each of said plurality of sub-structures constructed from said data structure and comprising,
  a data source identifier,
  a relationship between nodes of the sub-structure, and
  a content identifier.

40. A method for processing at least one data structure, which identifies data distributed across a plurality of data sources, said method comprising:
  retrieving said at least one data structure in response to a request from a client;
  accessing said plurality of data sources to retrieve said data associated with said at least one data structure; and
  transmitting said data and said at least one data structure to said client.

41. The method according to claim 40, wherein said accessing further comprises:
  transmitting a query to said plurality of data sources, said query including a layout structure containing layout information for displaying said at least one data structure on said client and a plurality of query result fields.

42. The method according to claim 41, wherein said accessing further comprises:
  receiving said data in each query result field of said plurality of query result fields.

43. The method according to claim 42, further comprising:
  performing a plurality of calculations on said data contained in said each query result field; and
  assigning at least one logic field to said query based on said plurality of calculations.

44. The method according to claim 41, wherein transmitting said query further comprises:
  retrieving said layout information; and
  mapping said layout information into said layout structure.

45. The method according to claim 40, wherein said at least one data structure further comprises at least one logic component for performing calculations on said data.

46. The method according to claim 44, wherein said at least one logic component is a set of instructions executable on said at least one data structure.

47. The method according to claim 40, wherein said transmitting further comprises:
  transmitting said at least one data structure and content information associated with said at least one data structure to said client for display in a plurality of windows.

48. The method according to claim 47, wherein said transmitting further comprises:
  transmitting said at least one data structure to said client for display in a structure window of said plurality of windows.

49. The method according to claim 48, wherein said transmitting further comprises:
  transmitting a plurality of data nodes contained within said at least one data structure to said client for display in a context window of said plurality of windows using said layout structure, said context window being interactively linked to said structure window.

50. The method according to claim 49, wherein said transmitting further comprises:
  transmitting said content information associated with said at least one data structure to said client for display in a content window of said plurality of windows, said content window being interactively linked to each of said structure window and said context window.

51. The method according to claim 50, wherein said transmitting further comprises:
  transmitting said data associated with each data node of said plurality of data nodes to said client; and
  transmitting user information related to retrieval of said data to said client.

52. The method according to claim 50, wherein said content window further comprises a three-dimensional frame including a plurality of bands, each band of said plurality of bands displaying content of a set of data nodes of said plurality of data nodes contained within said at least one data structure.

53. The method according to claim 52, wherein said each band of said plurality of bands represents a query to said at least one data source and includes a plurality of query result fields obtained from said query.

54. The method according to claim 48, wherein said transmitting further comprises:

transmitting a name of said at least one data structure to said client; and transmitting a node name for each data node of a plurality of data nodes contained within said at least one data structure to said client.

55. The method according to claim 40, wherein said at least one data structure is a tree structure.

56. The method according to claim 40, wherein said at least one data structure is a directional graph structure.

57. The method according to claim 40, wherein said at least one data structure is a bi-directional graph structure.

58. The method according to claim 40, wherein said at least one data structure is a graph structure having a plurality of directional relationships and a plurality of bi-directional relationships.

59. The method according to claim 40, wherein said processing further comprises transmitting said data in real time to said client.

60. A method for processing at least one data structure, which identifies data distributed across a plurality of data sources, said method comprising:

receiving said at least one data structure and content information associated with said at least one data structure from a server, in response to a request from a user; and displaying said at least one data structure and said content information in a plurality of windows for said user.

61. The method according to claim 60, further comprising:

receiving said request from said user; and transmitting said request to said server.

62. The method according to claim 60, wherein said displaying further comprises:

displaying said at least one data structure in a structure window of said plurality of windows.

63. The method according to claim 62, wherein said displaying further comprises:

displaying a plurality of data nodes contained within said at least one data structure in a context window of said plurality of windows, said context window being interactively linked to said structure window.

64. The method according to claim 63, wherein said displaying further comprises:

displaying said content information associated with said at least one data structure in a content window of said plurality of windows, said content window being interactively linked to each of said structure window and said context window.

65. The method according to claim 64, wherein said displaying further comprises:

displaying data contained in each data node of said plurality of data nodes; and displaying user information related to retrieval of said data from said each data node of said plurality of data nodes.

66. The method according to claim 64, wherein said content window further comprises a three-dimensional frame including a plurality of bands, each band of said plurality of bands displaying content of a set of data nodes of said plurality of data nodes contained within said at least one data structure.

67. The method according to claim 66, wherein said each band of said plurality of bands represents a query to said plurality of data sources and includes a plurality of query result fields obtained from said query.

68. The method according to claim 62, wherein said displaying further comprises:

displaying a name of said at least one data structure; and displaying a node name for each data node of a plurality of data nodes contained within said at least one data structure.

69. The method according to claim 60, wherein said at least one data structure is a tree structure.

70. The method according to claim 60, wherein said at least one data structure is a directional graph structure.

71. The method according to claim 60, wherein said at least one data structure is a bi-directional graph structure.

72. The method according to claim 60, wherein said at least one data structure is a graph structure having a plurality of directional relationships and a plurality of bi-directional relationships.

73. The method according to claim 60, wherein said at least one data structure and said content information are displayed in real time for said user.

74. A method for accessing data distributed across a plurality of disparate data sources, said method comprising:

retrieving a data structure, said data structure identifying a plurality of data items respectively located within said plurality of disparate data sources;

accessing said plurality of disparate data sources using said data structure to retrieve said plurality of data items; and communicating said plurality of data items and said data structure to a client.

75. The method according to claim 74, wherein said accessing further comprises:

transmitting a query to said plurality of disparate data sources, said query including a layout structure and a plurality of query result fields, said layout structure containing layout information for displaying said data structure on said client.

76. The method according to claim 75, wherein said accessing further comprises:

receiving one data item of said plurality of data items in each query result field of said plurality of query result fields.

77. The method according to claim 75, wherein transmitting said query further comprises:

retrieving said layout information; and mapping said layout information into said layout structure.

78. The method according to claim 74, wherein said data structure further includes logic specifying at least one operation to be performed utilizing said plurality of data items retrieved from said plurality of disparate data sources, said method further comprising:

performing said at least one operation utilizing said plurality of data items to generate a result data item; and communicating said result data item to said client.

79. The method according to claim 74, further comprising:

defining at least one relationship between said plurality of data items to obtain a context structure; and communicating said context structure to said client.

80. The method according to claim 74, wherein said communicating further comprises:

communicating said data structure to said client for display in a structure window.

81. The method according to claim 80, wherein said communicating further comprises:

communicating a plurality of data nodes contained within said data structure to said client for display in a context window interactively linked to said structure window.

82. The method according to claim 81, wherein said communicating further comprises:
communicating said plurality of data items retrieved from said plurality of disparate data sources to said client for display in a content window interactively linked to each of said structure window and said context window.

83. A method for displaying data, said method comprising:
detecting user selection of a data item;
responsive to said user selection, identifying a data structure within which said data item is located; and
generating a display to be displayed on a display unit of a computer system, said display simultaneously presenting content of said data item in a content window, context of said data item in a context window interactively linked to said content window, and a view of at least one portion of said data structure in a structure window interactively linked to said content window and said context window.

84. The method according to claim 83, wherein said data structure is a hierarchical data structure, and said context of said data item further includes other data items located on a same hierarchical level of said data structure as said data item.

85. The method according to claim 84, wherein said at least one portion of said data structure further includes a branch of said hierarchical data structure which contains said data item.

86. The method according to claim 83, wherein said content is displayed in Hyper Text Markup Language (HTML) format.

87. The method according to claim 83, wherein said content is displayed in Extensible Markup Language (XML) format.

88. A system for processing at least one data structures which identifies data distributed across a plurality of data sources, said system comprising a server configured to retrieve said at least one data structure, to access said plurality of data sources to retrieve said data associated with said at least one data structure and to transmit said data and said at least one data structure to said client.

89. The system according to claim 88, wherein said server is further configured to transmit a query to said plurality of data sources, said query including a layout structure containing layout information for displaying said at least one data structure on said client and a plurality of query result fields.

90. The system according to claim 89, wherein said server is further configured to receive said data in each query result field of said plurality of query result fields.

91. The system according to claim 90, wherein said server is further configured to perform a plurality of calculations on said data contained in said each query result field and to assign at least one logic field to said query based on said plurality of calculations.

92. The system according to claim 89, wherein said server is further configured to retrieve said layout information and to map said layout information into said layout structure.

93. The system according to claim 88, wherein said at least one data structure further comprises at least one logic component for performing calculations on said data.

94. The system according to claim 93, wherein said at least one logic component is a set of instructions executable on said at least one data structure.

95. The system according to claim 88, wherein said server is further configured to transmit said at least one data structure and content information associated with said at least one data structure to said client for display in a plurality of windows.

96. The system according to claim 95, wherein said server is further configured to transmit said at least one data structure to said client for display in a structure window of said plurality of windows.

97. The system according to claim 96, wherein said server is further configured to transmit a plurality of data nodes contained within said at least one data structure to said client for display in a context window of said plurality of windows using said layout structure, said context window being interactively linked to said structure window.

98. The system according to claim 97, wherein said server is further configured to transmit said content information associated with said at least one data structure to said client for display in a content window of said plurality of windows, said content window being interactively linked to each of said structure window and said context window.

99. The system according to claim 98, wherein said server is further configured to transmit said data associated with each data node of said plurality of data nodes to said client and to transmit user information related to retrieval of said data to said client.

100. The system according to claim 98, wherein said content window further comprises a three-dimensional frame including a plurality of bands, each band of said plurality of bands displaying content of a set of data nodes of said plurality of data nodes contained within said at least one data structure.

101. The system according to claim 100, wherein said each band of said plurality of bands represents a query to said at least one data source and includes a plurality of query result fields obtained from said query.

102. The system according to claim 96, wherein said server is further configured to transmit a name of said at least one data structure to said client and to transmit a node name for each data node of a plurality of data nodes contained within said at least one data structure to said client.

103. The system according to claim 88, wherein said at least one data structure is a tree structure.

104. The system according to claim 88, wherein said at least one data structure is a directional graph structure.

105. The system according to claim 88, wherein said at least one data structure is a bi-directional graph structure.

106. The system according to claim 88, wherein said at least one data structure is a graph structure having a plurality of directional relationships and a plurality of bi-directional relationships.

107. The system according to claim 88, wherein said server is further configured to transmit said data in real time to said client.

108. A system for processing at least one data structure, which identifies data distributed across a plurality of data sources, said system comprising a client configured to receive said at least one data structure and content information associated with said at least one data structure from a server, in response to a request from a user and to display said at least one data structure and said content information in a plurality of windows for said user.

109. The system according to claim 108, wherein said client is further configured to receive said request from said user and to transmit said request to said server.

110. The system according to claim 108, wherein said client is further configured to display said at least one data structure in a structure window of said plurality of windows.

111. The system according to claim 110, wherein said client is further configured to display a plurality of data nodes contained within said at least one data structure in a context window of said plurality of windows, said context window being interactively linked to said structure window.

112. The system according to claim 111, wherein said client is further configured to display said content information associated with said at least one data structure in a content window of said plurality of windows, said content window being interactively linked to each of said structure window and said context window.

113. The system according to claim 112, wherein said client is further configured to display data contained in each data node of said plurality of data nodes and to display user information related to retrieval of said data from said each data node of said plurality of data nodes.

114. The system according to claim 112, wherein said content window further comprises a three-dimensional frame including a plurality of bands, each band of said plurality of bands displaying content of a set of data nodes of said plurality of data nodes contained within said at least one data structure.

115. The system according to claim 114, wherein said each band of said plurality of bands represents a query to said plurality of data sources and includes a plurality of query result fields obtained from said query.

116. The system according to claim 110, wherein said client is further configured to display a name of said at least one data structure and to display a node name for each data node of a plurality of data nodes contained within said at least one data structure.

117. The system according to claim 108, wherein said at least one data structure is a tree structure.

118. The system according to claim 108, wherein said at least one data structure is a directional graph structure.

119. The system according to claim 108, wherein said at least one data structure is a bi-directional graph structure.

120. The system according to claim 108, wherein said at least one data structure is a graph structure having a plurality of directional relationships and a plurality of bi-directional relationships.

121. The system according to claim 108, wherein said at least one data structure and said content information are displayed in real time for said user.

122. A system for accessing data distributed across a plurality of disparate data sources, said system comprising a server configured to retrieve a data structure, said data structure identifying a plurality of data items respectively located within said plurality of disparate data sources, to access said plurality of disparate data sources to retrieve said plurality of data items and to communicate said plurality of data items and said data structure to a client.

123. The system according to claim 122, said system comprising a server configured to transmit a query to said plurality of disparate data sources, said query including a layout structure and a plurality of query result fields, said layout structure containing layout information for displaying said data structure on said client.

124. The system according to claim 123, wherein said system comprising a server configured to receive one data item of said plurality of data items in each query result field of said plurality of query result fields.

125. The system according to claim 123, wherein said system comprising a server configured to retrieve said layout information and mapping said layout information into said layout structure.

126. The system according to claim 122, wherein said data structure further includes logic specifying at least one operation to be performed utilizing said plurality of data items retrieved from said plurality of disparate data sources, and server is further configured to perform said at least one operation utilizing said plurality of data items to generate a result data item and to communicate said result data item to said client.

127. The system according to claim 122, wherein said system comprising a server configured to define at least one relationship between said plurality of data items to obtain a context structure and to communicate said context structure to said client.

128. The system according to claim 122, wherein said system comprising a server configured to communicate said data structure to said client for display in a structure window.

129. The system according to claim 128, wherein said system comprising a server configured to communicate a plurality of data nodes contained within said data structure to said client for display in a context window interactively linked to said structure window.

130. The system according to claim 129, wherein said system comprising a server configured to communicate said plurality of data items retrieved from said plurality of disparate data sources to said client for display in a content window interactively linked to each of said structure window and said context window.

131. A system for displaying data, said system comprising a client configured to detect user selection of a data item, responsive to said user selection, to identify a data structure within which said data item is located and to generate a display to be displayed on a display unit of a computer system, said display simultaneously presenting content of said data item in a content window, context of said data item in a context window interactively linked to said content window, and a view of at least one portion of said data structure in a structure window interactively linked to said content window and said context window.

132. The system according to claim 131, wherein said data structure is a hierarchical data structure, and said context of said data item further includes other data items located on a same hierarchical level of said data structure as said data item.

133. The system according to claim 132, wherein said at least one portion of said data structure further includes a branch of said hierarchical data structure which contains said data item.

134. The system according to claim 131, wherein said content is displayed in Hyper Text Markup Language (HTML) format.

135. The system according to claim 131, wherein said content is displayed in Extensible Markup Language (XML) format.

136. A computer readable medium containing executable instructions which, when executed in a processing system, cause the system to perform a method for processing at least one data structure, which identifies data distributed across a plurality of data sources, said method comprising:
  retrieving said at least one data structure;
  accessing said plurality of data sources to retrieve said data associated with said at least one data structure; and
  transmitting said data and said at least one data structure to said client.

137. The computer readable medium according to claim 136, wherein said accessing further comprises:
  transmitting a query to said plurality of data sources, said query including a layout structure containing layout information for displaying said at least one data structure on said client and a plurality of query result fields.

138. The computer readable medium according to claim 137, wherein said accessing further comprises:
receiving said data in each query result field of said plurality of query result fields.

139. The computer readable medium according to claim 138, wherein the method further comprises:
performing a plurality of calculations on said data contained in said each query result field; and
assigning at least one logic field to said query based on said plurality of calculations.

140. The computer readable medium according to claim 137, wherein transmitting said query further comprises:
retrieving said layout information; and
mapping said layout information into said layout structure.

141. The computer readable medium according to claim 136, wherein said at least one data structure further comprises at least one logic component for performing calculations on said data.

142. The computer readable medium according to claim 140, wherein said at least one logic component is a set of instructions executable on said at least one data structure.

143. The computer readable medium according to claim 136, wherein said transmitting further comprises:
transmitting said at least one data structure and content information associated with said at least one data structure to said client for display in a plurality of windows.

144. The computer readable medium according to claim 143, wherein said transmitting further comprises:
transmitting said at least one data structure to said client for display in a structure window of said plurality of windows.

145. The computer readable medium according to claim 144, wherein said transmitting further comprises:
transmitting a plurality of data nodes contained within said at least one data structure to said client for display in a context window of said plurality of windows using said layout structure, said context window being interactively linked to said structure window.

146. The computer readable medium according to claim 145, wherein said transmitting further comprises:
transmitting said content information associated with said at least one data structure to said client for display in a content window of said plurality of windows, said content window being interactively linked to each of said structure window and said context window.

147. The computer readable medium according to claim 146, wherein said transmitting further comprises:
transmitting said data associated with each data node of said plurality of data nodes to said client; and
transmitting user information related to retrieval of said data to said client.

148. The computer readable medium according to claim 146, wherein said content window further comprises a three-dimensional frame including a plurality of bands, each band of said plurality of bands displaying content of a set of data nodes of said plurality of data nodes contained within said at least one data structure.

149. The computer readable medium according to claim 148, wherein said each band of said plurality of bands represents a query to said at least one data source and includes a plurality of query result fields obtained from said query.

150. The computer readable medium according to claim 144, wherein said transmitting further comprises:
transmitting a name of said at least one data structure to said client; and
transmitting a node name for each data node of a plurality of data nodes contained within said at least one data structure to said client.

151. The computer readable medium according to claim 136, wherein said at least one data structure is a tree structure.

152. The computer readable medium according to claim 136, wherein said at least one data structure is a directional graph structure.

153. The computer readable medium according to claim 136, wherein said at least one data structure is a bi-directional graph structure.

154. The computer readable medium according to claim 136, wherein said at least one data structure is a graph structure having a plurality of directional relationships and a plurality of bi-directional relationships.

155. The computer readable medium according to claim 136, wherein said processing further comprises transmitting said data in real time to said client.

156. A computer readable medium containing executable instructions which, when executed in a processing system, cause the system to perform a method for processing at least one data structure, which identifies data distributed across a plurality of data sources, said method comprising:
receiving said at least one data structure and content information associated with said at least one data structure from a server, in response to a request from a user; and
displaying said at least one data structure and said content information in a plurality of windows for said user.

157. The computer readable medium according to claim 156, wherein the method further comprises:
receiving said request from said user; and
transmitting said request to said server.

158. The computer readable medium according to claim 156, wherein said displaying further comprises:
displaying said at least one data structure in a structure window of said plurality of windows.

159. The computer readable medium according to claim 158, wherein said displaying further comprises:
displaying a plurality of data nodes contained within said at least one data structure in a context window of said plurality of windows, said context window being interactively linked to said structure window.

160. The computer readable medium according to claim 159, wherein said displaying further comprises:
displaying said content information associated with said at least one data structure in a content window of said plurality of windows, said content window being interactively linked to each of said structure window and said context window.

161. The computer readable medium according to claim 160, wherein said displaying further comprises:
displaying data contained in each data node of said plurality of data nodes; and
displaying user information related to retrieval of said data from said each data node of said plurality of data nodes.

162. The computer readable medium according to claim 160, wherein said content window further comprises a three-dimensional frame including a plurality of bands, each band of said plurality of bands displaying content of a set of data nodes of said plurality of data nodes contained within said at least one data structure.

163. The computer readable medium according to claim 162, wherein said each band of said plurality of bands represents a query to said plurality of data sources and includes a plurality of query result fields obtained from said query.

164. The computer readable medium according to claim 158, wherein said displaying further comprises:
displaying a name of said at least one data structure; and
displaying a node name for each data node of a plurality of data nodes contained within said at least one data structure.

165. The computer readable medium according to claim 156, wherein said at least one data structure is a tree structure.

166. The computer readable medium according to claim 156, wherein said at least one data structure is a directional graph structure.

167. The computer readable medium according to claim 156, wherein said at least one data structure is a bi-directional graph structure.

168. The computer readable medium according to claim 156, wherein said at least one data structure is a graph structure having a plurality of directional relationships and a plurality of bi-directional relationships.

169. The computer readable medium according to claim 156, wherein said at least one data structure and said content information are displayed in real time for said user.

170. A computer readable medium containing executable instructions which, when executed in a processing system, cause the system to perform a method comprising:
retrieving a data structure, said data structure identifying a plurality of data items respectively located within said plurality of disparate data sources;
accessing said plurality of disparate data sources to retrieve said plurality of data items; and
communicating said plurality of data items and said data structure to a client.

171. The computer readable medium according to claim 170, wherein said accessing further comprises:
transmitting a query to said plurality of disparate data sources, said query including a layout structure and a plurality of query result fields, said layout structure containing layout information for displaying said data structure on said client.

172. The computer readable medium according to claim 171, wherein said accessing further comprises:
receiving one data item of said plurality of data items in each query result field of said plurality of query result fields.

173. The computer readable medium- according to claim 171, wherein transmitting said query further comprises:
retrieving said layout information; and mapping said layout information into said layout structure.

174. The computer readable medium according to claim 170, wherein said data structure further includes logic specifying at least one operation to be performed utilizing said plurality of data items retrieved from said plurality of disparate data sources, and wherein the method further comprises:
performing said at least one operation utilizing said plurality of data items to generate a result data item; and
communicating said result data item to said client.

175. The computer readable medium according to claim 170, wherein the method further comprises:
defining at least one relationship between said plurality of data items to obtain a context structure; and
communicating said context structure to said client.

176. The computer readable medium according to claim 170, wherein said communicating further comprises:
communicating said data structure to said client for display in a structure window.

177. The computer readable medium according to claim 176, wherein said communicating further comprises:
communicating a plurality of data nodes contained within said data structure to said client for display in a context window interactively linked to said structure window.

178. The computer readable medium according to claim 177, wherein said communicating further comprises:
communicating said plurality of data items retrieved from said plurality of disparate data sources to said client for display in a content window interactively linked to each of said structure window and said context window.

179. A computer readable medium containing executable instructions which, when executed in a processing system, cause the system to perform a method comprising:
detecting user selection of a data item;
responsive to said user selection, identifying a data structure within which said data item is located; and
generating a display to be displayed on a display unit of a computer system, said display simultaneously presenting content of said data item in a content window, context of said data item in a context window interactively linked to said content window, and a view of at least one portion of said data structure in a structure window interactively linked to said content window and said context window.

180. The computer readable medium according to claim 179, wherein said data structure is a hierarchical data structure, and said context of said data item further includes other data items located on a same hierarchical level of said data structure as said data item.

181. The computer readable medium according to claim 180, wherein said at least one portion of said data structure further includes a branch of said hierarchical data structure which contains said data item.

182. The computer readable medium according to claim 179, wherein said content is displayed in Hyper Text Markup Language (HTML) format.

183. The computer readable medium according to claim 179, wherein said content is displayed in Extensible Markup Language (XML) format.

* * * * *

UNITED STATES PATENT AND TRADEMARK OFFICE
CERTIFICATE OF CORRECTION

PATENT NO.    : 6,370,537 B1
DATED         : April 9, 2002
INVENTOR(S)   : Gilbert et al.

Page 1 of 1

It is certified that error appears in the above-identified patent and that said Letters Patent is hereby corrected as shown below:

<u>Drawings,</u>
Figure 16, under context "Sugar Free Products" insert -- 1604 --.
Figure 17, under structure "Turn of the Century" insert -- 1702 --.
Figure 17, under context "Turn of the Century" insert -- 1704 --.

Signed and Sealed this

Twentieth Day of August, 2002

Attest:

Attesting Officer

JAMES E. ROGAN
*Director of the United States Patent and Trademark Office*